United States Patent
Licht et al.

(10) Patent No.: US 12,291,786 B2
(45) Date of Patent: *May 6, 2025

(54) ELECTROLYSIS METHODS THAT UTILIZE CARBON DIOXIDE AND A HIGH NICKEL-CONTENT ANODE FOR MAKING DESIRED NANOCARBON ALLOTROPES

(71) Applicant: C2CNT LLC, Venice, FL (US)

(72) Inventors: Stuart Licht, Venice, FL (US); Gad Licht, Venice, FL (US)

(73) Assignee: C2CNT LLC, Venice, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,639

(22) Filed: May 15, 2024

(65) Prior Publication Data

US 2024/0301566 A1    Sep. 12, 2024

Related U.S. Application Data

(62) Division of application No. 17/993,275, filed on Nov. 23, 2022, now Pat. No. 12,031,218.

(Continued)

(51) Int. Cl.
*C25B 1/135* (2021.01)
*B01D 61/02* (2006.01)
(Continued)

(52) U.S. Cl.
CPC .............. *C25B 1/135* (2021.01); *C01B 32/05* (2017.08); *C01B 32/15* (2017.08); *C01B 32/158* (2017.08);
(Continued)

(58) Field of Classification Search
CPC ....... C01B 32/18; C01B 32/16; C01B 32/184; C25B 11/02; C25B 1/135; C25B 9/09; D01F 9/12
(Continued)

(56) References Cited

U.S. PATENT DOCUMENTS

2014/0202874 A1   7/2014   Elgammal et al.
2018/0044183 A1   2/2018   Licht et al.
(Continued)

FOREIGN PATENT DOCUMENTS

CN      105386076 A      3/2016
CN      111005027 A      4/2020
(Continued)

OTHER PUBLICATIONS

Liu "Carbon Nano-Onions Made Directly from CO2 by Molten Electrolysis for Greenhouse Gas Mitigation." Adv sustainable systems . 3(10), Jul. 2019 (Year: 2019).*

Omurzak "Synthesis of Hollow Carbon Nano-Onions Using the Pulsed Plasma in Liquid."Journal of Nanoscience and Nanotechnology vol. 15, 3703-3709. (Year: 2015).*

(Continued)

*Primary Examiner* — Tri V Nguyen
(74) *Attorney, Agent, or Firm* — Chamberlain, Hrdlicka, White, Williams & Aughtry; Aly Z. Dossa

(57) ABSTRACT

A method for producing a carbon nanomaterial (CNM) product includes: heating an electrolyte media to obtain a molten electrolyte media; positioning the molten electrolyte media between a high-nickel content anode and a cathode of an electrolytic cell; introducing a source of carbon into the electrolytic cell; applying an electric current to the cathode and the anode in the electrolytic cell; and collecting the CNM product from the cathode, in which the CNM product comprises a minimal relative-amount of at least 70 wt %, as compared to a total weight of the CNM product, of hollow nano-onion product, in which the high-nickel content anode is made of pure nickel or an alloy that comprises greater than 50 wt % nickel.

5 Claims, 33 Drawing Sheets

Related U.S. Application Data

(60) Provisional application No. 63/300,499, filed on Jan. 18, 2022, provisional application No. 63/282,985, filed on Nov. 24, 2021.

(51) Int. Cl.

| | | |
|---|---|---|
| *B01D 71/02* | (2006.01) | |
| *B82Y 40/00* | (2011.01) | |
| *C01B 32/05* | (2017.01) | |
| *C01B 32/15* | (2017.01) | |
| *C01B 32/158* | (2017.01) | |
| *C01B 32/16* | (2017.01) | |
| *C01B 32/174* | (2017.01) | |
| *C01B 32/18* | (2017.01) | |
| *C01B 32/184* | (2017.01) | |
| *C25B 9/09* | (2021.01) | |
| *C25B 11/02* | (2021.01) | |
| *C25B 11/042* | (2021.01) | |
| *C25B 11/046* | (2021.01) | |
| *C25B 11/091* | (2021.01) | |
| *D01F 9/12* | (2006.01) | |
| *B82Y 30/00* | (2011.01) | |
| *H01B 1/04* | (2006.01) | |

(52) U.S. Cl.
CPC ............ *C01B 32/16* (2017.08); *C01B 32/174* (2017.08); *C01B 32/18* (2017.08); *C01B 32/184* (2017.08); *C25B 9/09* (2021.01); *C25B 11/02* (2013.01); *C25B 11/042* (2021.01); *C25B 11/046* (2021.01); *C25B 11/091* (2021.01); *D01F 9/12* (2013.01); *B01D 61/027* (2013.01); *B01D 71/0212* (2022.08); *B82Y 30/00* (2013.01); *B82Y 40/00* (2013.01); *C01B 2202/08* (2013.01); *C01B 2202/22* (2013.01); *C01B 2202/34* (2013.01); *C01B 2204/04* (2013.01); *C01P 2002/72* (2013.01); *C01P 2002/78* (2013.01); *C01P 2002/82* (2013.01); *C01P 2002/88* (2013.01); *C01P 2002/90* (2013.01); *C01P 2004/03* (2013.01); *C01P 2004/04* (2013.01); *C01P 2006/16* (2013.01); *C01P 2006/80* (2013.01); *H01B 1/04* (2013.01)

(58) Field of Classification Search
USPC ............................... 428/403; 423/445 R, 460
See application file for complete search history.

(56) References Cited

U.S. PATENT DOCUMENTS

| | | |
|---|---|---|
| 2019/0039040 A1 | 2/2019 | Licht |
| 2019/0271088 A1 | 9/2019 | Licht |
| 2020/0032404 A1 | 1/2020 | Licht |
| 2021/0348282 A1 | 11/2021 | Licht |
| 2022/0140340 A1 | 5/2022 | Kim et al. |

FOREIGN PATENT DOCUMENTS

| | | | |
|---|---|---|---|
| WO | 2018075123 A1 | 4/2018 | |
| WO | 2018093942 A1 | 5/2018 | |
| WO | 2020092449 A1 | 5/2020 | |
| WO | 2021087165 A1 | 5/2021 | |

OTHER PUBLICATIONS

N.S. Anas et al., "Tribological Performance of Al Alloys Dispersed with Carbon Nanotubes or Ni-Coated Carbon Nanotubes Produce by Mechanical Milling and Extrusion", Journal of Materials Engineering and Performance, ASM International, Materials Park, OH, US, vol. 29, No. 3, Mar. 1, 2020, pp. 1630-1639 (10 pages).
Johnson Marcus et al. "Data on SEM, TEM and Raman Spectra of doped, and wool carbon nanotubes made directly from CO2 by molten electrolysis", Materials Today Energy, Aug. 17, 2017, pp. 592-606 (15 pages).
Hongbian Li et al., "Carbon nanotube sponge filters for trapping nanoparticles and dye molecules from water", Chemical Communications, vol. 46, No. 42, Jan. 1, 2010 (Jan. 1, 2010), pp. 7966-7968, Retrieved from the Internet: URL: https://pubs.rsc.org/en/content/articlepdf/2010/ccc)cc03290e (3 pages).
Liu X. et al., "The green synthesis of exceptional braided, helical carbon nanotubes and nanospiral platelets made directly from CO2", Materials Today Chemistry, vol. 22, Sep. 3, 2021 (14 pages).
Xinye Liu et al., "Controlled Growth of Unusual Nanocarbon Allotropes by Molten Electrolysis of CO2", Catalysts, vol. 12, No. 2, Jan. 21, 2022 (28 pages).
Liu, Yanbiao, Guandao Gao, and Chad D. Vecitis., "Prospects of an Electroactive Carbon Nanotube Membrane toward Environmental Applications." Accounts of Chemical Research 53.12 (2020): 2892-2902.
Marcus Johnson et al., "Carbon nanotube wools made directly from CO2 by molten electrolysis: Value driven pathways to carbon dioxide greenhouse gas mitigation", Materials Today Energy, vol. 5, Sep. 1, 2017 (Sep. 1, 2017), pp. 230-236 (7 pages).
International Search Report and Written Opinion mailed Jun. 26, 2023, issued in the corresponding PCT Application No. PCT/US2022/050882 (25 pages).
International Search Report and Written Opinion mailed Jun. 23, 2023, issued in the corresponding PCT Application No. PCT/US2022/050884 (21 pages).
International Search Report and Written Opinion mailed Jun. 26, 2023, issued in the corresponding PCT Application No. PCT/US2022/050887 (19 pages).
International Search Report and Written Opinion mailed Jun. 23, 2023, issued in the corresponding PCT Application No. PCT/US2022/050897 (20 pages).
International Search Report and Written Opinion mailed Jun. 23, 2023, issued in the corresponding PCT Application No. PCT/US2022/050901 (21 pages).
Xirui Wang et al., "Calcium metaborate induced thin walled carbon nanotube syntheses from CO2 by molten carbonate electrolysis", Scientific Reports, (2020) 10:15146 (7 pages).
Wang, Lei, et al., "Capacitive deionization of NaCl solutions using carbon nanotube sponge electrodes." Journal of Materials Chemistry 21 (2011): 18295-18299 (5 pages).
Xirui Wang et al., "Exploration of alkali cation variation on the synthesis of carbon nanotubes by electrolysis of CO2 in molten carbonates", Journal of CO2 Utilization 34 (2019): 303-312 (10 pages).
Xirui Wang et al., "One pot facile transformation of CO2 to an unusual 3-D nano-scaffold morphology of carbon", Scientific Reports, (2020) 10:21518 (12 pages).
Zhang, Kai, et al., "Facile synthesis of high density carbon nanotube array by a deposition-growth-densification process." Carbon 114 (2017): 435-440 (6 pages).
Li, Hu et al., Fabrication of Concentric Carbon Nanotube Rings and Their Application on Regulating Cell Growth, ACS Omega, Year: 2019 (8 pages).

* cited by examiner

ELECTROLYSIS METHODS THAT UTILIZE CARBON DIOXIDE AND A HIGH NICKEL-CONTENT ANODE FOR MAKING DESIRED NANOCARBON ALLOTROPES

CROSS-REFERENCE TO RELATED APPLICATIONS

This application claims priority from U.S. Provisional Patent Application No. 63/282,985 Filed Nov. 24, 2021 and U.S. Provisional Patent Application No. 63/300,499 Filed Jan. 18, 2022, the entire disclosure of each is incorporated herein by reference. Further, this application is a divisional of U.S. patent application Ser. No. 17/993,275, filed Nov. 23, 2022, which is hereby incorporated by reference in its entirety.

TECHNICAL FIELD

This disclosure generally relates to the production of carbon nanomaterials. In particular, the disclosure relates to methods and apparatus for producing carbon nanomaterials of various allotropes using electrolysis.

BACKGROUND

Carbon nanotubes (CNTs) have the highest measured tensile strength (strength 93,900 MPa) of any material. Multi-walled CNTs consist of concentric walls of cylindrical graphene sheets. Graphene is a two-dimensional, honeycomb-structured material formed by a single layer of $sp^2$ hybrid orbital carbon atoms with a thickness of about 0.335 nm, which corresponds to the thickness of one carbon atom. Graphite, nanotubes, and fullerenes can be formed by graphene by, for example, wrapping and stacking.

Carbon nanomaterials (CNM) comprising a graphene structure have many useful properties including high strength, high electrical-conductivity, high thermal-conductivity, durability, hardness, flexibility, lubrication, and they can also be used as catalysts, and be chemically modified. The implication of these useful properties is that CNTs have a steady rise in their applications. For example, low (typically <<1%) concentrations of CNTs in structural materials can increase the strength of a range of structural materials such as cement, steel, plastics, wood, and aluminum. Because each of these materials can have a high carbon-footprint, a carbon composite with increased strength, or other useful properties, that requires no, little or less high foot carbon-print material may dramatically decrease the carbon-footprint. Other applications that take advantage of the useful properties of carbon nanomaterials include: cables or wires, electric vehicles, athletic equipment, medical applications, electronics, batteries, super capacitors, sensor, plastics, polymers, textiles, hydrogen storage and water treatment.

A known process by which CNTs are produced is chemical vapor deposition (CVD). However, CVD of CNTs is expensive-current estimates are costs of between $100K to $600K per tonne of produced CNT, CVD has a high carbon-footprint.

In addition to chemical vapor deposition (CVD), electrolysis reactions that use carbon dioxide ($CO_2$) and a lithium-carbonate electrolyte are also known processes for making CNTs. These electrolysis reactions may employ electrolysis potentials of less than 1 volt for splitting $CO_2$ in molten lithium-carbonate solutions to produce uniform CNTs and a carbon nanofiber (CNF) product at high coulombic efficiency. The $CO_2$ from the atmosphere can be directly converted to CNTs, as confirmed by isotope ($^{13}C$) tracking. The electrolytic splitting of $CO_2$ in molten lithium-carbonate can occur as direct carbon capture and conversion from the air without $CO_2$ pre-concentration, or with exhaust gas $CO_2$, or with concentrated $CO_2$. However, the product of the known electrolysis reactions may comprise different constituents of various physical forms, which are also referred to as nanostructures, morphologies or allotropes. Furthermore, products made with similar electrolysis operating-parameters can result in different physical forms and different relative proportions of the various physical forms.

SUMMARY

The embodiments of the present disclosure relate to methods and apparatus for producing a carbon nanomaterial product (CNM) product that comprises various carbon allotropes, such as: carbon nanotubes (CNTs), graphitic carbon, nano-bamboo, conical carbon nanofibers, nano-pearl carbon, coated CNTs, nano-onions, hollow nano-onions, nano-flowers, nano-dragons, branch and trunk CNTs (nano-trees), nano-belts, nano-rods, long and/or straight CNTs, high aspect ratio CNTs, thin CNTs and macroscopic assemblies of CNTs, including densely packed, straight CNTs, nano-sponges and nano-webs. The methods and apparatus employ carbon dioxide ($CO_2$) as a reactant in an electrolysis reaction in order to make these varied carbon nanomaterials (CNM). The embodiments of the present disclosure provide a wide range of controlled variations of the electrolysis methods and apparatus of the present disclosure to selectively provide a CNM product that has a high degree of purity of one or more of a desired allotrope.

Some embodiments of the present disclosure relate to a method for making a CNM product. The method comprises the steps of: heating a carbonate electrolyte to obtain a molten-carbonate electrolyte; positioning the molten carbonate electrolyte between an anode and a cathode in an electrolytic cell; applying an electrical current to the cathode and the anode in the electrolytic cell; and selecting from one or more of the following operating parameters: a composition or configuration of the cathode, a composition or configuration of the anode, an additive to be added to the electrolyte, a step of aging the electrolyte, a current density, a step of ramped changes (increases or decreases) in the current density, a time of applying the electrical current so that the CNM product comprises higher relative amount of a desired allotrope. Examples of the desired allotrope include, but are not limited to: carbon nanotubes (CNTs), graphitic carbon, nano-bamboo, conical carbon nanofibers, nano-pearl carbon, coated CNTs, nano-onions, hollow nano-onions, nano-flowers, nano-dragons, branch and trunk CNTs (nano-trees), nano-belts, nano-rods, long and/or straight CNTs, high aspect ratio CNTs, thin CNTs, macroscopic assemblies of CNTs or combinations thereof. The method further includes a step of collecting the CNM product from the cathode.

The methods and apparatus employ carbon dioxide ($CO_2$) as a reactant in an electrolysis reaction in order to make the various carbon allotropes. The embodiments of the present disclosure provide a wide range of controlled variations of the electrolysis methods and apparatus of the present disclosure to selectively provide a CNM product that has a high degree of purity of one or more of these allotropes. In the absence of sufficient $CO_2$, the carbonate electrolyte becomes the source of carbon and is consumed. The $CO_2$ may originate from an external gas, or where there is temporarily insufficient external $CO_2$ to support the desired electrolysis reaction, the source of carbon can originate from carbonate decomposition. Without being bound to any theory, the carbonate decomposition is in accord with $CO_3^{2-}$ disproportioning to $CO_2$ and an oxide, such as $O^{2-}$. In the latter case this oxide buildup acts as a reserve to remove excess $CO_2$ when it becomes available.

In some embodiments of the present disclosure, the method may be modified in order to dope the CNM product, including the desired allotrope therein. A doped allotrope has atoms of a doping component incorporated directly into the chemical structure of the doped allotrope, thereby imparting new or enhanced physical and/or chemical properties to the doped allotrope, when compared to a non-doped allotrope.

In some embodiments of the present disclosure, the method may be modified in order to make the CNM product responsive to an external magnetic-field, including the desired allotrope therein. A magnetic allotrope can incorporate atoms of a magnetic substance therein, by way of chemical addition and/or a carbide driven mechanism, so that the magnetic allotrope can move to align with a magnetic field when positioned in or near a source of the magnetic field.

Without being bound by any particular theory, some embodiments of the present disclosure provide new methods of synthesizing new allotropes of carbon by molten carbonate electrolysis using the greenhouse $CO_2$ as the reactant. Beyond the world of conventional diamond, graphite, and buckyballs, a vast array of unique nanocarbon structures exist and are being discovered. Until recently, $CO_2$ was thought to be unreactive. Here, it is shown that $CO_2$ can be transformed to distinct nano-bamboo, nano-pearl, nano-dragon, solid and hollow nano-onions, nano-trees, nano-rod, nano-belts and nano-flowers allotropes of carbon, among others. The capability to produce these allotropes at high purity by a straightforward electrolysis-analogous to aluminum production splitting of aluminum oxide but instead nanocarbon production by splitting of carbon dioxide-opens an array of inexpensive unique materials with the potential of providing new properties of high strength, new electrical properties, new thermal properties, new flexibility properties, new charge storage properties, new lubricant properties, and new robustness properties. Commercial production technology of nanocarbons has been chemical vapor deposition (CVD), which is ten-fold to a hundred-fold more expensive, generally requires metallo-organics reactants, and has a highly positive carbon footprint rather than carbon negative footprint. Different nanocarbon allotropes were prepared electrochemically by variation of anode and cathode composition and configuration, electrolyte composition, pre-electrolysis processing (ageing), and current ramping and current density.

Some embodiments of the present disclosure relate to a first method for producing a CNM product. The method comprises the steps of: heating an electrolyte media to obtain a molten electrolyte media; positioning the molten electrolyte media between a high-nickel content anode and a cathode of an electrolytic cell; introducing a source of carbon into the electrolytic cell; applying an electric current to the cathode and the anode in the electrolytic cell; and collecting the CNM product from the cathode. In these embodiments of the first method, the CNM product comprises a minimal relative-amount of at least 70 wt %, as compared to the total weight of the CNM product, of a desired allotrope selected from a group of a carbon nanotube (CNT) of a desired length, a curled CNT, conical carbon nanofiber, a nano-bamboo, a hollow nano-onion and a nano-tree.

Some embodiments of the present disclosure relate to the first method, wherein the anode is made of substantially pure nickel, wherein the cathode comprises copper, wherein the desired allotrope is the CNT of a desired length, and wherein the desired length is between about 30 μm and about 60 μm.

Some embodiments of the present disclosure relate to the first method, wherein the first method further comprises a step of adding an iron-containing salt to the electrolyte media or the molten electrolyte media.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is made of Nichrome C, wherein the electric current is applied at a current density of between about 0.1 A/cm² and about 0.2 A/cm² the desired allotrope is the CNT of a desired length, and wherein the desired length is between about 50 μm and about 100 μm.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is made of Nichrome A, the desired allotrope is the CNT of a desired length, and wherein the desired length is between about 20 μm and about 80 μm.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is made of Nichrome C, wherein the electric current is applied at a current density of between about 0.1 A/cm² and about 0.2 A/cm², the desired allotrope is the CNT of a desired length, and wherein the desired length is between about 10 μm and about 30 μm.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is made of Nichrome C, wherein the electric current is applied at a current density of between about 0.1 A/cm² and about 0.75 A/cm², the desired allotrope is the CNT of a desired length, and wherein the desired length is between about 100 μm and about 200 μm.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is made of Nichrome C, wherein the electric current is applied at a current density of between about 0.05 A/cm² and about 0.2 A/cm², the desired allotrope is the CNT of a desired length, and wherein the desired length is between about 30 μm and about 60 μm.

Some embodiments of the present disclosure relate to the first method, wherein the iron-containing salt is added in an amount of between about 0.01 wt % and about 1 wt %, relative to the amount of the electrolyte media or the molten electrolyte media, wherein the anode is made of Nichrome C, the desired allotrope is a mixture of CNTs and the curled CNT and wherein a relative-amount of the curled CNT is at least 25 wt % of the total weight of the CNM product.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is a composite anode comprising a first layer of Inconel 625 and at least a second layer of Inconel 600, the desired allotrope is the CNT of a desired length, and wherein the desired length is between about 10 μm and about 100 μm.

Some embodiments of the present disclosure relate to the first method, wherein the iron-containing salt is added in an amount of between about 0.01 wt % and about 5 wt %, relative to the amount of the electrolyte media or the molten electrolyte media, wherein the anode is a composite anode comprising a first layer of a first Inconel alloy and at least a second layer of a second Inconel alloy, the desired allotrope is the CNT of a desired length, and wherein the desired length is between about 100 μm and about 500 μm.

Some embodiments of the present disclosure relate to the first method, wherein the iron-containing salt is added in an amount of between about 0.01 wt % and about 5 wt %, relative to the amount of the electrolyte media or the molten electrolyte media, further comprising a step of adding between about 0.01 wt % and about 5 wt %, of a nickel-containing additive to the electrolyte media, and wherein the desired allotrope is the curled CNT.

Some embodiments of the present disclosure relate to the first method, wherein the anode is an Inconel alloy.

Some embodiments of the present disclosure relate to the first method, wherein the anode is a composite anode comprising a first layer of a first Inconel alloy and at least a second layer of a second Inconel alloy.

Some embodiments of the present disclosure relate to the first method, wherein the anode and the cathode are both made of substantially pure nickel and the desired allotrope is a mixture of nano-bamboo and carbon nanotubes.

Some embodiments of the present disclosure relate to the first method, further comprising a step of adding a nickel-containing additive to the electrolyte media or the molten electrolyte media, relative to the amount of the electrolyte media or the molten electrolyte media, wherein the anode is a composite anode comprising a first layer of Inconel 718 and at least a second layer of Inconel 600, and wherein the desired allotrope is the nano-bamboo.

Some embodiments of the present disclosure relate to the first method, wherein the molten electrolyte is freshly melted and the CNM product further comprises a conical carbon nanotube allotrope.

Some embodiments of the present disclosure relate to the first method further comprise a step of adding a nickel-containing additive to the electrolyte media or the molten electrolyte media, wherein the anode is a composite anode comprising a first layer of Inconel 718 and at least a second layer of Inconel 600, and wherein the desired allotrope is the nano-bamboo.

Some embodiments of the present disclosure relate to the first method further comprise a step of introducing a lithium-containing additive into the electrolyte media or the molten electrolyte media, wherein the anode is a composite anode comprising a first layer of Inconel 718 and at least a second layer of Inconel 600, and wherein the desired allotrope is the nano-tree.

Some embodiments of the present disclosure relate to the first method, wherein the lithium-containing additive is lithium oxide that is added in an amount between about 0.05 wt % and 0.5 wt %, relative to the amount of the electrolyte media or the molten electrolyte media.

Some embodiments of the present disclosure relate to the first method further comprise a step of adding a nickel-containing additive to the electrolyte media or the molten electrolyte media, wherein the anode is made of Nichrome C, wherein the electric current is applied at a current density of between about 0.05 A/cm$^2$ and 0.12 A/cm$^2$, and wherein the desired allotrope is the CNT of a hollow nano-onion.

Some embodiments of the present disclosure relate to the first method further comprise a step of introducing a magnetic additive component into the electrolytic cell, wherein the magnetic additive component comprises a magnetic material addition component, a carbide-growth component or any combination thereof and wherein the desired allotrope is magnetic and moves when in a magnetic field.

Some embodiments of the present disclosure relate to the first method further comprise a step of introducing a doping additive component into the electrolytic cell, wherein the desired allotrope is doped and atoms of the doping additive component are directly incorporated throughout the doped desired allotrope to impart desired physical and/or chemical properties to the doped desired allotrope that are different than an undoped desired allotrope.

Some embodiments of the present disclosure relate to a first CNM that comprises a nano-bamboo, wherein the nano-bamboo comprises multiple graphene layers positioned between pairs of bamboo knobs.

In these embodiments of the first CNM, the nano-bamboo has an $I_D/I_G$ ratio of at least 1, as measured by Raman spectroscopy.

Some embodiments of the present disclosure relate to a second CNM that comprises a nano-tree, wherein the nano-tree comprises a trunk CNT with a plurality of branch CNTs that extend away from the trunk CNT.

In these embodiments of the second CNM, the nano-tree has an $I_D/I_G$ ratio of between about 0.7 and about 0.9, as measured by Raman spectroscopy.

In these embodiments of the second CNM, the second CNM further comprises bent graphene layers positioned proximal an intersection of each of the plurality of branch CNT and the trunk CNT.

Some embodiments of the present disclosure relate to a third CNM that comprises one or more of a high-aspect ratio carbon nanotube (CNT) with an aspect ratio of greater than 1000, a nano-bamboo; a conical CNTs; a curled CNT, a curled carbon nanofibers, or a nano-tree.

Some embodiments of the present disclosure relate to a fourth CNM that comprise a hollow nano-onion that defines an internal core.

In these embodiments of the fourth CNM, the internal core can be substantially empty.

In these embodiments of the fourth CNM, the internal core can contain metal, wherein the metal is iron, nickel or a combination thereof.

In these embodiments of the fourth CNM, the hollow nano-onion has an $I_D/I_G$ ratio of between about 0.2 to about 0.4, as measured by Raman spectroscopy.

Some embodiments of the present disclosure relate to a use of a desired nano-carbon allotrope in one or more of a medical device, a structural enhancement additive, a strength enhancement additive, an electrical conductivity enhancement additive, a thermal conductivity enhancement additive, or a flexibility enhancement additive, a hardness enhancement additive, a durability enhancement additive, a lubrication enhancement additive, or as a catalyst, electric vehicles, cables or wires, athletic equipment, a pharmaceutical drug delivery system, an electronic, a battery, a super capacitor, a sensor, a plastic, a polymer, a textile, a hydrogen storage system, a light absorbing enhancement for a surface, an electromagnetic shielding enhancement for a surface, a surface treatment, a surface coating, a paint or a water treatment system, wherein the desired allotrope is selected from a group of a carbon nanotube (CNT) of a desired length, a curled CNT, conical carbon nanofiber, a nano-bamboo, a hollow nano-onion and a nano-tree.

Some embodiments of the present disclosure second method for producing a macro-assembly product. The second method comprising the steps of: heating an electrolyte media to obtain a molten electrolyte media; positioning the molten electrolyte media between an anode and a cathode of an electrolytic cell; introducing a source of carbon into the electrolytic cell; applying an electrical current to the cathode and the anode in the electrolytic cell; and collecting the CNM product from the cathode. In the embodiments that relate to the second method, the CNM product comprises the macro-assembly product that comprises a minimum relative-amount of a nano-sponge, densely packed, substantially parallel carbon nanotubes (CNTs) or a nano-web of CNTs.

Some embodiments of the present disclosure relate to the second method, wherein the anode the cathode are each made of a high nickel-content material, wherein the CNM product comprises the nano-sponge and wherein the minimum relative-amount is at least 70% of the total weight of the CNM product.

Some embodiments of the present disclosure relate to the second method, wherein the electrical current is applied in a first stage of increasing current density and a second stage of a higher and substantially constant current density.

Some embodiments of the present disclosure relate to the second method, wherein during the first stage the current density increases between about 0.005 $A/cm^2$ to about 0.07 $A/cm^2$ over about twenty minutes.

Some embodiments of the present disclosure relate to the second method, wherein the higher and substantially constant current density is between about 0.1 $A/cm^2$ and 0.3 $A/cm^2$.

Some embodiments of the present disclosure relate to the second method, further comprising a step of adding a nickel-containing additive to the electrolyte media or the molten electrolyte media.

Some embodiments of the present disclosure relate to the second method, wherein the nickel-containing additive is added in an amount of between about 0.5 wt % and about 0.2 wt %, relative to the amount of the electrolyte media or the molten electrolyte media.

Some embodiments of the present disclosure relate to the second method, wherein the high nickel content material is a Nichrome alloy.

Some embodiments of the present disclosure relate to the second method, wherein the anode is made of a high nickel-content material, wherein the CNM product comprises the nano-web of CNTs.

Some embodiments of the present disclosure relate to the second method, wherein the cathode comprises copper.

Some embodiments of the present disclosure relate to the second method, further comprising a step of adding a nickel-containing additive to the electrolyte media or the molten electrolyte media.

Some embodiments of the present disclosure relate to the second method, wherein the nickel-containing additive is added in an amount of between about 0.5 wt % and about 2 wt %, relative to the amount of the electrolyte media or the molten electrolyte media.

Some embodiments of the present disclosure relate to the second method, wherein the electrical current is applied at a current density of between about 0.1 and 0.5 $A/cm^2$.

Some embodiments of the present disclosure relate to the second method, wherein the current density is 0.2 $A/cm^2$.

Some embodiments of the present disclosure relate to the second method, further comprising a step of adding an iron-containing additive to the molten electrolyte media and wherein the anode is a composite anode.

Some embodiments of the present disclosure relate to the second method, wherein the iron-containing additive is added in an amount of about 0.5 wt % to about 2 wt %, relative to the amount of the electrolyte media or the molten electrolyte media.

Some embodiments of the present disclosure relate to the second method, wherein the composite anode comprises a first layer of a first Inconel alloy and at least a second layer of a second Inconel alloy, and wherein the CNM product comprises the densely packed, substantially parallel CNTs.

Some embodiments of the present disclosure relate to the second method, wherein the composite anode comprises a first layer of a Nichrome alloy and at least a second layer of an Inconel alloy, wherein the desired allotrope is the CNT of a desired length, and wherein the CNM product comprises the densely packed, substantially parallel CNTs.

Some embodiments of the present disclosure relate to the second method further comprising a step of introducing a magnetic additive component into the electrolytic cell, wherein the magnetic additive component comprises a magnetic material addition component, a carbide-growth component or any combination thereof and wherein the macro-assembly product is magnetic and moves when in a magnetic field.

Some embodiments of the present disclosure relate to the second method further comprising a step of introducing a doping additive component into the electrolytic cell, wherein the macro-assembly product is doped and atoms of the doping additive component are directly incorporated throughout the doped macro-assembly product to impart desired physical and/or chemical properties to the doped macro-assembly product that are different than an undoped macro-assembly product.

Some embodiments of the present disclosure relate to a first macro-assembly that comprises a nano-sponge that defines pores with a size of between about 50 nm to about 300 nm.

Some embodiments of the present disclosure relate to a second macro-assembly that comprises a macro-assembly comprising a nano-sponge that defines pores with a size of between about 100 nm to about 500 nm.

Some embodiments of the present disclosure relate to the first (or second) macro-assembly, wherein the nano-sponge has an $I_D/I_G$ ratio of between about 0.6 to about 0.8, as measured by Raman spectroscopy.

Some embodiments of the present disclosure relate to a third macro-assembly comprising a nano-web that defines pores with a size of between about 200 nm to about 1 μm.

Some embodiments of the present disclosure relate to the third macro-assembly, wherein the nano-web has an $I_D/I_G$ ratio of between about 0.2 to about 0.4, as measured by Raman spectroscopy.

Some embodiments of the present disclosure relate to a fourth macro-assembly of that comprises multiple, densely packed, substantially parallel CNTs that define inter-CNT spacing of between about 50 nm to about 300 nm.

Some embodiments of the present disclosure relate to the fourth macro-assembly, wherein the multiple, densely packed, substantially parallel CNTs have an $I_D/I_G$ ratio of between about 0.4 to about 0.6, as measured by Raman spectroscopy.

Some embodiments of the present disclosure relate to a use of the first, or second or third macro-assembly for nano-filtration.

Some embodiments of the present disclosure relate to a use of the fourth macro-assembly for nano-filtration or as conductive wires in an artificial neural net.

Some embodiments of the present disclosure relate to a third method for producing a CNM product. The method comprises the steps of: heating an electrolyte media to obtain a molten electrolyte media; positioning the molten electrolyte media between a high-nickel content anode and a copper-containing cathode of an electrolytic cell; introducing a source of carbon into the electrolytic cell; introducing an iron-containing salt into the electrolyte media or the molten electrolyte media; applying a low current-density, electrical current to the cathode and the anode in the electrolytic cell; and collecting the CNM product from the cathode. In these embodiments of that relate to the third method, the CNM product comprises a minimum relative-amount of a desired allotrope that is a carbon nano-dragon or a carbon nano-belt.

Some embodiments of the present disclosure relate to the third method, wherein the iron-containing salt is added in an amount of between about 0.05 wt % to about 2 wt %, relative to the amount of the electrolyte media or the molten electrolyte media.

Some embodiments of the present disclosure relate to the third method, wherein the iron-containing salt is iron oxide.

Some embodiments of the present disclosure relate to the third method, wherein the anode is an Inconel alloy.

Some embodiments of the present disclosure relate to the third method, wherein the low current-density, electrical current has a current density of between about 0.3 A/cm$^2$ to about 0.75 A/cm$^2$, wherein the desired allotrope is the nano-dragon and wherein the minimum relative-amount is at least 70 wt % of a total weight of the CNM product.

Some embodiments of the present disclosure relate to the third method, wherein the copper-containing cathode is a Monel alloy.

Some embodiments of the present disclosure relate to the third method, wherein the low current-density, electrical current is applied for about 4 hours.

Some embodiments of the present disclosure relate to the third method further comprising a step of ageing the molten electrolyte media for at least 24 hours, wherein the iron oxide is added before the aging step, wherein the low current-density, electrical current has a current density of between about 0.05 A/cm$^2$ and 0.15 A/cm$^2$, wherein the desired allotrope is the nano-belt and wherein the minimum relative-amount is at least 90 wt % of a total weight of the CNM product.

Some embodiments of the present disclosure relate to the third method, wherein the copper-containing cathode comprises Muntz brass.

Some embodiments of the present disclosure relate to the third method, wherein the low current-density, electrical current is applied for between about 15 hours and about 20 hours.

Some embodiments of the present disclosure relate to the third method further comprising a step of introducing a magnetic additive component into the electrolytic cell, wherein the magnetic additive component comprises a magnetic material addition component, a carbide-growth component or any combination thereof and wherein the desired allotrope is magnetic and moves when in a magnetic field.

Some embodiments of the present disclosure relate to the third method further comprising a step of introducing a doping additive component into the electrolytic cell, wherein the desired allotrope is doped and atoms of the doping additive component are directly incorporated throughout the doped desired allotrope to impart desired physical and/or chemical properties to the doped desired allotrope that are different than an undoped desired allotrope.

Some embodiments of the present disclosure relate to a fifth CNM that comprises a nano-dragon, wherein the nano-dragon has an elongated body CNT with at least one protrusion that extend away from the elongated body CNT.

Some embodiments of the present disclosure relate to the fifth CNM, wherein the at least one protrusion is multiple protrusions.

Some embodiments of the present disclosure relate to the fifth CNM, wherein each of the at least one protrusion comprise a branched CNT, a nodule of metal growth or any combination thereof.

Some embodiments of the present disclosure relate to the fifth CNM, wherein the nano-dragon has an $I_D/I_G$ ratio of between about 0.6 and about 0.8, as measured by Raman spectroscopy.

Some embodiments of the present disclosure relate to a sixth CNM that comprises a nano-belt with an $I_D/I_G$ ratio of about 0.67, as measured by Raman spectroscopy.

Some embodiments of the present disclosure relate to a use of a desired nano-carbon allotrope in one or more of a medical device, a structural enhancement additive, a strength enhancement additive, an electrical conductivity enhancement additive, a thermal conductivity enhancement additive, or a flexibility enhancement additive, a hardness enhancement additive, a durability enhancement additive, a lubrication enhancement additive, or as a catalyst, electric vehicles, cables or wires, athletic equipment, a pharmaceutical drug delivery system, an electronic, a battery, a super capacitor, a sensor, a plastic, a polymer, a textile, a hydrogen storage system, a light absorbing enhancement for a surface, an electromagnetic shielding enhancement for a surface, a surface treatment, a surface coating, a paint or a water treatment system, wherein the desired allotrope is a carbon nano-dragon or a carbon nano-belt.

Some embodiments of the present disclosure relate to a fourth method for producing a CNM product. The fourth method comprising the steps of: heating an electrolyte media to obtain a molten electrolyte media; positioning the molten electrolyte media between an anode and a cathode of an electrolytic cell; introducing a source of carbon into the electrolytic cell; introducing an iron-free additive into the electrolyte media or the molten electrolyte media; applying a electrical current to the cathode and the anode in the electrolytic cell; and collecting the CNM product from the cathode. In these embodiments that relate to the fourth method, the CNM product comprises a minimum relative-amount of a desired allotrope selected from a group of a thin carbon nanotube (CNT), a nano-bamboo, a nano-rod a nano-onion and a nano-flower.

Some embodiments of the present disclosure relate to the fourth method, wherein the anode is a corrosion-resistant anode.

Some embodiments of the present disclosure relate to the fourth method, wherein the corrosion-resistant anode comprises a noble metal.

Some embodiments of the present disclosure relate to the fourth method, wherein the electrical current has a current density of between about 0.05 A/cm$^2$ and 0.15 A/cm$^2$.

Some embodiments of the present disclosure relate to the fourth method, wherein the iron-free additive is a chromium-containing additive that is added in an amount of between about 0.05 wt % to about 2 wt %, relative to the amount of the electrolyte media or the molten electrolyte media and the desired allotrope is thin CNTs with a length of between about 25 μm to about 125 μm, and wherein the minimum relative-amount is greater than 70%, relative to the total weight of the CNM product.

Some embodiments of the present disclosure relate to the fourth method, wherein the cathode comprises a Monel alloy.

Some embodiments of the present disclosure relate to the fourth method, wherein the iron-free additive is a nickel-containing additive that is added in an amount of between about 0.05 wt % to about 2 wt %, relative to the amount of the electrolyte media or the molten electrolyte media and the desired allotrope is the nano-rod, and wherein the minimum relative-amount is greater than 70%, relative to the total weight of the CNM product.

Some embodiments of the present disclosure relate to the fourth method, wherein the cathode comprises a Monel alloy.

Some embodiments of the present disclosure relate to the fourth method, wherein the molten electrolyte media is freshly melted.

Some embodiments of the present disclosure relate to the fourth method, wherein the step of applying the electrical current occurs for between 15 and 25 hours.

Some embodiments of the present disclosure relate to the fourth method, wherein the iron-free additive is a nickel-containing additive and a chromium-containing additive, each of which is added in an amount of between about 0.05 wt % to about 2 wt %, relative to the amount of the electrolyte media or the molten electrolyte media and the desired allotrope is the nano-bamboo, and wherein the minimum relative-amount is between about 50 wt % and about 80 wt %, relative to the total weight of the CNM product.

Some embodiments of the present disclosure relate to the fourth method, wherein the cathode comprises Muntz brass.

Some embodiments of the present disclosure relate to the fourth method, wherein the iron-free additive is a lithium-containing additive added in an amount of between about 1 wt % to about 10 wt % relative to the amount of the electrolyte media or the molten electrolyte media and the desired allotrope is the nano-onion, and wherein the minimum relative-amount is between about 70 wt % and about 99 wt %, relative to the total weight of the CNM product.

Some embodiments of the present disclosure relate to the fourth method, wherein the lithium-containing additive is lithium phosphate.

Some embodiments of the present disclosure relate to the fourth method, wherein the anode comprises a Nichrome alloy.

Some embodiments of the present disclosure relate to the fourth method, wherein the cathode comprises copper.

Some embodiments of the present disclosure relate to the fourth method, wherein the iron-free additive is a cobalt-containing additive added in an amount of between about 0.01 wt % to about 5 wt % relative to the amount of the electrolyte media or the molten electrolyte media and the desired allotrope is the nano-flower, and wherein the minimum relative-amount is between about 70 wt % and about 99 wt %, relative to the total weight of the CNM product.

Some embodiments of the present disclosure relate to the fourth method, wherein the cobalt-containing additive is cobalt powder and the molten electrolyte is aged.

Some embodiments of the present disclosure relate to the fourth method, wherein the anode comprises a Nichrome alloy.

Some embodiments of the present disclosure relate to the fourth method, wherein the cathode comprises copper.

Some embodiments of the present disclosure relate to the fourth method further comprising a step of introducing a magnetic additive component into the electrolytic cell, wherein the magnetic additive component comprises a magnetic material addition component, a carbide-growth component or any combination thereof and wherein the desired allotrope is magnetic and moves when in a magnetic field.

Some embodiments of the present disclosure relate to the fourth method further comprising a step of introducing a doping additive component into the electrolytic cell, wherein the desired allotrope is doped and atoms of the doping additive component are directly incorporated throughout the doped desired allotrope to impart desired physical and/or chemical properties to the doped desired allotrope that are different than an undoped desired allotrope.

Some embodiments of the present disclosure relate to a seventh CNM that comprises a nano-rod, wherein the nano-rod has a squat, ring-like shape.

Some embodiments of the present disclosure relate to the seventh CNM wherein the nano-rod comprises both carbon and oxygen.

Some embodiments of the present disclosure relate to the seventh CNM, wherein the amount of oxygen within the nano-rod is between about 5 wt % and 12 wt %.

Some embodiments of the present disclosure relate to the seventh CNM wherein the nano-rod has an $I_D/I_G$ ratio of between about 0.6 to about 0.9, as measured by Raman spectroscopy.

Some embodiments of the present disclosure relate to an eighth CNM that comprises a nano-flower, wherein the nano-flower comprises multiple, frustoconical carbon nanotubes (CNTs) that originate from a single point of origin, wherein each frustoconical CNT has a diameter that decreases as the CNT extends away from the point of origin, wherein the nano-flower has an $I_D/I_G$ ratio of between about 0.6 to about 0.9, as measured by Raman spectroscopy.

Some embodiments of the present disclosure relate to a use of a desired nano-carbon allotrope in one or more of a medical device, a structural enhancement additive, a strength enhancement additive, an electrical conductivity enhancement additive, a thermal conductivity enhancement additive, or a flexibility enhancement additive, a hardness enhancement additive, a durability enhancement additive, a lubrication enhancement additive, or as a catalyst, electric vehicles, cables or wires, athletic equipment, a pharmaceutical drug delivery system, an electronic, a battery, a super capacitor, a sensor, a plastic, a polymer, a textile, a hydrogen storage system, a light absorbing enhancement for a surface, an electromagnetic shielding enhancement for a surface, a surface treatment, a surface coating, a paint or a water treatment system, wherein the desired allotrope selected from a group of a thin carbon nanotube (CNT), a nano-bamboo, a nano-rod, a nano-onion and a nano-flower.

Some embodiments of the present disclosure relate to a fifth method for producing a CNM product. The fifth method comprises the steps of: heating an electrolyte media to obtain a molten electrolyte media; positioning the molten electrolyte media between an anode and a steel cathode of an electrolytic cell; introducing a source of carbon into the electrolytic cell; applying a electrical current to the cathode and the anode in the electrolytic cell; and collecting the CNM product from the cathode. In these embodiments that relate to the fifth method, the CNM product comprises a minimum relative-amount of a metal-coated CNM product.

Some embodiments of the present disclosure relate to the fifth method further comprising a step of introducing an excessive amount of a metal into the molten electrolyte media.

Some embodiments of the present disclosure relate to the fifth method, wherein the excessive amount of metal is introduced by introducing a metal-containing additive, introducing the excessive amount of metal by degrading an inner wall of the electrolytic cell, introducing the excessive amount of metal by degrading the anode or any combination thereof.

Some embodiments of the present disclosure relate to the fifth method, wherein the metal is nickel, iron, titanium, tin, copper, vanadium, cobalt, zinc, magnesium, aluminum, ruthenium, silver, iridium, palladium, rhodium, or platinum.

Some embodiments of the present disclosure relate to the fifth method, wherein the metal is introduced as a metal mix, a metal oxide, a metal salt, or any combination thereof.

Some embodiments of the present disclosure relate to the fifth method, wherein the electrical current has a current density of between about 0.1 A/cm$^2$ and about 0.3 A/cm$^2$.

Some embodiments of the present disclosure relate to the fifth method, wherein the steel cathode comprises galvanized steel, stainless steel or any combination thereof.

Some embodiments of the present disclosure relate to the fifth method, further comprising a step of introducing a metal additive into the electrolyte media or the molten electrolyte media.

Some embodiments of the present disclosure relate to the fifth method, wherein the metal additive is added in an amount of between about 0.25 wt % and 1.5 wt %, relative to the amount of the electrolyte media or the molten electrolyte media.

Some embodiments of the present disclosure relate to the fifth method, wherein the metal additive is a nickel-containing additive.

Some embodiments of the present disclosure relate to the fifth method, wherein the anode comprises nickel.

Some embodiments of the present disclosure relate to the fifth method, wherein the anode has a high-nickel content.

Some embodiments of the present disclosure relate to the fifth method, further comprising a step of adding a nickel-containing additive, wherein the anode comprises a Nichrome alloy and the minimum relative-amount of the metal coated CNT is between about 5 wt % and 99.5 wt % of the total weight of the CNM product.

Some embodiments of the present disclosure relate to the fifth method, wherein the anode is made of substantially pure nickel.

Some embodiments of the present disclosure relate to the fifth method, wherein the metal-coated CNM is magnetic and moves when in a magnetic field.

Some embodiments of the present disclosure relate to the fifth method, further comprising a step of introducing a doping additive component into the electrolytic cell, wherein the metal-coated CNM is doped and atoms of the doping additive component are directly incorporated throughout the doped, coated CNM to impart desired physical and/or chemical properties to the doped, metal-coated CNM that are different than an undoped, coated CNT.

Some embodiments of the present disclosure relate to a ninth CNM that comprises a metal-coated CNT.

Some embodiments of the present disclosure relate to a tenth CNM that comprises a metal-coated graphitic carbon, a metal-coated nano-bamboo, a metal-coated conical carbon nanofiber, a metal-coated nano-pearl, a metal-coated nano-onion, a metal-coated hollow nano-onion, a metal-coated nano-flower, a metal-coated nano-dragon, a metal-coated branch and trunk CNT (a metal-coated nano-tree), a metal-coated nano-belt, a metal-coated nano-rod, a metal-coated long and/or straight CNT, a metal-coated high aspect ratio CNT, a metal-coated thin CNT and a macroscopic assembly of CNTs, including densely packed, straight metal-coated CNTs, a metal-coated nano-sponge, a metal-coated nano-web or any combination thereof.

Some embodiments of the present disclosure relate to the ninth and tenth CNM, wherein the metal coated CNM comprises an external coating of nickel.

Some embodiments of the present disclosure relate to a use of a desired metal-coated allotrope in one or more of a medical device, a structural enhancement additive, a strength enhancement additive, an electrical conductivity enhancement additive, a thermal conductivity enhancement additive, or a flexibility enhancement additive, a hardness enhancement additive, a durability enhancement additive, a lubrication enhancement additive, or as a catalyst, electric vehicles, cables or wires, athletic equipment, a pharmaceutical drug delivery system, an electronic, a battery, a super capacitor, a sensor, a plastic, a polymer, a textile, a hydrogen storage system, a light absorbing enhancement for a surface, an electromagnetic shielding enhancement for a surface, a surface treatment, a surface coating, a paint or a water treatment system, wherein the desired allotrope is a metal-coated CNT, a metal-coated graphitic carbon, a metal-coated nano-bamboo, a metal-coated conical carbon nanofiber, a metal-coated nano-pearl, a metal-coated nano-onion, a metal-coated hollow nano-onion, a metal-coated nano-flower, a metal-coated nano-dragon, a metal-coated branch and trunk CNT (a metal-coated nano-tree), a metal-coated nano-belt, a metal-coated nano-rod, a metal-coated long and/or straight CNT, a metal-coated high aspect ratio CNT, a metal-coated thin CNT and a macroscopic assembly of CNTs, including densely packed, straight metal-coated CNTs, a metal-coated nano-sponge, a metal-coated nano-web or any combination thereof.

Without being bound by any particular theory, the embodiments of the present disclosure provide methods for making a CNM product that has a minimum relative-amount, and in some instances a high purity, of a desired nano-carbon allotrope within the CNM product. In some embodiments of the present disclosure, the methods can be scaled-up to make never before seen amounts of the CNM product with a minimal relative-amount, or a high purity, of the desired nano-carbon allotrope. With such methods available, it is now possible to make large amounts of the desired allotrope and, therefore, it is now possible to consider the various practical uses and applications of such allotropes. In some embodiments of the present disclosure, the desired allotropes can be used in various applications, including but not limited to one or more of: a medical device, a structural enhancement additive, a strength enhancement additive, an electrical conductivity enhancement additive, a thermal conductivity enhancement additive, or a flexibility enhancement additive, a hardness enhancement additive, a durability enhancement additive, a lubrication enhancement additive, or as a catalyst, electric vehicles, cables or wires, athletic equipment, a pharmaceutical drug delivery system, an electronic, a battery, a super capacitor, a sensor, a plastic, a polymer, a textile, a hydrogen storage system or a water treatment system.

Typically, the skilled person would not reasonably consider modifying an established process, such as the known electrolysis process of the applicant for creating carbon nanomaterials using $CO_2$, as the complexity of such processes can become overwhelming without any promise of results. Surprisingly, the embodiments of the present disclosure provide a wide range of controlled variations of the electrolysis operational parameters, such as variations of methods and apparatus, which successfully provide unexpected high purities of the constituent structures within the CNM product and unusual forms of the constituent structures. Such controlled variations include, but are not limited to: varied cathode components and compositions, complex anode components and compositions, multiple electrolyte additives, variable electrolysis conditions or combinations thereof.

BRIEF DESCRIPTION OF THE DRAWINGS

These and other features of the present disclosure will become more apparent in the following detailed description in which reference is made to the appended drawings.

DETAILED DESCRIPTION

Figure 1:
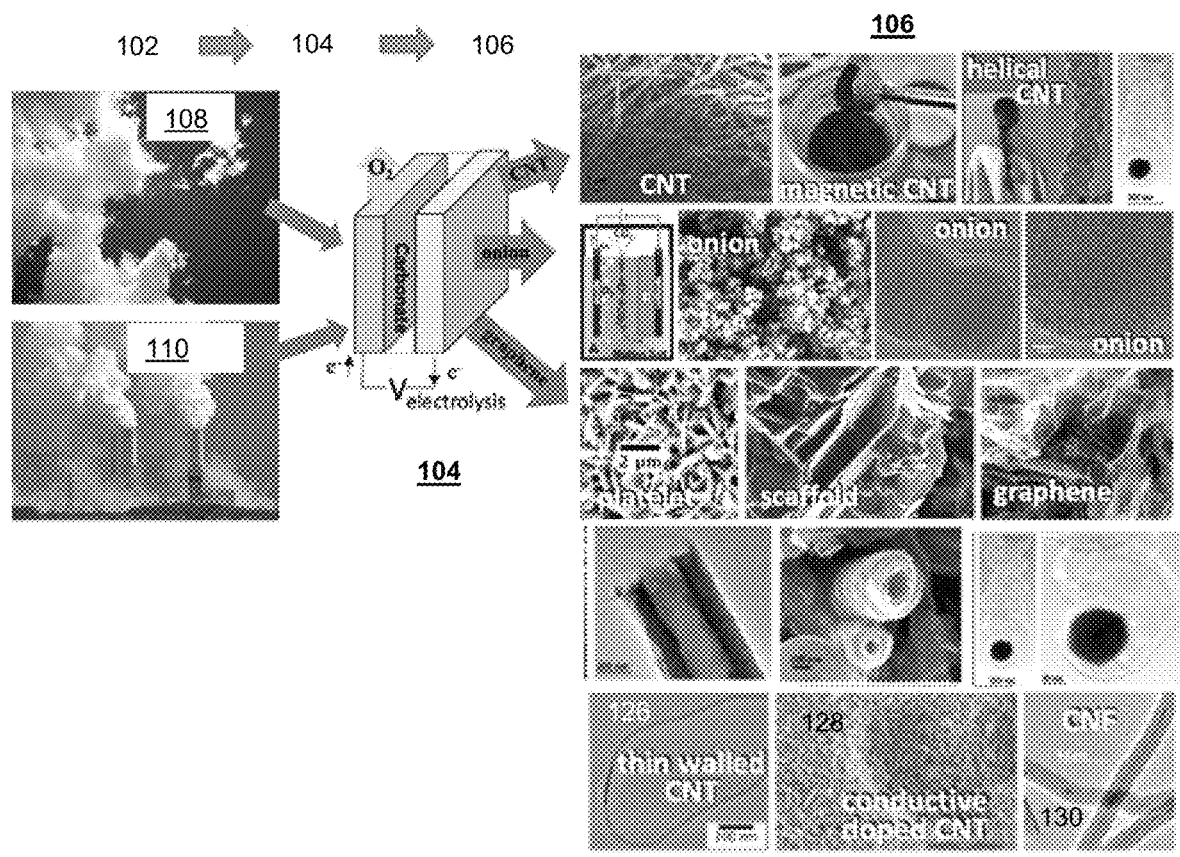
FIG. 1 is a schematic that shows various inputs and product outputs of high yield, electrolytic synthesis of carbon nanomaterials from carbon dioxide.

The embodiments of the present disclosure relate to methods and apparatus for producing a carbon nanomaterial (CNM) product that comprises various desired carbon allotropes, such as: carbon nanotubes (CNTs), graphitic carbon, nano-bamboo, conical carbon nanofibers, nano-pearl carbon, coated CNTs, nano-onions, hollow nano-onions, nano-flowers, nano-dragons, branch and trunk CNTs (nano-trees), nano-belts, nano-rods, long and/or straight CNTs, high aspect ratio CNTs, thin CNTs and macroscopic assemblies of CNTs. The methods and apparatus employ carbon dioxide ($CO_2$) as a reactant in an electrolysis reaction in order to make these varied constituents of the CNM product. The embodiments of the present disclosure provide a range of controlled variations of the electrolysis methods and apparatus of the present disclosure to selectively provide a CNM product that has a high degree of purity of one or more of these allotropes. FIG. 1 provides a chart that depicts different CNM products that can be made by electrolytic synthesis using carbon dioxide. In summary, FIG. 1 depicts how $CO_2$ can act as a source of carbon 102 with the $CO_2$ being captured from the atmosphere 108 or from more concentrated sources, such as flue gas or other industrial waste-streams 110 that are concentrated sources of $CO_2$. As will be appreciated by those skilled in the art, any source of carbon, including in a solid, gas or liquid phase, are contemplated herein. The carbon, such as $CO_2$, is then introduced into an electrolytic cell, where the electrolysis reaction 104 occurs within a molten carbonate electrolyte media. The products of the electrolysis reaction 104 can include oxygen and the CNM product 106. Depending on the specific operating parameters of the electrolysis reaction 104, the CNM product 106 can comprise a desired relative amount of a desired allotrope.

Some embodiments of the present disclosure relate to methods and apparatus for producing a CNM product that comprises various desired carbon allotropes, with a higher relative amount of a specific desired carbon allotrope. For example, the higher relative amount of a first desired carbon allotrope may be at least 20 wt % (based upon the weight of the first desired carbon allotrope as compared to the total weight of the CNM product). In some embodiments of the present disclosure, the higher relative amount of the first desired carbon allotrope may be at least 25 wt %, at least 30 wt %, at least 35 wt %, at least 40 wt %, at least 50 wt %, at least 60 wt %, at least 70 wt %, at least 80 wt %, at least 90 wt %, at least 91 wt %, at least 92 wt %, at least 93 wt %, at least 94 wt %, at least 95 wt %, at least 96 wt %, at least 97 wt %, at least 98 wt %, at least 99 wt % or at least 99.5 wt % of the total weight of the CNM product, made according to the embodiments described herein. Some embodiments of the present disclosure produce a CNM product with a high purity of the desired allotrope.

Definitions

Unless defined otherwise, all technical and scientific terms used herein have the same meaning as commonly understood by one of ordinary skill in the art to which this disclosure belongs.

As used herein, the term "about" refers to an approximately +/−10% variation from a given value. It is to be understood that such a variation is always included in any given value provided herein, whether or not it is specifically referred to.

As used herein, the term "allotrope" may be used interchangeably with "physical form", "structure", "morphology", "nanocarbon allotrope", nanocarbon physical form", "nanocarbon structure" or "nanocarbon morphology", these terms—and similar terms-all refer to the three-dimensional shape—and associated physical chemical properties—of the nano-scaled structures that are found as a constituent within a CNM product, made according to the embodiments described herein.

As used herein, the terms "desired relative-amount", "relative amount" or "minimal relative-amount" both refer to a relative amount that a desired allotrope contributes to the total amount of a CNM product, where that relative amount is greater than at least 70 wt %, in some embodiments, of the total amount of the CNM product made, the term "high purity" may be employed herein. In some embodiments of the present disclosure, the relative amount of a desired allotrope is greater than 75 wt % of total amount of the CNM product made, is greater than 80 wt % of total amount of the CNM product made, is greater than 85 wt % of total amount of the CNM product made, is greater than 90 wt % of total amount of the CNM product made, is greater than 95 wt % of total amount of the CNM product made, is greater than 97.5 wt % of total amount of the CNM product made or is greater than 99 wt % of total amount of the CNM product made.

Embodiments of the present disclosure will now be described and include references to the Examples and the figures.

Some embodiments of the present disclosure relate to a method for producing a CNM product that comprises a greater amount of a desired allotrope, relative to other allotropes present in the CNM product. The method comprises the steps of heating a carbonate electrolyte to obtain a molten-carbonate electrolyte; positioning the molten carbonate electrolyte between an anode and a cathode in an electrolytic cell; applying an electrical current to the cathode and the anode in the electrolytic cell; and, collecting a CNM product from the cathode.

In some embodiments of the present disclosure, the method further comprises a step of selecting the material of the anode or cathode in order to synthesize a greater amount of a desired allotrope, relative to other allotropes present in the CNM product. In some embodiments of the present disclosure, the method further comprises a step of selecting an additive and adding a selected amount of the selected additive to the electrolyte in order to synthesize the desired nanocarbon allotrope. In some embodiments of the present disclosure, the method comprises a step of applying a selected current density of the electrical current in order to synthesize the desired nanocarbon allotrope. In some embodiments of the present disclosure, the method comprises a step of applying the electrical current for a selected period of time in order to synthesize the desired nanocarbon allotrope.

The step of heating the carbonate electrolyte can be achieved by various means, as would be appreciated by the skilled reader. For example, a heating apparatus such as an oven or furnace can be used to heat the electrolyte to a sufficient temperature so that it transitions into a molten, liquid state. As such, any heating apparatus that can achieve the temperatures required to heat the electrolyte to its melting point are contemplated herein. In some embodiments of the present disclosure, the method further comprises a step of aging the molten electrolyte whereby the molten electrolyte is held in the molten state at a substantially constant temperature to allow a steady state to be achieved. For example, the molten electrolyte may be aged for between 1 hour and 48 hours.

The molten electrolyte is then positioned between an anode and cathode of an electrolytic cell, which may also be referred to as a case. The electrolytic cell may be any type of vessel that can maintain its structural integrity in the face of the electrochemical environment that occurs during the electrolysis reactions of the present disclosure. The electrolytic cell may have one or more walls that may be made of a desired material or that are coated with a desired material that will not degrade in the environment of the electrolysis reaction. Table 1 below provides a detailed list of various electrode materials suitable for use in the embodiments of the present disclosure. In some embodiments of the present disclosure, the electrolytic cell is made of substantially pure alumina. In other embodiments of the present disclosure, the electrolytic cell is made of stainless steel with or without a lining that is comprised of another metal, such as Inconel, Nichrome or Monel, or a combination thereof. In some embodiments of the present disclosure, the electrolytic cell is a tubular vessel with a closed end. In other embodiments of the present disclosure, the electrolytic cell is a rectangular vessel with one or more compartments.

In some embodiments of the present disclosure, the electrolyte may be melted inside the electrolytic cell or it may be melted outside the cell and transferred thereto. Because the electrolysis reaction will typically occur over a time period whereby the molten electrolyte could cool, the electrolytic cell can be configured with its own integral heating apparatus, or it may be self heated by the $CO_2$ dissolution reaction and the electrolysis reaction, or it may be configured to be heated by an external heating apparatus that is external to the electrolytic cell so that the electrolyte is maintained in the molten state for the desire period of time.

In some embodiments of the present disclosure, the electrolytic cell maybe configured to maintain the electrolyte temperature at least at about 400° C., at least at about 500° C., at least at about 550° C., at least at about 600° C., at least at about 650° C., at least at about 675° C., at least at about 700° C., at least at about 725° C., at least at about 750° C., at least at about 775° C., at least at about 800° C., at least at about 825° C., at least at about 850° C., at least at about 875° C., at least at about 900° C., at least at about 1000° C. or great than 1000° C.

The anode can be made of various metals or alloys. Some anodes can be made of materials that comprise a metal that is resistant to corrosion by oxidation (or otherwise, such the noble metals: such as iridium, platinum, gold, ruthenium, rhodium, osmium, palladium or any combination thereof. Anodes may also be made of a non-noble metal that is a substantially pure metal, such as nickel, or a mixture of metals. Some non-limiting examples of suitable materials for the anodes of the present disclosure include: substantially pure nickel, an alloy that is comprised of substantially mostly nickel, an alloy that has a high-nickel content or an alloy that is comprised of some nickel. As used herein, an alloy with greater than 50 wt % nickel is referred to a high-nickel content alloy. Suitable examples of alloys for use as an anode include, but are not limited to: Inconel 718 (at least about 72 wt % nickel content), Inconel 600 (about 52.5 wt % nickel content) or other Inconels, such as, but not limited to Inconel 625 (about 58 wt % nickel content), Nichrome A (composed of about 80 wt % nickel and about 20 wt % chromium), Nichrome C (composed of about 60 wt % nickel, about 24 wt % iron and about 16 wt % chromium). Anodes made from lower nickel content alloys may also be suitable for use in some embodiments of the present disclosure, including Incoloy alloys—such as Incoloy 800 composed of about 40 wt % iron, about 30-35 wt % nickel and about 19-23 wt % chromium). In some embodiments of the present disclosure, the anode may be monolithic or it may be a composite that is composed of different materials.

In one embodiment the anode may be planar in shape and it can be made of various dimensions. In some embodiments of the present disclosure, the anode may be made of wire that is rolled into a substantially flat coil with an upper face and a lower face. In some embodiments of the present disclosure, the anode may be perforated. In other embodiments, the anode may be configured of various shapes and surface modifications to maximize the active area of electrolysis. The upper and lower faces of the anode may have substantially equal areas that are suitable for fitting within the electrolytic cell. In some embodiments, the anode face has a surface area that is between about 1 $cm^2$ and about 100,000 $cm^2$; between about 10 $cm^2$ and 50,000 $cm^2$; or between about 100 $cm^2$ and about 10,000 $cm^2$. In some embodiments of the present disclosure, the anode may have two or more anode faces, each with a surface area within these ranges. In some embodiments, the anode may be larger with a larger surface area. The skilled person will appreciate that the size of the electrolytic cell may dictate the size of the anode and vice versa. The anode may be arranged to be generally aligned with a horizontal plane, or a vertical plane, or a plane that is not parallel to either the horizontal or vertical plane.

The cathode can be made of various metals or alloys. Some cathodes can be made of materials that comprise steel, galvanized steel, stainless steel, copper, or any combinations thereof. Some further non-limiting examples of suitable materials for the anodes of the present disclosure include: nickel, Nichrome C, Monel (about 67 wt % nickel and about 31-33 wt % copper) and Muntz brass (about 60 wt % copper and about 40 wt % zinc).

In one embodiment the cathode may be planar in shape and can be made of various dimensions. In some embodiments of the present disclosure, the cathode may be made of wire that is rolled into a flat coil with an upper face and a lower face. In other embodiments the cathode may be configured of various shapes and surface modifications to maximize the active area of electrolysis. The upper and lower faces of the coiled cathode may have substantially equal areas that are suitable for fitting within the electrolytic cell. In some embodiments, the coiled cathode faces have a surface area that is between about 1 $cm^2$ and about 5000 $cm^2$; between about 2 $cm^2$ and 3000 $cm^2$; or between about 3 cm 2 and about 1000 $cm^2$. In some embodiments, the cathode may be larger with a larger surface area. The skilled person will appreciate that the size of the electrolytic cell and/or the size of the anode may dictate the size of the cathode for example, the electrodes may be substantially similar sizes. The cathode may be arranged to be generally aligned with a horizontal plane or a vertical plane, or a plane that is not parallel to either the horizontal or vertical plane.

In some embodiments of the present disclosure, the size and orientation of the cathode can be selected to substantially mirror the size and orientation of the anode. In some embodiments of the present disclosure, the anode and the cathode may be generally aligned with a horizontal plane and vertically spaced apart from each other. In other embodiments of the present disclosure, the anode and cathode may be generally aligned with a vertical plane and horizontally spaced apart from each other. As the skilled person will appreciate, the distance between the electrodes must permit the passage of sufficient electric current therebetween but the amperage of the electric current and the size of the electrolytic cell may also influence how far apart the electrodes are spaced apart. In some embodiments of the present disclosure, the electrodes maybe spaced apart from each other by about 0.25 cm, about 0.5 cm, about. 0.75 cm, about 1 cm, about 1.25 cm, about 1.5 cm, about 1.75 cm, about 2 cm, about 3 cm, about 4 cm, about 5 cm, about 7.5 cm, about 10 cm, about 15 cm, about 20 cm, about 30 cm or further.

Some embodiments of the present disclosure relate to a larger, scaled up electrolysis cell and set of electrodes. For example, in some embodiments of the present disclosure, the electrodes may each have a face with a surface area of between about 1 $m^2$ and about 10 $m^2$, between about 2 $m^2$ and about 9 $m^2$, between about 3 $m^2$ and about 8 $m^2$, between about 4 $m^2$ and about 7 $m^2$, between about 5 $m^2$ and about 6 $m^2$. As will be appreciated by those skilled in the art, the dimensions of the electrodes can match each other, or not, or be configured in a sandwiched configuration, with one electrode positioned between two of the other electrodes or other arrangements, and the dimensions of the electrodes can determine the dimensions of the electrolytic cell in which the electrodes are used.

In order to initiate and maintain the electrolysis reaction within the electrolytic cell, an electric current is applied and passes between the anode and cathode through the molten electrolyte therebetween. In some embodiments of the present disclosure, the electric current may be an alternating current or a direct current. In some embodiments of the present disclosure, the current may be between about 0.01 amps (A) and about 5 A. In some embodiments of the present disclosure, the current may be between about 0.025 A and about 4 A; between about 0.05 A and about 3 A; between about 0.075 A and about 2 A; between about 0.1 A and about 1 A. In some embodiments of the present disclosure the current is about 0.5 A. In some embodiments of the present disclosure, the current may be between about 5 A and about 500,000 A; or between about 500 A and 50,000 A. In other embodiments of the present disclosure, the current may be between about 5,000 A and about 50,000 A In some embodiments of the present disclosure, the current is applied at a substantially constant current density. For example, the current density of the applied current may be between about 0.001 A/$cm^2$ and about 1 A/$cm^2$. In some embodiments the current density of the applied current may be between about 0.0025 A/$cm^2$ and about 0.75 A/$cm^2$; between about 0.005 A/$cm^2$ and about 0.5 A/$cm^2$; between about 0.0075 A/$cm^2$ and about 0.25 A/$cm^2$; or between about 0.01 A/$cm^2$ and about 0.1 A/$cm^2$. In other embodiments of the present disclosure, the current density of the applied current may be between about 1 A/$cm^2$ and about 10 A/$cm^2$. In some embodiments, low current density is used to control conductivity during formation of the CNM product.

In some embodiments of the present disclosure, the method further comprises a step of ramping up the electrical current in staged increases of current over a prescribed time course. For example, a first period of a first constant current density, followed by a second period of a second constant current density, followed by a third period of a third constant current density, followed by a fourth period of a fourth constant current density and so on until a final current density is applied for the duration of the electrolysis process. In these examples, the time periods may be the same or different and they may range from one minute to one hour and any time therebetween. In these examples, the constant current densities may be the same or different and they may range from as little as 0.005 A/$cm^2$ to 0.75 A/$cm^2$. In other embodiments the ramped electrical current, may increase and/or decrease in a non-stepwise manner, such as by oscillations or by linear, ramped changes or by other variations.

In some embodiments of the present disclosure, the method further comprises the step of introducing, which may also be referred to herein as adding, an additive, or more than one additive, into the carbonate electrolyte media. This introducing step can be achieved by various approaches, depending on what the nature of the additive is. This step of introducing the additive into the carbonate electrolyte can occur before, during or after the carbonate electrolyte is heated to a molten state. Non-limiting examples of such additives include: a lithium-containing additive (such as lithium phosphate; lithium oxide and other lithium-containing salts); an iron-containing additive (such as iron-containing salts, including iron oxide); a magnesium-containing additive (such as a magnesium salt, including magnesium oxide); a transition metal nucleating agents (such as $Fe_2O_3$, nickel powder, a chromium powder); a transition metal salt of one or more of iron, nickel, chromium, nickel, copper, manganese, titanium, zirconium, molybdenum, tantalum, or cobalt. For clarity, additives that do not include any iron (including iron-containing salts) are collectively referred to herein as "iron-free" additives. In non-limiting embodiments of the present disclosure, the iron-free additives include: additives that are substantially devoid of any iron, additives that comprise a trace amount of iron and/or additives that include an amount of iron that does not participate in the electrolysis reaction in any substantial or meaningful way. Examples of the iron-free additive include, but are not limited to: a lithium-containing additive, a cobalt-containing additive, a nickel containing additive and a chromium-containing additive. According to the embodiments of the present disclosure, the additive may introduced in an amount of between about 0.01 wt % to 10 wt %, relative to the amount of the electrolyte media or the molten electrolyte media. In some embodiments of the present disclosure, the additive may be introduced in an amount between about 0.05 wt % and about 7.5 wt %, relative to the amount of the electrolyte media or the molten electrolyte media. In some embodiments of the present disclosure, the additive may be introduced in an amount between about 0.075 wt % and about 5 wt %, relative to the amount of the electrolyte media or the molten electrolyte media.

As a further example, in some embodiments of the present disclosure, the lithium-containing additive may be added in an amount of between 0.01 wt % and about 10 wt %, or between about 0.05 wt % and about 9 wt %, or between about 0.075 wt % and about 8 wt %.

As a further example, in some embodiments of the present disclosure, an iron-containing additive may be added in an amount of between 0.01 wt % and about 5 wt %, or between about 0.05 wt % and about 2.5 wt %, or between about 0.075 wt % and about 1.25 wt % and in further embodiments the iron-containing additive is added in an amount of between about 0.05 wt % and 0.15 wt %.

As a further example, in some embodiments of the present disclosure, a nickel-containing additive (either as a nickel powder or a nickel salt) may be added in an amount of between 0.01 wt % and about 5 wt %, or between about 0.05 wt % and about 2.5 wt %, or between about 0.075 wt % and about 1.25 wt % and in further embodiments the nickel-containing additive is added in an amount of between about 0.05 wt % and 0.15 wt %.

As a further example, in some embodiments of the present disclosure, a cobalt-containing additive (either a cobalt powder or a cobalt salt) may be added in an amount of between 0.01 wt % and about 5 wt %, or between about 0.05 wt % and about 2.5 wt %, or between about 0.075 wt % and about 1.25 wt % and in further embodiments the cobalt-containing additive is added in an amount of between about 0.05 wt % and about 0.15 wt %.

As a further example, in some embodiments of the present disclosure, a chromium-containing additive (either as a chromium powder or chromium salt) may be added in an amount of between 0.01 wt % and about 5 wt %, or between about 0.05 wt % and about 2.5 wt %, or between about 0.075 wt % and about 1.25 wt % and in further embodiments the chromium-containing additive is added in an amount of between about 0.05 wt % and about 0.15 wt %.

In some embodiments, the transition metal nucleating agent may be a transition metal oxide. In some embodiments of the present disclosure, the nucleating agent may be incorporated into the CNM product, so that atoms of the nucleating agent form part of one or more allotropes of the CNM product. In some embodiments of the present disclosure, the incorporated nucleating agent may be magnetic. In some embodiments of the present disclosure, a portion of the nanomaterial product may be responsive to a magnetic field (by moving when near to or inside the magnetic field) and a portion may be non-responsive to a magnetic field (by not moving), and these two classes of nanomaterial products may be separated by applying an external magnetic field.

The total duration of the electrolysis synthesis process may be between about 10 minutes and about 156 hours.

In some embodiments of the present disclosure, the step of selecting may be configured so that the CNM product comprises a desired combination of two or more desired allotropes. For example, the step of selecting can be varied, in a controlled fashion, so that the CNM product comprises a first allotrope and a second allotrope or further allotropes. Further, the step of selecting can be configured so that a desired relative quantities of the first allotrope and the second allotrope, relative to each other within the CNM product, can be achieved. For example, it may be desired that the amount of the first allotrope is greater than, less than or substantially equal to the amount of the second allotrope present in the CNM product.

As will be appreciated by those skilled in the art, the specific variations of the electrolysis process conditions, also referred to herein as operational parameters, described herein may be further varied when the physical scale of the electrolysis process is increased.

EXAMPLES

The constituents of the molten electrolyte mixtures described herein are commercially available: lithium carbonate ($Li_2CO_3$; Alfa Aesar, about 99% pure), lithium oxide ($Li_2O$, 99.5%, Alfa Aesar), lithium phosphate ($Li_3PO_4$, 99.5%), iron oxide ($Fe_2O_3$, 99.9%, Alfa Aesar), and boric acid ($H_3BO_3$, Alfa Aesar 99+%).

For the electrodes described herein: Nichrome A (0.04-inch-thick), Nichrome C (0.04-inch-thick), Inconel 718, Inconel 600 (0.25-in thick), Inconel 625 (0.25-in thick), Monel 400, Stainless Steel 304 (0.25-in thick), Muntz Brass (0.25-in thick), nickel, iridium, were all purchased from regular commercial metal sources. Composite electrodes were fabricated with these purchased materials or purchased as used.

For the additives described herein: Ni powder was 3-7 μm (99.9%, Alfa Aesar), Cr powder was <10 μm (99.2%, Alfa Aesar), Co powder was 1.6 μm (99.8%, Alfa Aesar) and iron oxide was 99.9% $Fe_2O_3$ (Alfa Aesar). The Inconel 600 (100 mesh) was purchased from Cleveland Cloth. The electrolysis was a conducted in a high form crucible >99.6% alumina (Advalue).

Specific electrolyte compositions of each electrolyte are described herein. The electrolyte was pre-mixed by weight in the noted ratios then metal or metal oxide additives are added if used. The cathode was mounted vertically across from the anode and immersed in the electrolyte. Generally, the electrodes were immersed subsequent to electrolyte melt. For several, noted, electrolyses, once melted, the electrolyte was maintained at 770° C. ("aging" the electrolyte) prior to immersion of the electrolytes followed by immediate electrolysis. Generally, the electrolysis was driven with a described constant current density. As noted, for some electrolyses, the current density was ramped in several steps building to the applied electrolysis current, which was then maintained at a constant current density. Otherwise, the electrolyses were initiated, and held, at a single constant current. The electrolysis temperature was about 770° C., unless otherwise indicated herein.

Sources of carbon included $CO_2$ captured directly from the air, and $CO_2$ from the exhaust of a natural gas electric power plant. In the embodiments of the present disclosure, the electrolytic splitting can occur as direct air carbon capture with or without $CO_2$ pre-concentration, with concentrated $CO_2$, or gases that comprise $CO_2$, for example exhaust gases.

The CNM product made by the examples below were washed (with either deionized water, 6 M HCl, concentrated HCl) to remove excess electrolyte, separated from the washing solution, and analyzed by PHENOM Pro Pro-X scanning electron microscope (SEM, with EDX), FEI Teneo LV SEM, and by FEI Teneo Talos F200X TEM (with EDX). XRD powder diffraction analyses were conducted with a Rigaku D=Max 2200 XRD diffractometer and analyzed with the Jade software package. Raman spectroscopy was measured with a LabRAM HR800 Raman microscope (HORIBA) with 532.14 wavelength incident laser light, with a high resolution of 0.6 $cm^{-1}$.

In some embodiments of the present disclosure, the CNM product made according to the methods, apparatus and systems described herein above, may result in a high purity of a desired allotrope where such desired allotrope are doped. Without being bound by any particular theory, if a doping component, also referred to as a dopant, is introduced into the method, apparatus or system, then atoms of the dopant may be directly incorporated into various of the graphitic structures of the CNM product and the desired allotrope therein. When atoms of the doping component are directly introduced into the CNM product, as it is being built in situ upon the cathode, the resulting doped CNM product has desired chemical physical properties that are different than a CNM product (a non-doped CNM product) that does not include atoms of the doping component. Without being bound by any particular theory, the doping component may include at least one material with a group IIIA element, a non-carbon group IVA element, a group VA element, a group VIA chalcogenide element, or at least one material with gold, platinum, iridium, iron or other row 4, 5, or 6 metals. In some embodiments of the present disclosure, the doping component comprises: a chemical species with oxygen atoms, halide atoms, one or more of nitrate, a phosphate, a thiophosphate, a silicate, a thionyl chloride, a sulfur chloride, a silicon chloride, a thiophosphate, a thionyl nitrate, a silicon nitrate, a silicon nitrite, a sulfur oxide and a nitrous oxide gas. Without being bound by any particular theory, the desired chemical properties of the doped CNM product may include: a greater electrical conductivity (as compared to a non-doped CNM product), enhanced electrical charge storage (as compared to a non-doped CNM product), a heterogeneous catalytic property, a homogeneous catalytic property, a fuel cell catalytic property, an aerobic oxidation catalytic property, an enhanced reaction activity property and any combination thereof. The desired physical chemical properties of the doped CNM product made according to the embodiments of the present disclosure may have a wide variety of applications, such as: a catalysts, heavy metal removal, energy storage, sorption applications, batteries, ultra-sensitive sensors and combinations thereof.

In some embodiments of the present disclosure, the CNM product made according to the methods, apparatus and systems described herein above, may result in a desired allotrope that is magnetic. For clarity, a magnetic CNM product and the magnetic allotropes therein are physically movable with a magnetic field. Without being bound by any particular theory, if a magnetic additive component, is introduced into the method, apparatus or system, then a carbide-driven growth of the various of the graphitic structures within the magnetic CNM product may occur. In some embodiments of the present disclosure, the magnetic additive component comprises at least one of a magnetic material addition component, a carbide-growth component and any combination thereof. In some embodiments of the present disclosure, the magnetic material addition component is wherein the magnetic material additive component is one or more of iron, nickel, cobalt, gadolinium, samarium, neodymium, steel and alloys comprising one or more magnetic materials with ferromagnetic properties, paramagnetic properties, diamagnetic properties and any combination thereof. In some embodiments of the present disclosure, the iron-based additive is one or more of cast iron powder, iron metal, steel, stainless steel, an iron containing metal alloy, an iron oxide, FeO, $Fe_2O_3$, $Fe_3O_4$, or an iron containing salt. Within the magnetic CNM product, the magnetic additive component is incorporated or formed as one or more nodules, that may be covered in one or more layers of graphitic carbon, on the magnetic CNM product. In some embodiments of the present disclosure, the carbide-growth component may be a metal carbide, such as: iron carbide, a nickel carbide, a cobalt carbide; a zirconium carbide, a chromium carbide, a tantalum carbide, a hafnium carbide and any combination thereof. In some embodiments of the present disclosure, the carbide-growth component may be a non-metal carbide, such as silicon carbide, a germanium carbide and any combination thereof. The magnetic additive component may be added to the methods, apparatus and systems of the present disclosure, as a chemical additive or it may originate from one or more walls of the electrolysis cell, from the anode, from the cathode, the electrolyte media and any combination thereof.

Example 1—Electrolysis Process Conditions for Making a Nanocarbon Product with a High Purity of Desired Allotropes In order to make CNM product an electrolysis reaction was conducted in an electrolysis cell that comprised a vessel, an anode and a cathode. The vessel was made of pure alumina (commercially available from AdValue, approximately 99.6% pure alumina) and it had a closed end. The vessel contained a 770° C. molten $Li_2CO_3$ electrolyte.

The anode was made of various materials and it was configured to generate oxygen during the electrolysis reaction.

The cathode was made of brass and it was also configured into a substantially flat coil.

Carbon dioxide from the air was directly captured by the molten electrolyte during the electrolysis reaction.

The electrochemical operating parameters that were varied were the composition and/or configuration of the cathode and anode, the additives used and their concentrations to the $Li_2CO_3$ electrolyte, the current density and the time of the electrolysis. Electrolyte additives that are varied included $Fe_2O_3$, nickel, chromium powder or combinations thereof. Electrolysis reactions were varied over a range of electrolysis current densities. Variations of the electrodes include the use of cathode metal electrodes such as Muntz brass Monel, or Nichrome alloys. Anode variations include noble anodes such as iridium, various nickel containing anodes including nickel, Nichrome A or C, Inconel 600, 625, or 718, or specific layered combinations of these metals. Alloy composition of the metals used as electrodes is presented in Table 1. Metal variation was further refined by combining the metals in Table 1 as anodes, for example using a solid sheet of one Inconel alloy, layered with a screen or screens of another Inconel alloy, such as an anode of Inconel 625 with 3 layers of (spot welded) 100 mesh Inconel 600 screen.

TABLE 1

Compositions of various alloys used (weight percentage).

| Alloy | Ni % | Fe % | Cu % | Zn % | Cr % | Mo % | Nb & Ta % |
|---|---|---|---|---|---|---|---|
| Nichrome C | 60 | 24 | | | 16 | | |
| Nichrome A | 80 | | | | 20 | | |
| Inconel 600 | 52.5 | 18.5 | | | 19.0 | 3.0 | 3.6 |
| Inconel 718 | 72% min | 6-10 | | | 14-17 | | |
| Inconel 625 | 58 | 5 max | | | 20-23 | 8-10 | 4.15-3.15 |
| Monel | 67 | | 31.5 | | | | |
| Muntz Brass | | | 60 | 40 | | | |

Several thousand runs of different combinations of electrolyses operating conditions were performed in order to achieve the embodiments of the present disclosure. A fascinating, but rarely observed, product occurred in less than 30 of those many electrolyses had nano-morphology analogous to the macro-structure of bamboo, but had been only observed as a low fraction of the total product. Table 2 summarizes the systematic optimization of electrolysis conditions in 770° C. $Li_2CO_3$ to optimize and maximize the electrolytic formation of this nano-bamboo. A few prior electrolyses producing nano-bamboo were associated with nickel electrodes, or started with ramping up of the current to encourage nucleation. Experiment Electrolysis #I in the top row of Table 2 includes both these features including nickel as both the cathode and anode. A ramping increase in the electrolysis current was also applied as follows: an initial 10-minutes electrolysis at a constant 0.01 and then 0.02 A/cm$^2$ for a further 10 minutes, followed by 5 minutes at 0.04 and then 0.08 A/cm$^2$ for a further 5 minutes, after which the constant current electrolysis was conducted at 0.2 A/cm$^2$, as shown in Table 2. Nano-bamboo was evident in the product SEM, but constituted a minority (30 wt %) of the total product. As seen in Electrolysis #II in Table 2, an increase in the nano-bamboo product was achieved with the direct addition of Ni and Cr additive powders to the electrolyte, and the anode was replaced by a noble metal (iridium) accompanied by a 5-fold decrease in current density. As noted in Table 2, this Electrolysis #II has the first majority, 60 wt %, of the nano-bamboo product. Coulombic efficiency quantifies the measured available charge (current multiplied by the electrolysis time) to the measured number of 4 electrons per equivalent of C in the product. Coulombic efficiency tends to drop off with a lower current density, and in this case the coulombic efficiency of the synthesis was 79%. The coulombic efficiency may approach higher values at low current density by lowering system impurities.

potential calculation has been a challenge. However, without Nernst activity and temperature correction, the reduction rest potentials of Ni, Fe, Cr and Cu and $CO_2$ at room temperature are $CO_2(IV/0)=-1.02$, $Cr(III/0)=-0.74$, $Fe(II/0)=-0.44$, $Co(II/0)=-0.28$, $Ni(II/0)=-0.25$, $Fe(II/0)=-0.04$, $Cu(II/0)=0.34$, and $Co(III/0)=1.82$. Note however, that the free activity of tetravalent carbon as carbonate $C(IV)O_3^{2-}$ formed by the reaction of $C(IV)O_2$ with electrolytic oxide in pure molten carbonate solutions was many orders of magnitude higher than the dissolved transition metal ion activity in the electrolysis electrolyte. This helps favor the thermodynamic and kinetic reduction of the tetravalent carbon, over metal deposition at the cathode. However, the practical observation was that, for the majority of molten carbonate $CO_2$ electrolyses studied, the initial low current ramping does not appear to promote the highest purity carbon deposition.

Figure 2:
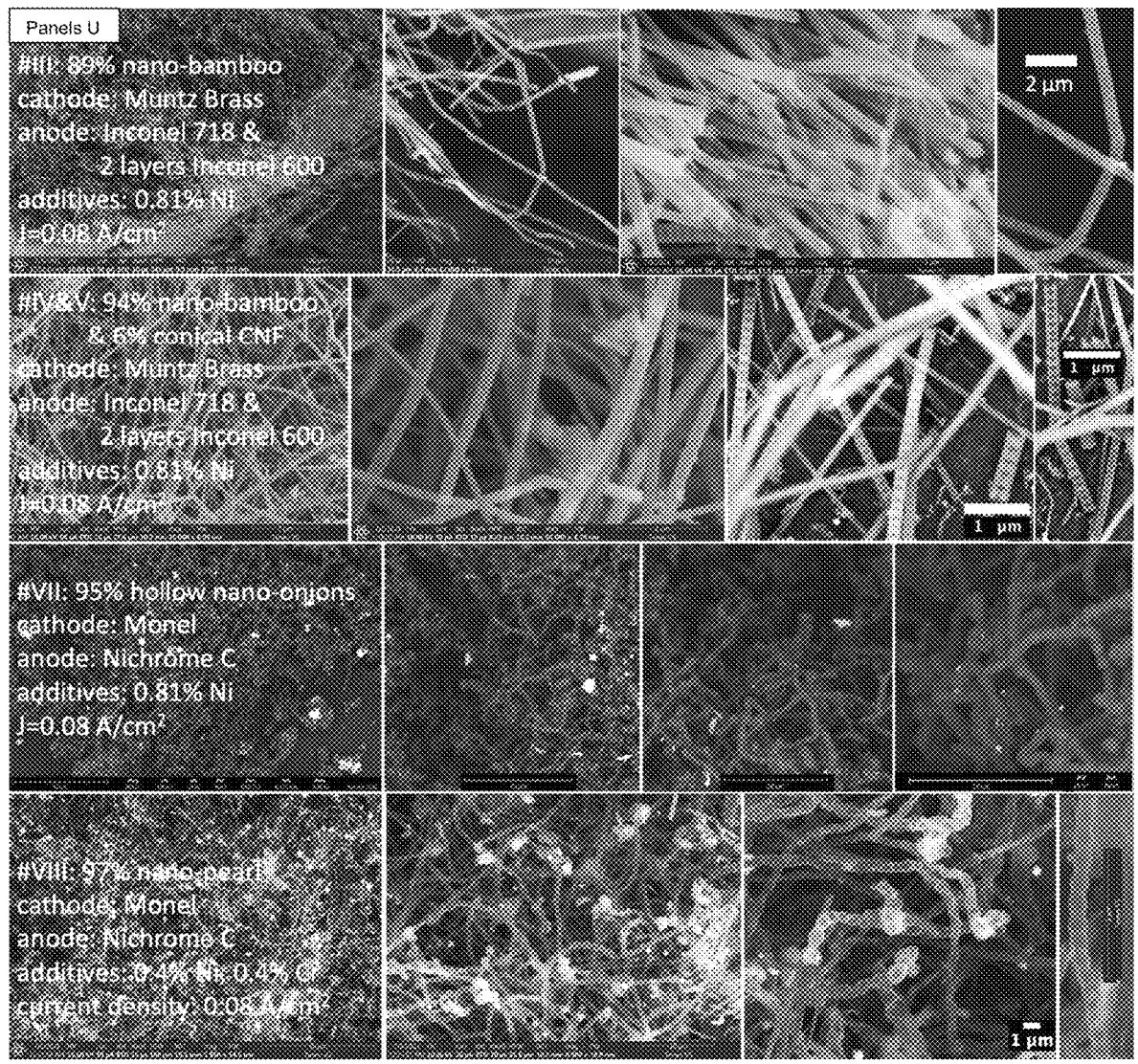
FIG. 2 shows scanning electron microscope (SEM) images the nanocarbon products of nano-bamboo and nano-pearl allotropes of carbon synthesized by electrolytic splitting of $CO_2$ in 770° C. $Li_2CO_3$, made according to embodiments of the present disclosure.

FIG. 2 shows images of the SEM analysis of the nano-carbon products of nano-bamboo and nano-pearl allotropes of carbon synthesized by electrolytic splitting of $CO_2$ in 770° C. $Li_2CO_3$. Moving left to right in the panels, the product was analyzed by SEM with increasing magnification. Scale bars in panels (starting from left) are for panels

TABLE 2

Systematic variation of $CO_2$ splitting conditions in 770° C. $Li_2CO_3$ to optimize formation of nano-bamboo and nano-pearl carbon allotropes.

| Electrolysis # | Cathode | Anode | Additives (wt % powder) | Electrolysis time | Current density A/cm$^2$ | Product Description |
|---|---|---|---|---|---|---|
| I | Nickel | Nickel | — | 4 h | 0.2 | 30% nano-bamboo carbon 40% regular CNT rest: graphitic Carbon |
| II | Muntz brass | Iridium | 0.4% Ni 0.4% Cr | 18 H | 0.08 | 60% nano-bamboo carbon 10% regular CNT rest: graphitic Carbon |
| III | Muntz Brass | Inconel 718 2 layers Inconel 600 | 0.81% Ni powder | 18 h | 0.08 | 89% 30-120 μm nano-bamboo carbon |
| IV | Muntz Brass | Inconel 718 2 layers Inconel 600 | 0.81% Ni powder | 18 h | 0.08 | 94% 30-80 μm carbon nano-bamboo, 6% conical carbon nanofiber |
| V | Muntz Brass | Inconel 718 2 layers Inconel 600 | 0.81% Ni powder | 18 h | 0.08 | 94% 30-80 μm carbon nano-bamboo, 6% conical carbon nanofiber |
| VI | Nichrome C | Nichrome C | 0.4% Ni 0.4% Cr | 3 h | 0.4 | 95% nano-bamboo carbon |
| VII | Monel | Nichrome C | 0.81% Ni | 18 h | 0.08 | 95% hollow nano-onions |
| VIII | Monel | Nichrome C | 0.4% Ni 0.4% Cr | 18 h | 0.08 | 97% nano-pearl carbon |
| IX | Monel | Nichrome C | 0.4% Ni 0.4% Cr | 18 h | 0.08 | 97% nano-pearl carbon |

Without being bound by any particular theory, the low current ramping, pre-electrolysis conditions can have benefits and disadvantages. For example, as a benefit the current ramping conditions may support the reduction and deposition of initial graphene layers to facilitate ongoing reduction and growth. In addition, lower current can favor transition metal deposition at the cathode and formation of nucleation sites. While at low concentrations compared to carbonate (from $CO_2$) in the electrolyte. The analysis of bound versus free metal cations in the molten electrolyte for a reduction III: 100, 10, 3 μm (different electrolysis) and 2 μm; for panels IV and V: 5, 2, 1 and 1 μm; for panels VII: 50, 30, 20 and 15 μm; for panels VIII: 50 μm 10, 1 and 2 μm.

The first row (Panels #III) of FIG. 2 presents the product SEM of the Electrolysis #III, which continues to use a low current density and continues to exhibit a similar coulombic efficiency of 78%, and focuses on a Ni powder addition to electrolyte and refines the anode to Inconel 718 with two layers of Inconel 600, with an increase to 89 wt % the nano-bamboo product. Additionally, this electrolysis used an "aged" electrolyte (not delineated in the table). The freshly molten electrolyte requires time (up to 24 hours) to reach a steady state equilibrium (pre-equilibration step). For Electrolysis #III, the electrolyte was aged 24 hours prior to melting and prior to immersion of the electrodes. However, it was observed that the aging was disadvantageous towards maximizing the nano-bamboo yield. A final refinement, immediate use of the freshly melted electrolyte (elimination of the aging step), increases the nano-bamboo product to comprise 90 wt % of the product (row 2 in FIG. 2, and Electrolysis #IV, and repeated as #V in Table 2). Interesting, the 6% non-bamboo product in Electrolyses #IV and V appears to be conical carbon nano-fiber, CNF, morphology, with its distinctive triangular shaped voids in the morphology as seen in the second row of FIG. 2. A simplified electrolysis eliminates observed CNF impurities resulting in 95% of the nano-bamboo allotrope. This Electrolysis #VI was conducted without the current ramp activation at a high 0.4 $A/cm^2$ current density, and exhibits a 99.7% coulombic efficiency. This electrolysis was tailored to have a purposeful excess of nucleation metals accomplished both with the use of Nichrome C electrodes, which contain Ni, Fe and Cr (Table 1), and through the direct addition of Ni and Cr powders to the electrolyte.

The continued use of high concentrations of added transition metal powder to the electrolyte, and low current density, but a change of electrodes yields another distinct nano carbon allotrope termed here as "hollow nano-onions". Specifically, in Electrolysis #VII in Table 2 and FIG. 2, the same concentration of Ni powder that had been used as in Electrolyses #VI and V, and again the electrolyte was not aged, nor were ramped initiation currents applied. However, a Monel cathode and Nichrome C anode were used resulting in a 95 wt % of the product having a distinctive hollow nano-onions morphology. The hollow nature of the nano-onions will be revealed by TEM, but their spheroid character was seen by SEM in the third row of FIG. 2. When the pure nickel electrolyte additive was changed to half nickel and half chromium powder, as summarized in Table 2 for Electrolyses #VIII and IX, the product has a distinctive "nano-pearl" morphology with its similarity to a beaded necklace. Here, the product fraction increased to 97% of this nano-pearl carbon and was seen by SEM in the bottom row of FIG. 2. Electrolyses #VII-IX are conducted using a low current density, J=0.0 $A/cm^2$, and exhibit a diminished coulombic efficiency of 79 to 80%.

Figure 3:
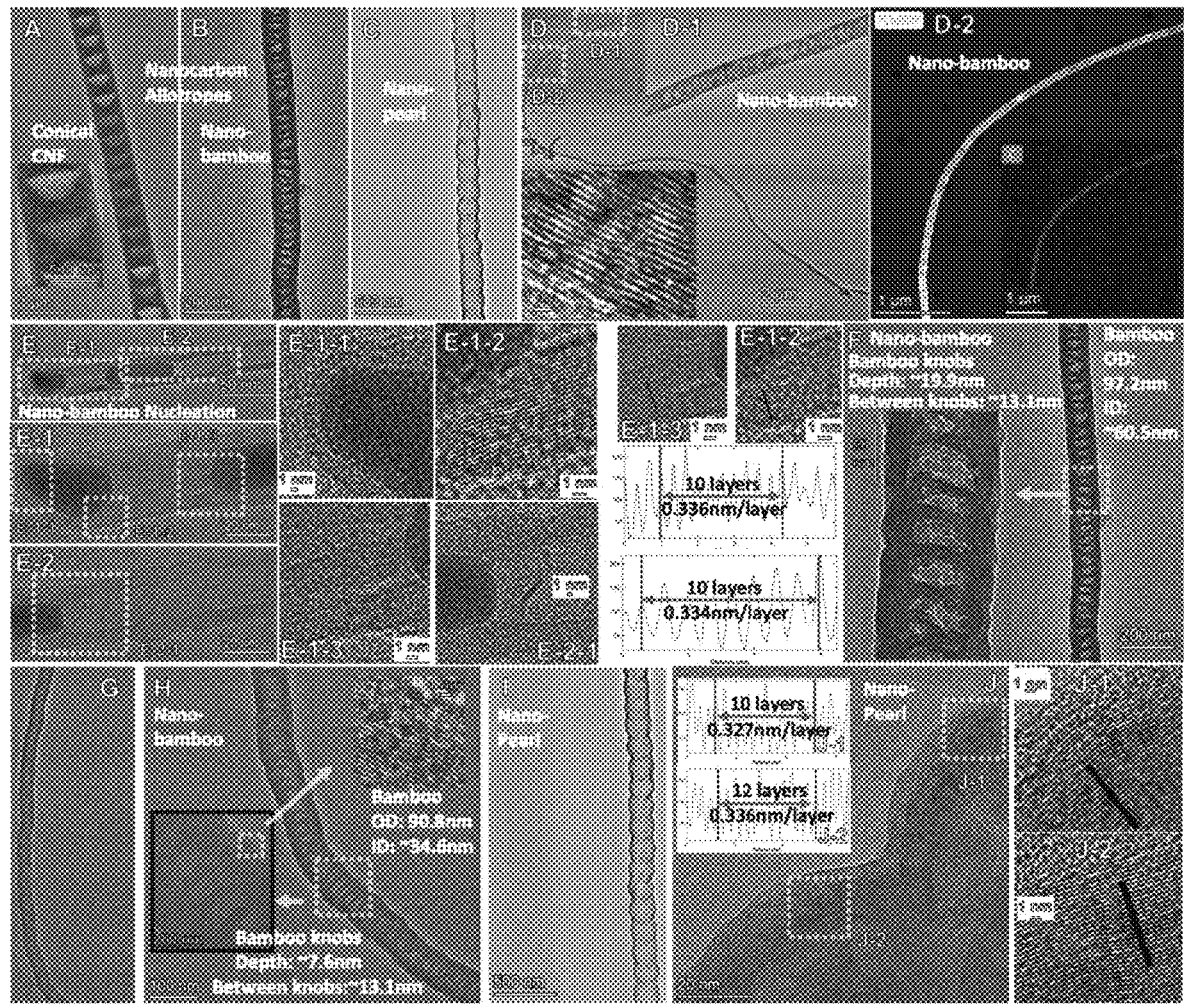
FIG. 3 shows transmission electron microscope (TEM) images of the new nano-bamboo, nano-pearl and conical CNF nanocarbon allotropes synthesized by molten carbonate electrolysis, according to embodiments of the present disclosure.

FIG. 3 compares TEM images of the new nano-bamboo, nano-pearl and conical carbon nanofibers (CNF) nanocarbon allotropes synthesized by molten carbonate electrolysis. As seen in the top left panel of the figure, the CNFs exhibit conical voids typical of this CNF structure. Growth of the nano-bamboo was seen in the left middle of the figure to be nucleation driven, and that the nucleation region appears to change shape moving from tip to interior of the structure. Without being bound by any particular theory, it was hypothesized that the lateral walls forming the bamboo "knobs" may be related to a periodic depletion of the carbon building leading walls. The walls of the nano-bamboo and nano-pearl allotropes exhibit graphene walls characterized by the typical inter-graphene wall separation of 0.33 to 0.34 nm, as noted, and as measured by the observed separation between dense carbon planes in the TEM. The lower left of the figure shows the lateral multiple graphene layers separating the "knobs" of the nano-bamboo structure. The lower right of the figure shows an example of the nano-pearl allotrope defines multiple bead-like sections that extend along a longitudinal axis of the nano-pearl, with each bead-like section akin to an individual peal on a string of pearls. The bead-like sections each comprise multiple layers of curved graphene that form the walls of each individual bead-like section of the nano-pearl allotrope.

Figure 4:
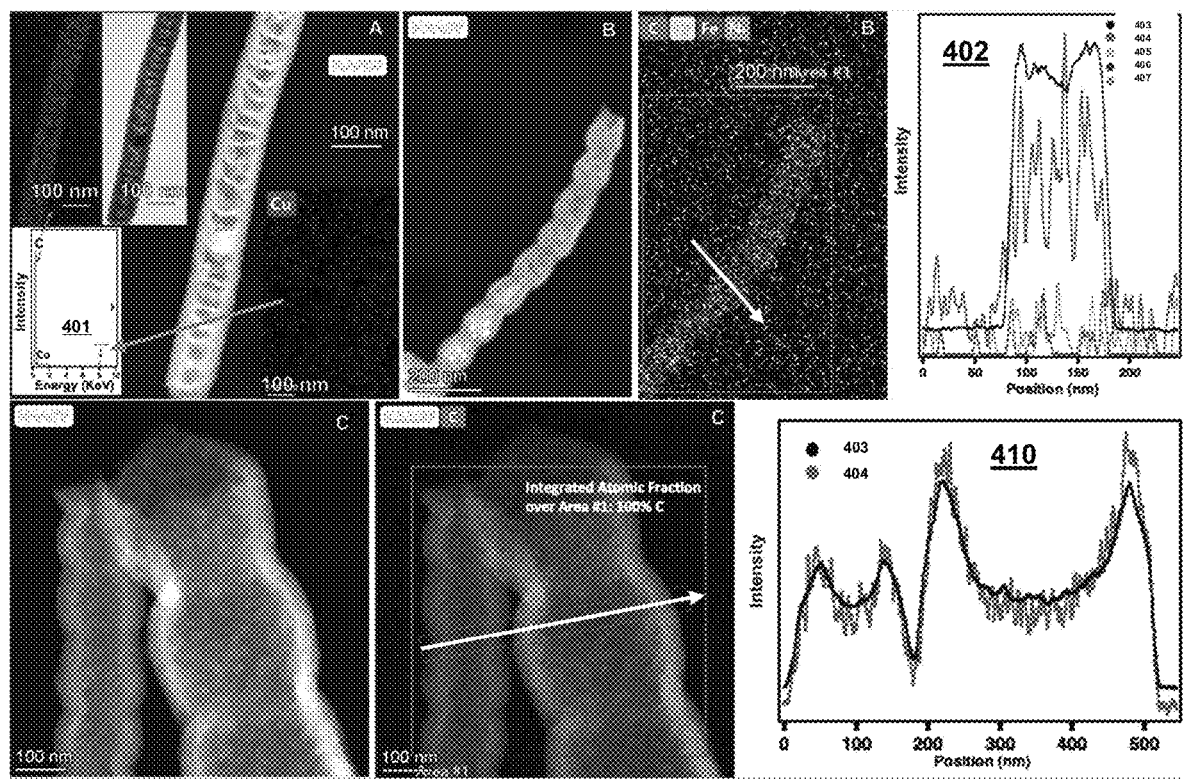
FIG. 4 shows images of the elemental compositional analysis made by HAADF (High Angle Annular Dark-Field TEM) and compares TEM of the new nano-bamboo and nano-pearl nanocarbon allotropes synthesized by molten carbonate electrolysis, according to embodiments of the present disclosure.

FIG. 4 shows images of the elemental composition made by HAADF (High Angle Annular Dark-Field TEM) and compares TEM of the nano-bamboo and nano-pearl nanocarbon allotropes synthesized by molten carbonate electrolysis. As seen from the HAADF, the nano-bamboo product was pure carbon. That was with the exception of the presence of copper that as shown in the lower left corner of the top left panel was pervasively distributed at low concentration throughout, and might originate from the grid mount of the product sample or from the copper component when a Monel cathode is used. HAADF probes two nano-pearl samples. The first exhibits a high or 100% concentration of carbon (the noise level was high) and little or no Ni, Cr or Fe. The second probes for carbon at higher resolutions and the rise and fall of carbon levels was evident as the probe moves from left to right over two separate nano-pearl structures. The top right hand panel 402 shows the elemental profile taken along the white arrow in panel to the left. In panel 402, 403 shows the HAADF data, 404 shows the carbon content, 405 shows the chromium content, 406 shows the iron content, 407 shows the nickel content. The lower right hand panel 410 shows the elemental profile taken along the white arrow in the panel to the left. In panel 410, 403 shows the HAADF data and 404 shows the carbon content.

Figure 5:
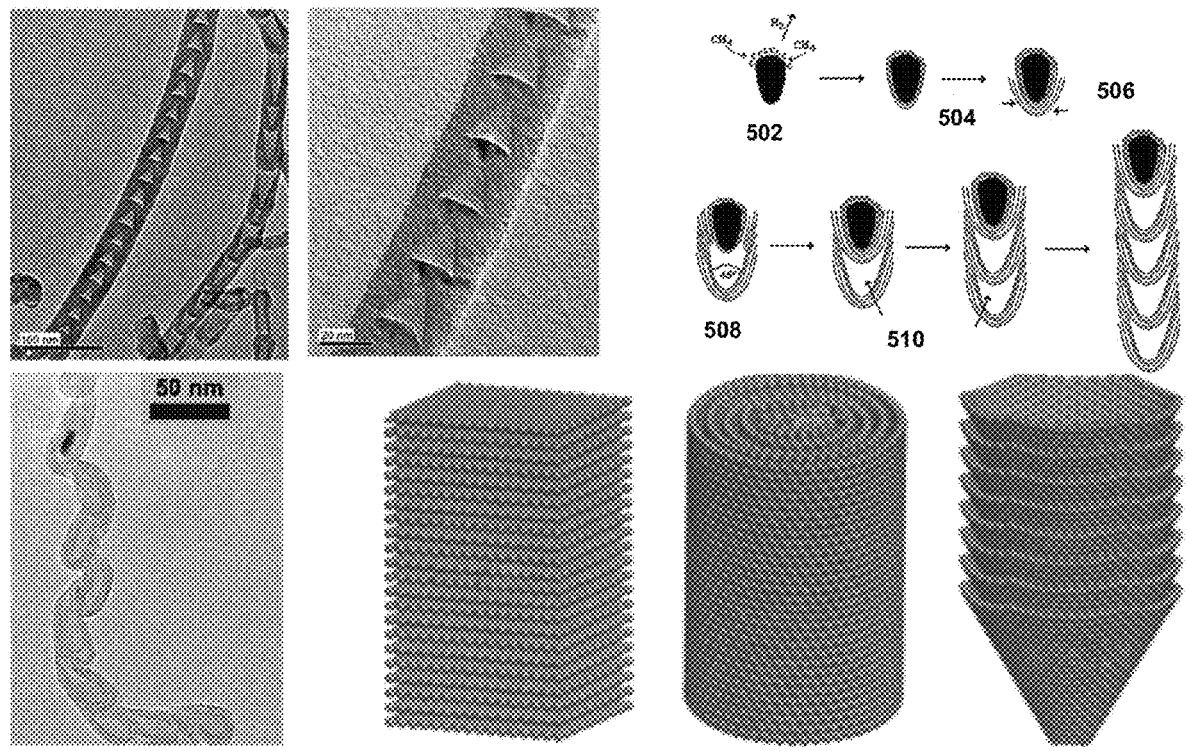
FIG. 5 shows schematics that summarize growth models of the carbon nanomaterials made according to embodiments of the present disclosure.

The top row of FIG. 5 shows conical variations of bamboo carbon nanofibers, and their proposed mechanism of growth, as formed by nickel nucleated CVD using methane and hydrogen (modified from Jia, K.; Kou, K.; Qin, M.; Wu, H.; Pulco, F.; Liotta, L. F. Controllable and Large-Scale Synthesis of Carbon Nanostructures: A review of Bamboo-Like Nanotubes. catalysts 2017, 7, 256, open access). The bottom left panel of FIG. 5 shows knotty bamboo nano-carbon variations by CVD, and the top right panel of schematics depict a proposed mechanism of growth (modified from Zhang, M. He, C.; Liu, E.; Zhiu, S., Shi, C.; Li, J.; Li, Q.; Zhao, N. Activated Carbon Nano-Chains with Tailored Micro-Meso Pore Structures and Their Application for Supercapacitors. J. Phys. Chem. C, 2015, DOI: 10.1021/acs.jpcc.5b05480). The bottom right panel of FIG. 5 shows general graphene layer conformations occurring in carbon nanofibers (modified from Yadav, D.; Amini, F.; Ehrmann, A. Recent advances in carbon nanofibers and their applications—A review. European Polym. J. 2020, 138, 109963). In FIG. 5, 502 shows the chemical vapor deposition reaction of $CH_3$ and $H_2$ on a nickel particle. A strong distortion is shown by 504 and the graphite shell-stress 506 is shown. A particle jump 508 is also depicted, resulting in the conical holes 510 shown.

The conical CNF, nano-bamboo and nano-pearl are new and unusual high yield carbon allotropes as synthesized by molten electrolysis. Similar CVD synthesized morphologies have been synthesized by CVD. In particular the CVD conical CNF structure has been widely characterized as shown in the upper row of FIG. 5. It has been proposed that the conical CNF morphology in CVD is due to repeated stress induced deformation of the shape of the nucleating (Ni) metal, which causes the metal particles to jump and form the observed lateral graphene separation bridging the allotrope walls. Globular spaced nano-bamboo and nano-pearl allotropes are less common in CVD but have been observed. An example is shown in the lower left row of FIG. 5, and whose structures have been attributed to the periodic formation of pores in the structure due to defects on the outer layers. One specific application of bamboo CVD CNTs is use as platforms for building layer-by-layer based biosensors. Generally, carbon fibers are categorized as amorphous, or as shown on the lower right side of FIG. 5 as built from graphene platelets, carbon nanotubes or conical type structures.

Figure 6:
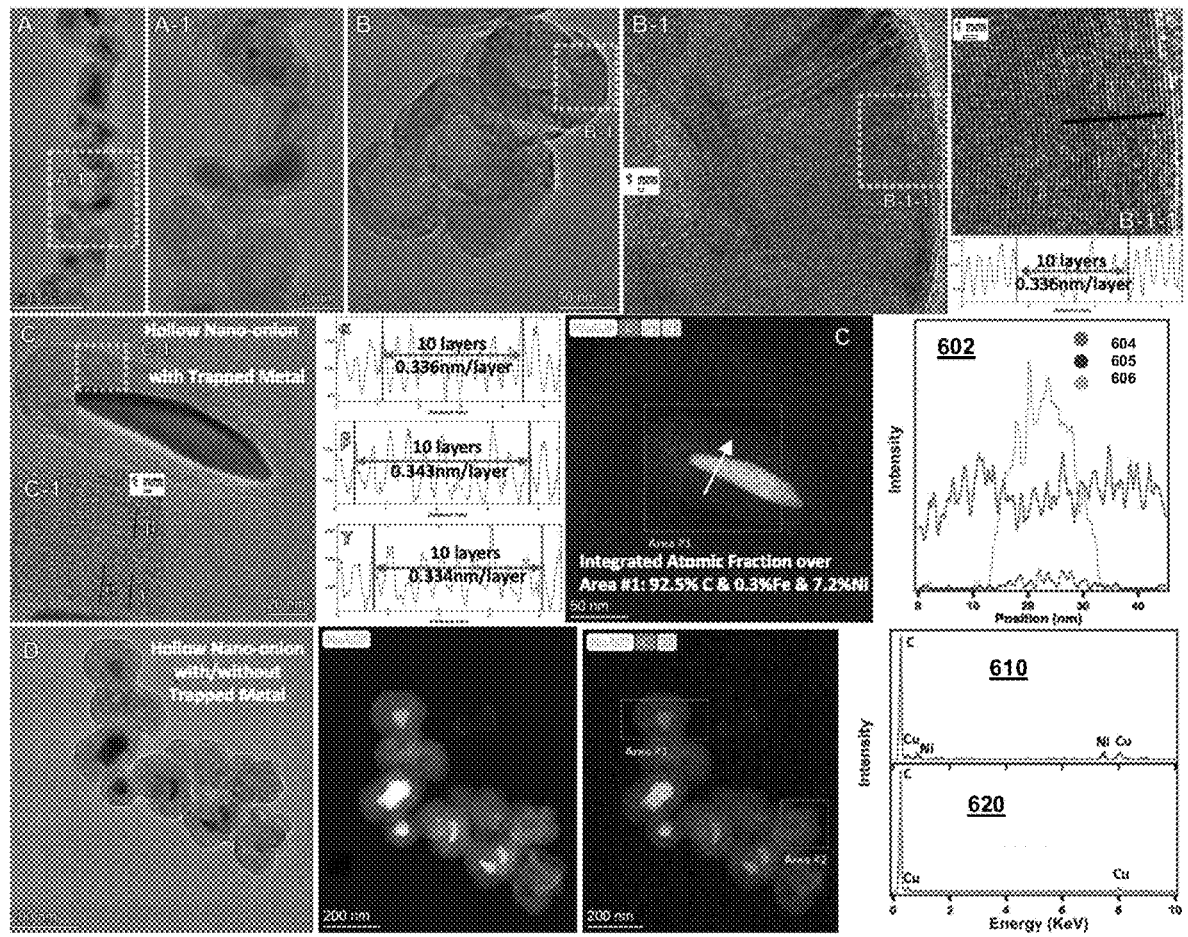
FIG. 6 shows TEM and HAADF elemental analysis of the hollow nano-onions carbon allotrope synthesized by molten carbonate electrolysis, according to embodiments of the present disclosure.

FIG. 6 shows TEM and HAADF elemental analysis of the hollow nano-onions carbon allotrope synthesized by molten carbonate electrolysis. Panel A shows hollow nano-onions, Panel B shows hollow nano-onions with and without trapped metal; Panel C shows hollow nano-onions with trapped metal; and Panel D shows hollow nano-onion with and without trapped metal. Panel 602 shows the elemental profile taken along the white arrow in the panel to the left. In panel 602, 604 shows the carbon content, 605 shows iron content and 606 shows the nickel content. Panel 610 shows the Integrated Atomic Fraction over D area #1 with carbon being about 98.1% and nickel being about 1.9%. Panel 620 shows the Integrated Atomic Fraction over D area #2 with carbon being substantially 100% (without regarding any copper content that may be present due to the manner by which the sample was prepared for analysis).

FIG. 6 shows the TEM and the elemental composition by HAADF of the new hollow nano-onion nanocarbon allotropes synthesized by molten carbonate electrolysis. The hollow nano-onions define an internal core. As shown, some of the nano-onion inner cores contain metal while others are substantially empty (void/hollow). The walls of the hollow nano-onions are composed of graphene layers as characterized by the typical inter-graphene wall separation of 0.33 to 0.34 nm, as noted in the Figure and as measured by the observed separation between dense TEM carbon planes. As seen in the HAADF of FIG. 6, when the core was hollow, the nano-onion was pure carbon, and when the core contains metal, the metal was either nickel or a combination of nickel and iron.

Figure 7:
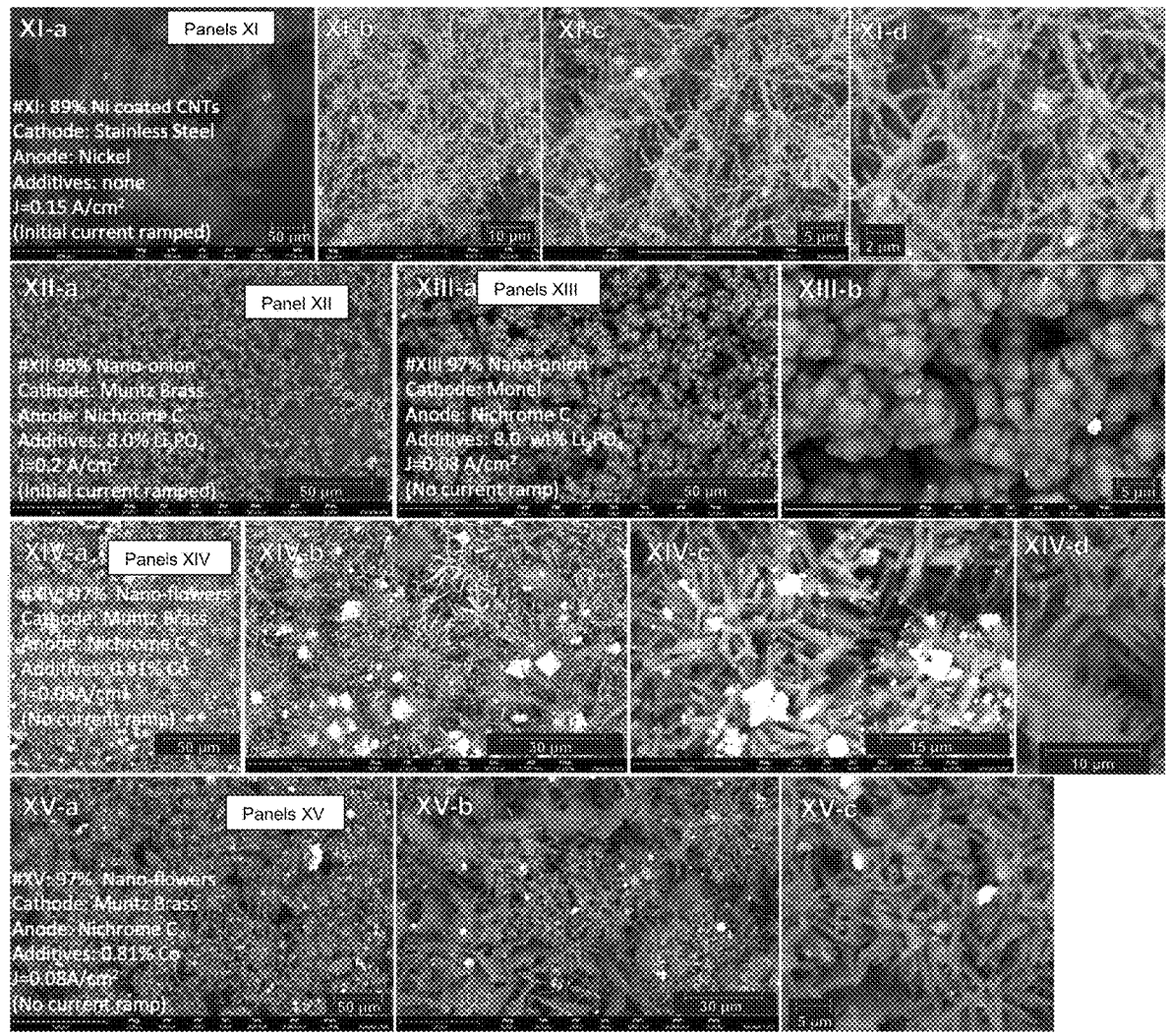
FIG. 7 shows SEM of the CNM product of nano-flowers, nano-onions and nickel coated CNT allotropes of carbon made according to embodiments of the present disclosure.

Example 2-Electrochemical Conditions to Synthesize a CNM Product with Nickel Coated CNTs, a Nano-Onion Allotrope or a Nano-Flower Allotrope FIG. 7 shows SEM of the CNM product of nano-flowers, nano-onions and nickel coated CNT allotropes of carbon by electrolytic splitting of $CO_2$ in 770° C. $Li_2CO_3$. Moving left to right in the panels, the product was analyzed by SEM with increasing magnification. Scale bars in panel XI (starting from left) are: 150, 20, 15 and 2 μm; for panel XII: 50 μm; for panels XIII: 50 and 15 μm; for panels XIV: 100, 30, 15 and 10 μm; for panels XV: 100 μm 30 and 5 μm.

A nickel anode or an excess of added nickel leads to nickel coated CNTs. Rather than forming alternative allotropes, such as nano-bamboo or nano-pearl, the use of excess nickel, particularly when employed with: (i) a stainless steel cathode; (ii) when utilized at higher electrolysis current densities; and, (iii) with the activation by an initial current ramp tends to coat the carbon nanotube with nickel. This was summarized in the top row of Table 3 as Electrolysis #X, in which 0.81 wt % Ni powder was added to the $Li_2CO_3$ electrolyte, and Nichrome C was used as the anode. The electrolysis was conducted at 0.20 A/cm$^2$ and exhibits a coulombic efficiency of 98.9%. The Ni coating was further improved (appearing more uniform in the SEM) in Electrolysis XI in Table 3 and as the top row in FIG. 7, when a pure nickel, rather than Nichrome C, anode was used, but no Ni powder was added to the electrolytes, and there was no current ramp employed. The electrolysis was conducted at 0.15 A/cm$^2$ and exhibited a coulombic efficiency of 93.4%.

Without being bound by any particular theory, the presence of an excess amount of nickel, along with the other articulated operational parameters of the electrolysis reaction, contributed towards the external coating of nickel forming on the outer surface of the CNTs. The excess nickel can be established in the electrolysis reaction as a result of additive (including as the metal, a metal oxide or a metal salt) melting point of $Li_2CO_3$ is 723° C. Another the inner walls of the electrolytic cell degrading during the electrolysis reaction, the cathode degrading during the electrolysis reaction, the anode degrading during the electrolysis reaction or any combination thereof. As such, when methods employ other articulated operational parameters-including a steel cathode—that resulted in nickel coated CNTs, an excess amount of other metals or metal-containing compounds may also result in CNTs that are coated in the other metals. For example, an excessive amount of a metal—other than nickel-such as, but not limited to: iron, titanium, tin, copper, vanadium, cobalt, zinc, magnesium, aluminium, ruthenium, silver, iridium, palladium, rhodium, and platinum are contemplated as resulting in a metal-coated CNM product and metal-coated CNT allotropes within the CNM product. In addition, excess amounts of metal mixes, metal oxides or any combination thereof are also contemplated herein. In summary, a coating on a allotrope that comprises one metal, a metal mix or a metal oxide are collectively referred to as a metal-coated allotrope.

In some embodiments of the present disclosure, the entire CNM product may be coated. In some embodiments of the present disclosure, the desired allotrope within the CNM product may be coated in metal. For example, employing the embodiments described herein, methods may be employed so that one or more desired allotropes are coated in metal, where such desired allotropes include, but are not limited to: metal-coated carbon nanotubes (CNTs), metal-coated graphitic carbon, metal-coated nano-bamboo, metal-coated conical carbon nanofibers, metal-coated nano-pearls, metal-coated nano-onions, metal-coated hollow nano-onions, metal-coated nano-flowers, metal-coated nano-dragons, metal-coated branch and trunk CNTs (metal-coated nano-trees), metal-coated nano-belts, metal-coated nano-rods, metal-coated long and/or straight CNTs, metal-coated high aspect ratio CNTs, metal-coated thin CNTs and macroscopic assemblies of CNTs, including densely packed, straight metal-coated CNTs, metal-coated nano-sponges and metal-coated nano-webs. In some embodiments of the present disclosure, the relative amount of the metal-coated allotrope-within the total amount of the allotrope present in the CNM product—is between about 5 wt % and about 99.5 wt %. In other embodiments of the present disclosure, the relative amount of the metal-coated allotrope is between about 7.5 wt % and about 97.5 wt %, between about 10 wt % and about 95 wt %, between about 20 wt % and about 92.5 wt % or between about 30 wt % and about 90 wt %.

Without being bound by any particular theory, the exclusion of transition metals from the molten electrolysis environment may prevent their activity as nucleation points for carbon growth and suppress the growth of carbon nanotubes. Suppression of the metal nucleated growth of CNTs, such as through use of a noble metal anode, was an effective means to promote the growth of another nanocarbon: carbon nano-onions. Here, another molten electrolysis pathway was found to ensure a high nano-onion product yield, through addition of lithium phosphate to the electrolyte. As summarized in Electrolyses XII and XIII in Table 3, with the addition of 8 wt % $Li_3PO_4$ to the $Li_2CO_3$ electrolyte, the product was nearly pure (97-98%) carbon nano-onions, as summarized in Table 3. This nano-onion product was the observed not only from carbon, but also from gold, platinum, and silver as well as from zinc and titanium oxides and have been described previously.

TABLE 3

Systematic variation of $CO_2$ electrolysis splitting conditions in 770° C. $Li_2CO_3$ to optimize formation of nickel coated CNTs and onion, flower, dragon, belt and rod nanocarbon allotropes.

| Electrolysis # | Cathode | Anode | Additives (wt % powder) | Electrolysis time | Current density A/cm² | Product Description |
|---|---|---|---|---|---|---|
| X | SST | Nichrome C | 0.81% Ni | 3 h | 0.2 | 60% Ni particle coated CNT 40% 5-10 μm CNT |
| XI | SST | Nickel | — | 4 h | 0.15 | 89% 50-150 μm straight CNT & Ni particle coated CNT |
| XII | Muntz Brass | Nichrome C | 8% $Li_3 PO_4$ | 4 h | 0.2 | 98% nano-onions |
| XIII | Monel | Nichrome C | 8% $Li_3 PO_4$ | 18 h | 0.08 | 97% nano-onions |
| XIV | Muntz Brass | Nichrome C | 0.81% Co | 18 h | 0.08 | 97% nano-flowers |
| XV | Muntz Brass | Nichrome C | 0.81% Co | 18 h | 0.08 | 97% nano-flowers |
| XVI | Monel | Inconel718 | 0.1% $Fe_2O_3$ | 2 h | 0.4 | 94% 50-100 μm nano-dragon |
| XVII | Muntz Brass | Inconel 718 2 layers Inconel 600 | 0.1% $Li_2O$ | 4 h | 0.13 | nano-trees: 98% 80-200 μm CNT with branches and trunk |
| XVIII | Muntz Brass | Inconel 718 | 0.1% $Fe_2O_3$ | 18 h | 0.08 | 80% nano-belt |
| XIX | Monel | Iridium | 0.81% Ni | 18 h | 0.08 | 91% nano-rod CNT | observed to be the case for a wide range of electrolysis synthesis current densities (0.08 to 0.20 A/cm²), with either Muntz Brass or Monel as the cathode, and with (Electrolysis #XII) or without (Electrolysis #XIII) inclusion of an initial current ramp step during the electrolysis.

Figure 8:
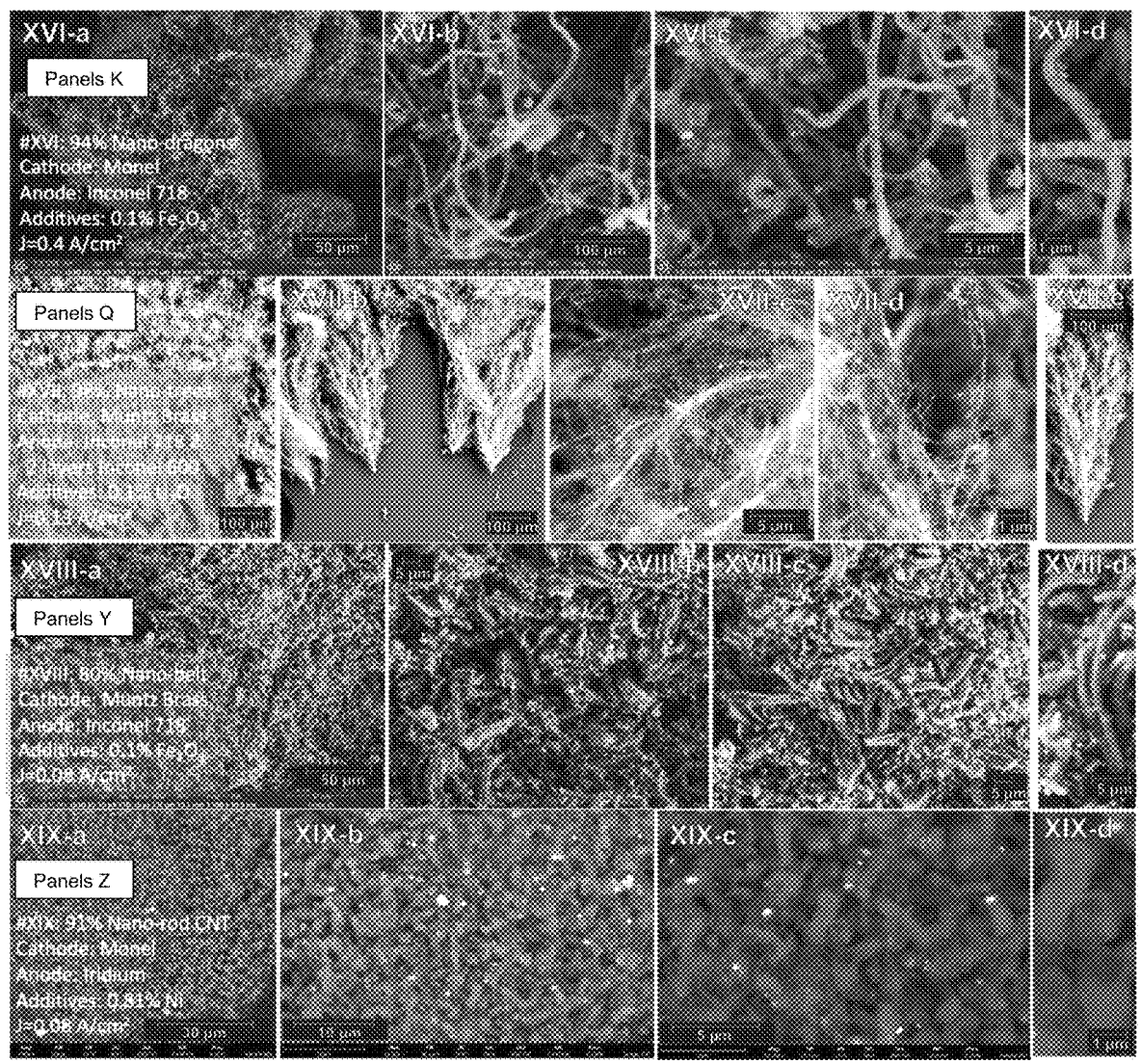
FIG. 8 shows SEM images of the CNM product of nano-dragons, nano-trees, nano-belts and nano-rod allotropes of carbon made according to embodiments of the present disclosure.

A variation of the low current density, Muntz Brass cathode, Nichrome C anode, aged electrolyte leads to a fascinating new high purity molten electrolysis nanocarbon allotrope: nano-flowers. Specifically, after the 24 aging of the electrolyte, an excess (0.081 wt %) of chromium metal powder was added to the electrolyte. The electrolysis was conducted at 0.08 A/cm² and exhibits a coulombic efficiency of 78%. The electrolyses are repeated (as Electrolyses #XIV and XV) and yield the same results as summarized in Table 3, and shown by SEM in FIG. 7. As seen in the lower right panel of FIG. 7, the product does appear as hollow tubes within the flower morphology. Magnification of these hollow tubes with TEM HAADF (not shown) establishes they occur both individually and as an interconnected bunch. However, the product morphology is highly unusual in several aspects. Multiple CNTs originate from a single point of origin giving the flower-like arrangement. Without being bound to any particular theory, this could represent base growth, rather than tip growth, and multiple growth patterns activated from singular activation points. An alternative mechanism to be explored is tip growth, in which the metal nucleation tip is sintered (decreasing in size) as growth progresses, which with continued growth would decrease the diameter of the nanocarbon product. The CNTs appear as short, very straight spikes. The CNTs are frustoconical with a diameter that diminishes (decreases) as the CNT extends away from the point of origin. A small percentage of platelets and garnet-like material was interspersed throughout the floral arrangement. Although new as a majority molten electrolytic CNM product, nano-flowers have been Example 3-Electrochemical Operating Parameters to Synthesize a CNM Product with Desired Allotropes of: Nano-Dragons, Nano-Trees, Nano-Belts and Nano-Rods FIG. 8 shows SEM images of the CNM product of nano-dragons, nano-trees, nano-belts and nano-rod allotropes of carbon by electrolytic splitting of $CO_2$ in 770° C. $Li_2CO_3$. Moving left to right in the panels, the product was analyzed by SEM with increasing magnification. Starting from the left, scale bars in panels K: 50, 10, 5 and 5 μm; for panels Q: 100, 100, 5, 1 and 100 μm; for panels Y: 50, 5 and 5 μm; for panels Z: 30, 10, 5 and 1 μm.

Figure 9A:
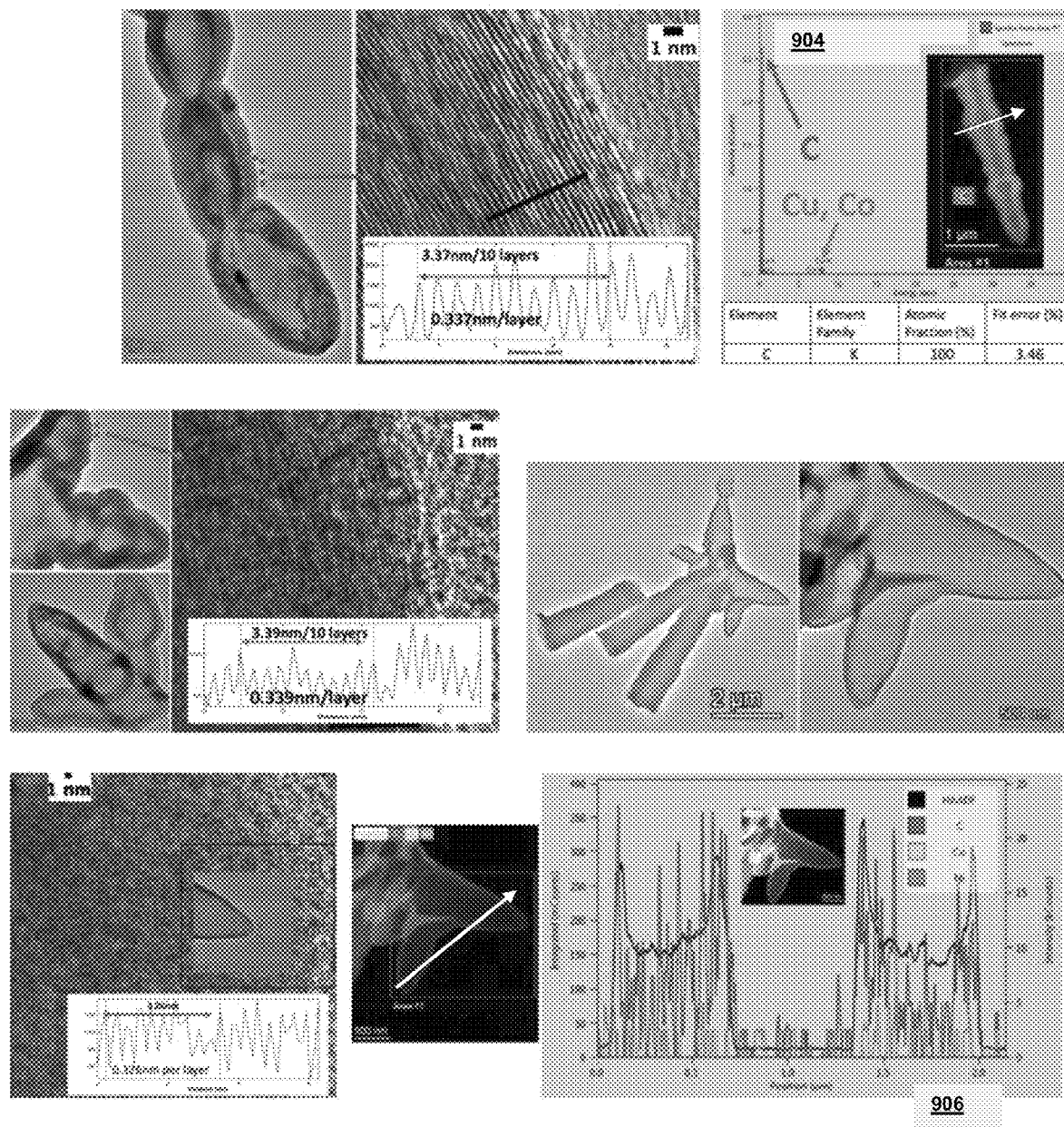
FIG. 9A shows TEM and HAADF elemental analysis of the nano-flower carbon allotrope synthesized by molten carbonate electrolysis, according to embodiments of the present disclosure.
Figure 9B:
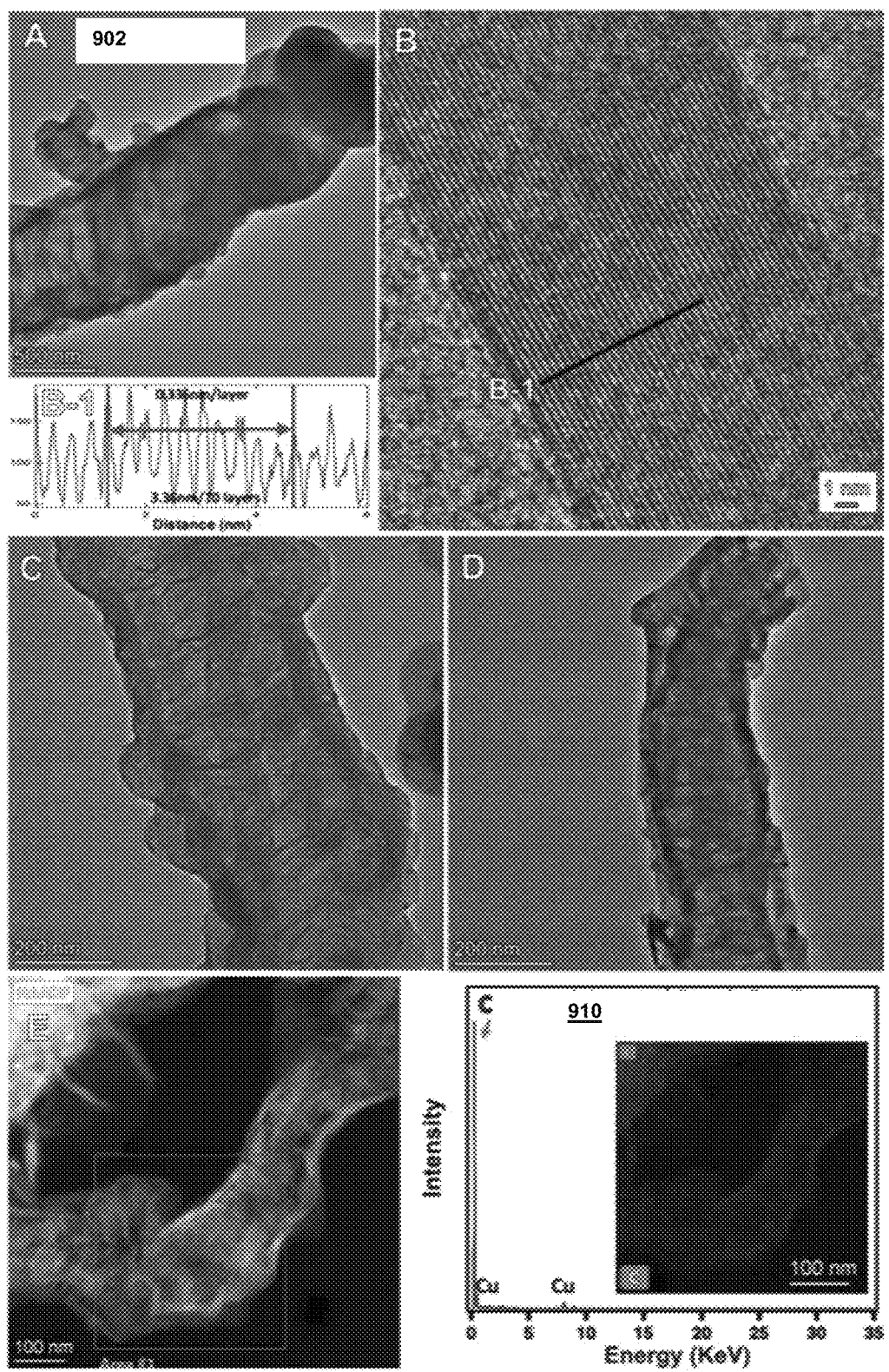
FIG. 9B shows TEM and HAADF elemental analysis of the nano-dragons carbon allotrope synthesized by molten carbonate electrolysis, according to embodiments of the present disclosure.

FIG. 9A shows the TEM and HAADF elemental analysis of the nano-flower allotrope synthesized by molten carbonate electrolysis, according to embodiments of the present disclosure. Panel 904 shows the elemental intensity profile taken along the white arrow. Panel 906 shows the elemental intensity profile taken along the white arrow in the panel to the left. FIG. 9B shows TEM and HAADF elemental analysis of the nano-dragon carbon allotrope 902 synthesized by molten carbonate electrolysis, according to embodiments of the present disclosure. Panel 910 shows the Integrated Atomic Fraction over E Area #1 with carbon being substantially 100% (without regarding any copper content).

Figure 10:
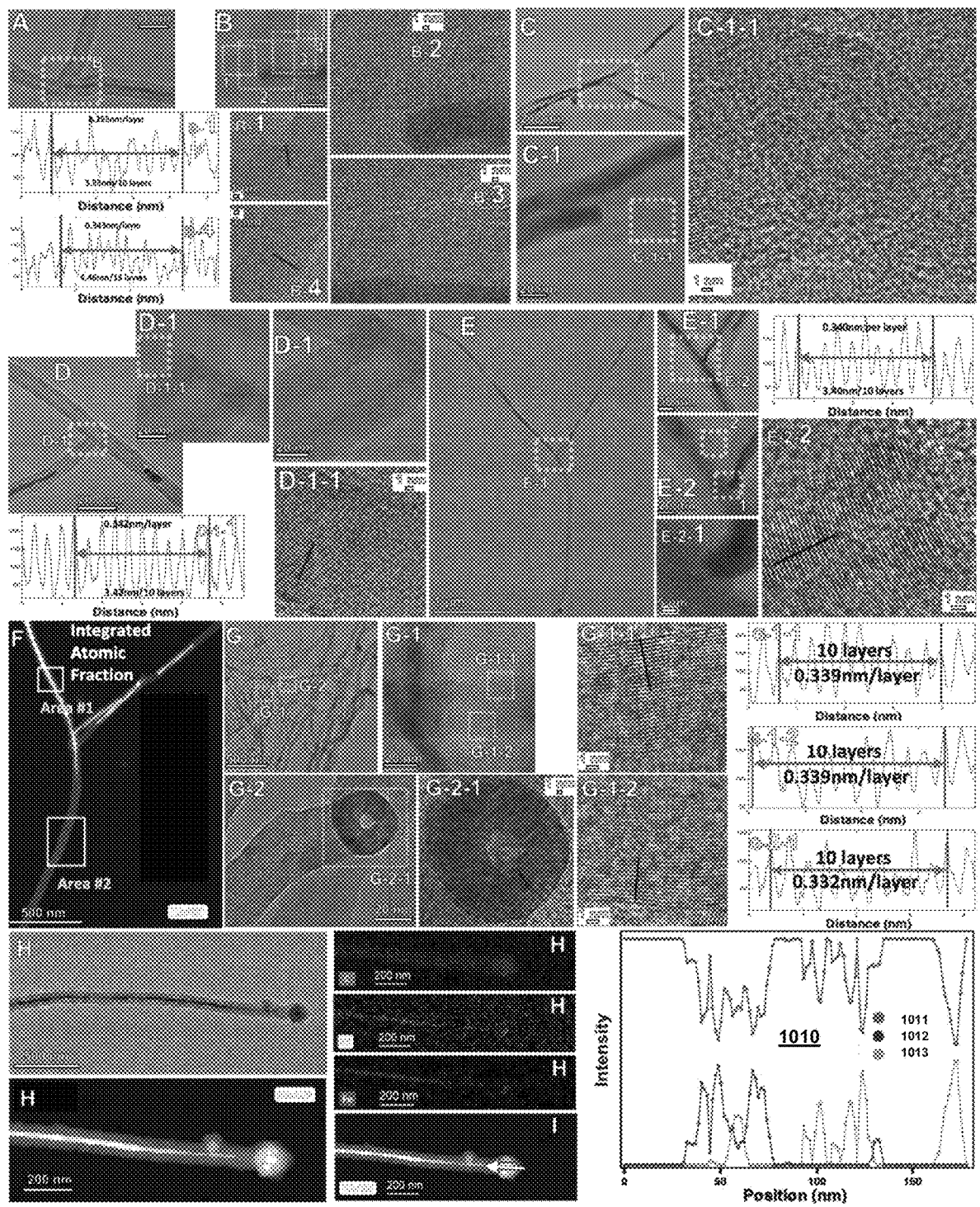
FIG. 10 shows HAADF elemental analysis of the nano-trees carbon allotrope synthesized by molten carbonate electrolysis, according to embodiments of the present disclosure.

FIG. 10 shows HAADF elemental analysis of the nano-trees carbon allotrope synthesized by molten carbonate electrolysis. Panel 1010 shows the elemental intensity profile taken along the white line in lower panel I to the left, wherein 1011 shows the carbon content, 1012 shows the iron content and 1013 shows the nickel content.

Figure 11:
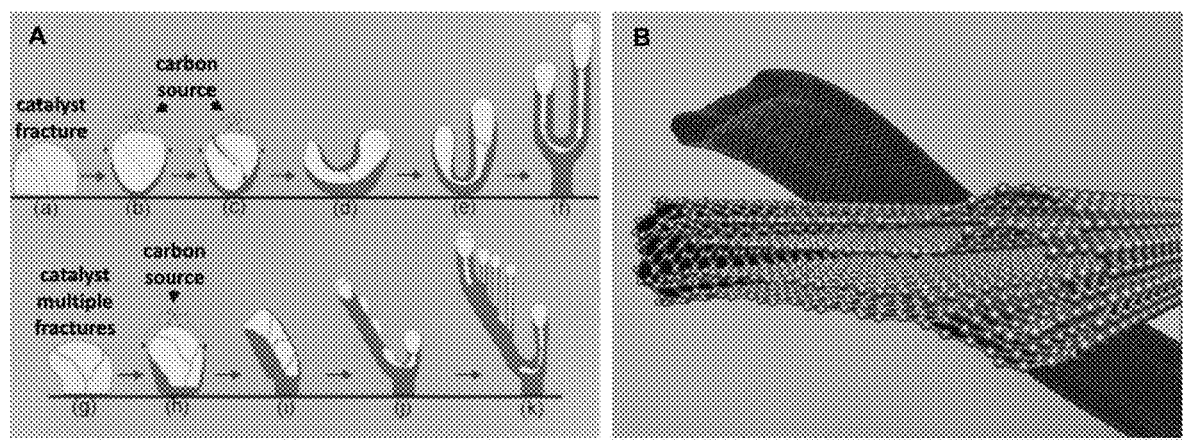
FIG. 11 shows a schematic that illustrates growth of an observed CVD synthesized amorphous branched carbon nano-tree catalyzed by nucleating metal catalyst.

FIG. 11 shows a scheme illustrating the growth of an observed CVD synthesized amorphous branched carbon nano-tree catalyzed by iron carbide (include as the yellow domains). In the left panel, a-f and g-k show fractionation of the yellow iron carbide nucleation site leading to one or more purple colored carbon branches (modified from Takai, A.; Ataee-Esfahani, H.; Doi, Y.; FuiqE, M.; Yamauchi, Y.; Kuroda, K. Pt nanoworms: creation of a bumpy surface on one-dimensional (1D) Pt nanowires with the assistance of surfactants embedded in mesochannels. Chem. Comm. 2011, 47, 7701-7703). The right panel shows a scheme illustrating the structure of a CVD synthesized carbon nano-belt (modified from He, Z.; Maurice, J.-L. Lee, C. S.; Cojocaru, C. S.; Pribat, D. Growth mechanisms of carbon nanostructures with branched carbon nanofibers synthesized by plasma-enhanced chemical vapour deposition. Cryst. Eng. Comm. 2014, 16, 2990-29995).

Figure 12:
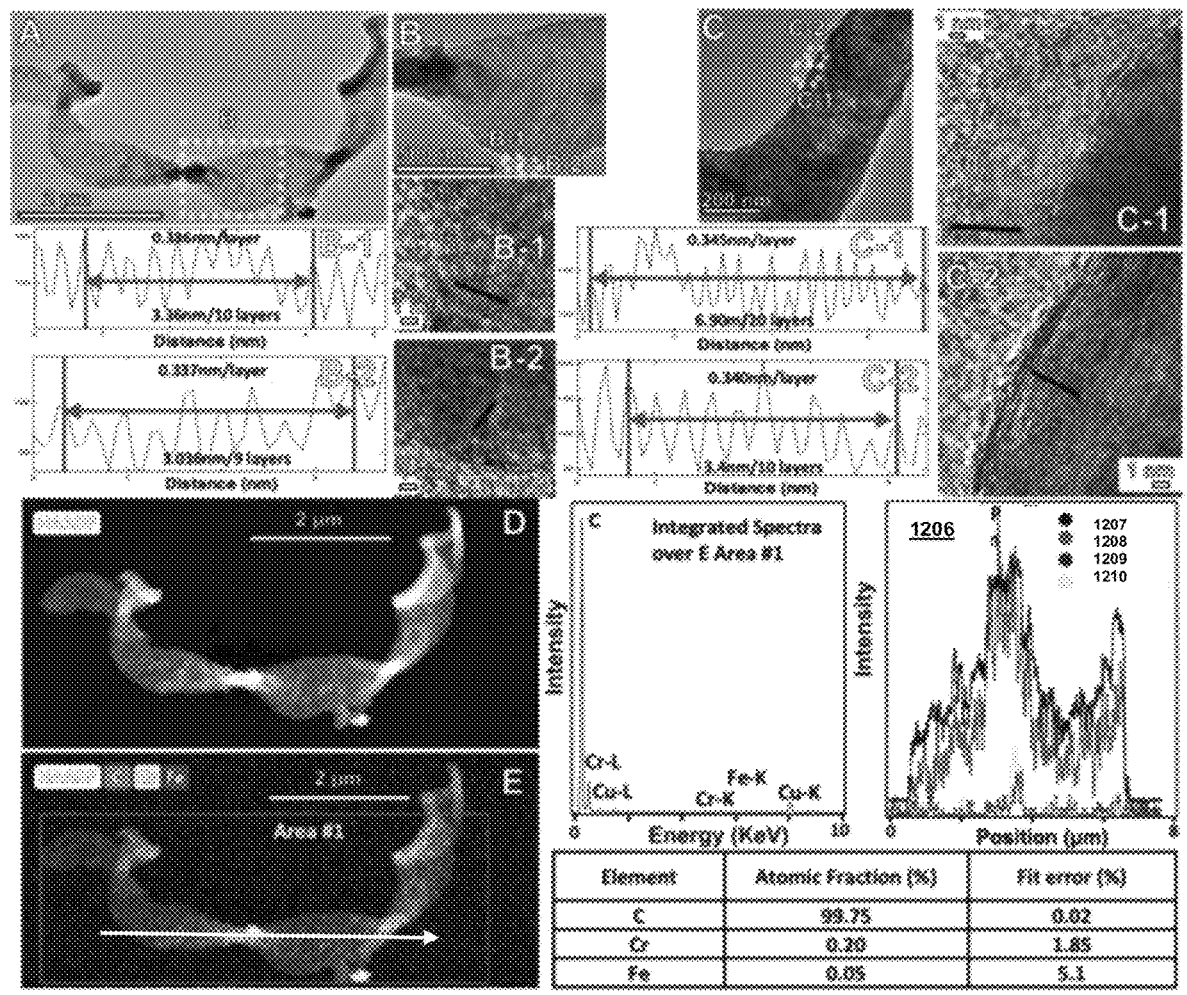
FIG. 12 shows TEM and HAADF elemental analysis of nano-belt carbon allotrope synthesized by molten carbonate electrolysis, according to embodiments of t e present disclosure.

FIG. 12 shows TEM and HAADF elemental analysis of nano-belts carbon allotrope synthesized by molten carbonate electrolysis. Panel 1206 shows the elemental intensity profile taken along the white line in lower panel E to the left, wherein 1207 shows the HAADF data, 1208 shows the carbon content, 1209 shows the iron content and 1210 shows the chromium content.

Figure 13:
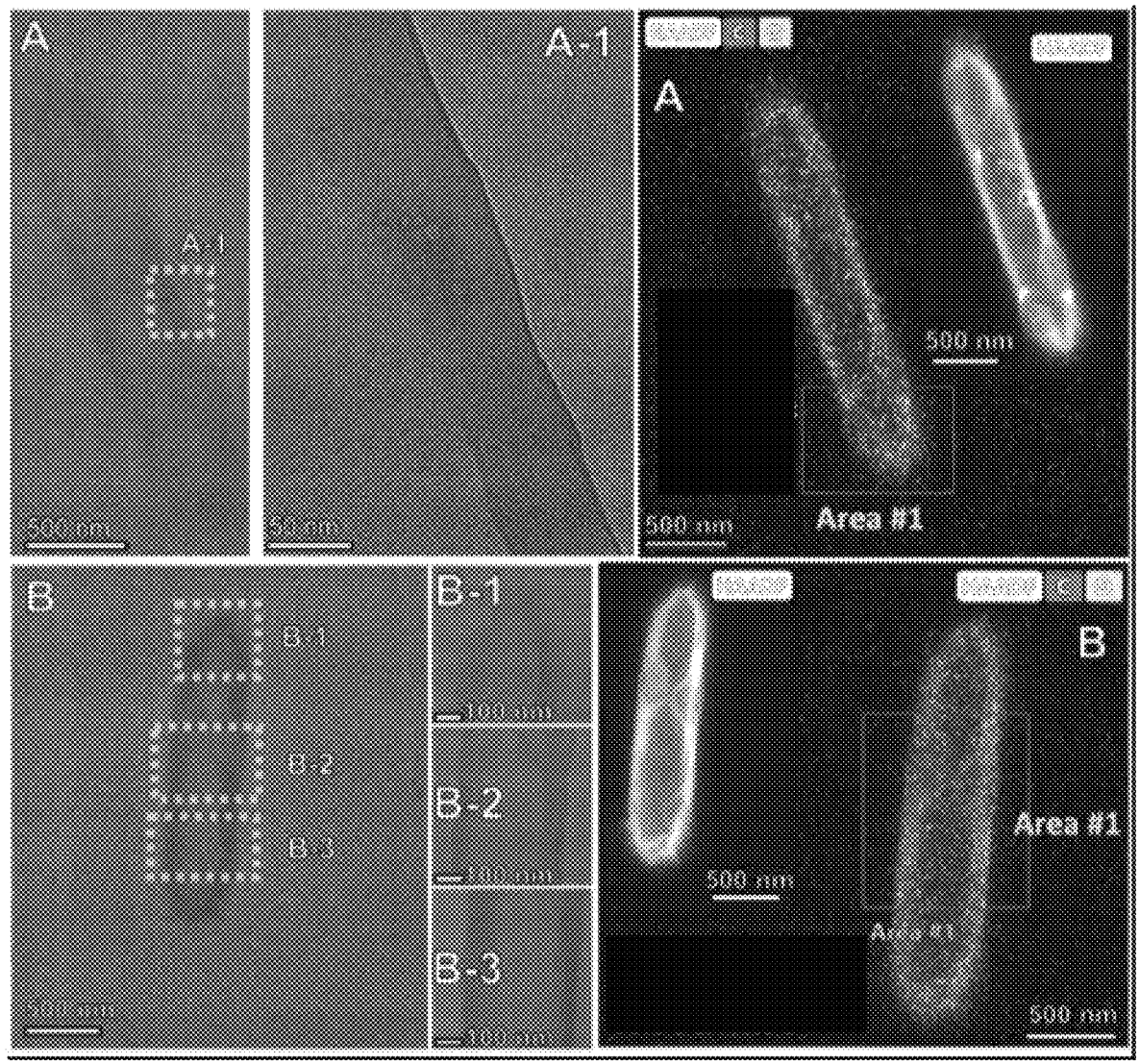
FIG. 13 shows TEM and HAADF elemental analysis of nano-rod carbon allotrope synthesized by molten carbonate electrolysis, according to embodiments of the present disclosure.

FIG. 13 shows TEM and HAADF elemental analysis of nano-rod carbon allotrope synthesized by molten carbonate electrolysis. The upper right hand panel shows the integrated atomic fraction over Area #1 therein with carbon content about 90.6% and oxygen about 9.4%. The lower right hand panel shows the integrated atomic fraction over Area #1 therein with carbon content about 93% and oxygen about 7%.

Variation of the electrochemical conditions of CNT product formation to those of Electrolysis #XVI lead to a change in allotrope from carbon nanotubes to another fascinating morphology referred to here as nano-dragons and presented in Table 3 and FIG. 8 and FIG. 9B. The changes from the earlier syntheses that produced CNTs under similar circumstances, include an Inconel 718 anode, rather than Nichrome C, a higher current density of 0.4, rather than 0.1, A/cm$^2$, (exhibiting a 100% coulombic efficiency), and that electrolyte was not aged. Unlike the other unique electrolytically synthesized nanocarbon morphologies, carbon nano-dragons do not consist of a simple, repeated geometric shape, but rather nano-dragons include a complex combination of cylinders, platelets and spheres. As show in FIG. 9B, the nano-dragon has a generally elongated body CNT with small "legs" or protrusions that extend away from the elongate body. The protrusions comprise smaller branched CNTs, small nodules of metal growth or any combinations thereof.

It is known that the addition of low levels of lithium oxide has led to high quality of CNTs. With use of a specific anode (Inconel 718 with two layers of Inconel 600) the quality of the product was retained, but the morphology of the CNT changes substantially. The inventors have previously observed larger transition metal nodule growth from the CNTs. With the addition of Li$_2$O, branched carbon nano-trees are included as Electrolysis #XVII in Table 3 and FIG. 8. The electrolysis was conducted at 0.13 A/cm$^2$ and exhibits a coulombic efficiency of 98.7%. The nano-trees exhibit distinct growth of smaller CNT branches emanating from larger CNT trunks. The red-circled area on the right panel of Electrolysis #XVII in FIG. 8 shows an example of y section branching. The addition of low levels of iron oxide lead to high quality CNTs. However, with 24 hour aging of the electrolyte followed by subsequent addition, as in Electrolysis #XVIII in Table 3 and FIG. 8, an alternative flattened nanocarbon allotrope was observed, which is referred to herein as nano-belts. The electrolysis was conducted at 0.08 A/cm$^2$ and exhibits a coulombic efficiency of 79%. The nano-belt structure, which appears to consist of a flattened (or "deflated") carbon nanotube.

TEM and HAADF elemental analysis of the nano-flower, nano-dragon, nano-belt and nano-tree structures are presented in FIGS. 9A, 9B, 10, 12 and 13.

FIG. 9A shows the TEM and the elemental composition by HAADF of the new nano-flower nanocarbon allotropes synthesized by molten carbonate electrolysis. As shown, a principal component of the nano-flowers is one or several interconnected tapering tubes containing bulbous sections at regular intervals. The walls are composed of graphene layers as characterized by the typical inter-graphene wall separation of 0.33 to 0.34 nm, as noted in FIG. 9A and as measured by the observed separation between dense TEM carbon planes. As seen in the HAADF images, when the nano-flowers contain not only Cu but also a small amount cobalt.

In FIG. 9B the nano-dragon structure was seen as a graphitic structure, albeit complex. A similar looking Pt, rather than C, structure has been previously observed and described as a bumpy surface on one-dimensional Pt nanowire. The nano-tree allotrope is shown in FIG. 10 to consist of CNTs, but differs from the conventional CNT structures, which generally do not contain merged CNTs. However, the nano-tree morphology includes intersecting CNTs as seen in FIG. 10, whose structures merge and appear to branch off one another. A nano-carbon CVD growth branching mechanism has been suggested and is shown in FIG. 11 catalyzed by fractionation of the nucleation sites leading to carbon branches. In FIG. 10 and FIG. 12 it can be seen that the interior of nano-trees and nano-belts can respectively contain nickel and iron, or nickel in the structure interior. As seen in FIG. 12, the nano-belt product was flat and consists of graphene layers, but other than the measured presence of nickel, the mechanism of this unusual flat morphology was evident from the TEM. CVD nano-belt CNT structures have been previously synthesized with a schematic structure illustrated on the right side of FIG. 11.

Without aging the electrolyte (freshly melted electrolyte), the low current density (0.08 A/cm$^2$, exhibiting a coulombic efficiency of 80%), long term growth (18 hour) growth of carbon nanotubes with a Monel cathode, iridium anode, 0.81% Ni, and no ramped current activation step, leads to squat, ring-like nano-rod allotropes, as seen in FIG. 13, and included in Table 4 as electrolysis XIX. Of the electrolyses presented here, the product was unusual from two physical chemical perspectives. First, the TEM in FIG. 13 reveals no evidence of a layered graphene structure. However, as shown in a later section, this morphology does exhibit an XRD peak, and Raman spectrum, typical of graphitic layered graphene structures. Secondly, as seen in the elemental analysis in FIG. 13, the nano-rods are the only one of the new molten synthesized nanocarbon structures in which a significant concentration of oxygen (7.0 to 9.4 wt %) was observed. With the bulbous rod-like morphology, rather than a growth which increases a CNT's length along with its diameter in time, this appears consistent with a long-term growth dominated by diameter, rather than length, increases.

Example 4-Raman Spectroscopy and XRD Analysis of Various Nano-carbon Allotropes

Figure 14:
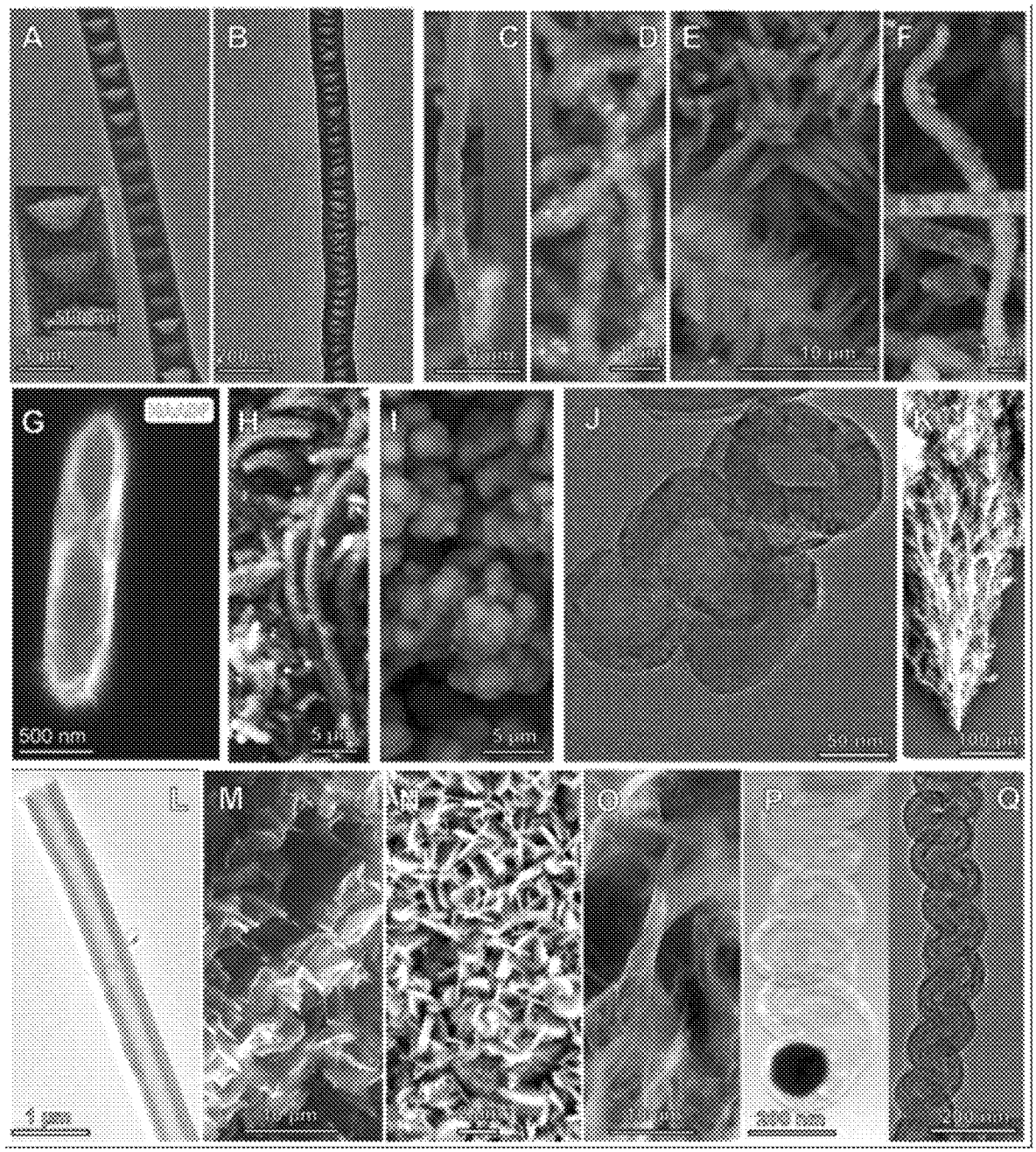
FIG. 14 shows SEM images of various allotropes of carbon synthesized by molten carbonate electrolysis, according to embodiments of the present disclosure.

FIG. 14 shows SEM images of nanocarbon allotropes synthesized by the electrolytic splitting of $CO_2$ in molten carbonate, according to the embodiments of the present disclosure. Top and middle row: nanocarbon allotropes as introduced and synthesized according to embodiments of the present disclosure. The bottom row shows previously synthesized nanocarbon allotropes. Top row (from left to right) conical CNF (panel A), nano-bamboo (panel B), nano-pearl (panel C), Ni coated CNT (panel D), nano-flower (panel F), and nano-dragon (panel F). Middle row: nano-rod (panel G), nano-belt (panel H), nano-onion (panel I), hollow nano-onion (panel J), and nano-tree (panel K). Bottom row (from left to right): CNT, nano-scaffold (panel L, image from Wang, X., Licht, G.; Liu, X.; Licht, S. One pot facile transformation of $CO_2$ to an unusual 3-D nan-scaffold morphology of carbon. Sci Rep. 2020, 10. 21518), nano-platelet, graphene (2 step process, image from Liu, X., Wang, X., Licht, G., & Licht, S. Transformation of the greenhouse gas carbon dioxide to graphene. J. CO2 Util., 36, 2020, 288-294), nano-helices (image from Liu, X.; Licht, G.; Licht, S. The green synthesis of exceptional braided, helical carbon nanotubes and nanospiral platelets made directly from $CO_2$. Mat. Today Chem 2021, 22, 100529).

Figure 15:
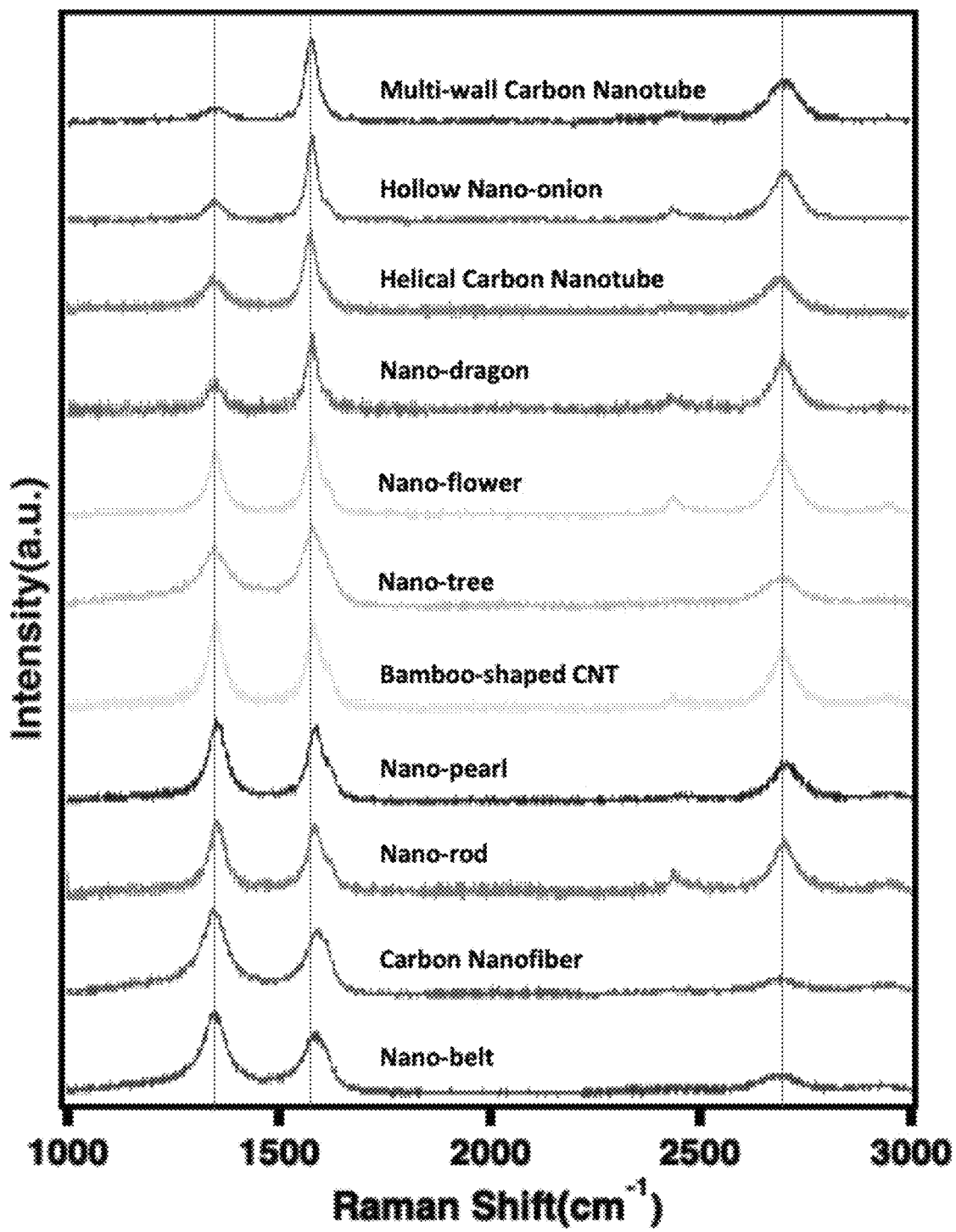
FIG. 15 shows Raman spectroscopy analysis of a CNM product consists of various nanocarbon allotropes and packed carbon nanotube assemblies synthesized by molten carbonate electrolysis, according to embodiments of the present disclosure.

FIG. 15 shows Raman of the CNM product consists of various labeled nanocarbon allotropes and packed carbon nanotube assemblies synthesized by the electrolytic splitting of $CO_2$ in 770° C. $Li_2CO_3$ with a variety of systematically varied electrochemical operational parameters. Table A below provides the references numbers and the related features utilized in FIGS. 165 16A and 16B.

TABLE A

Figure 16A:
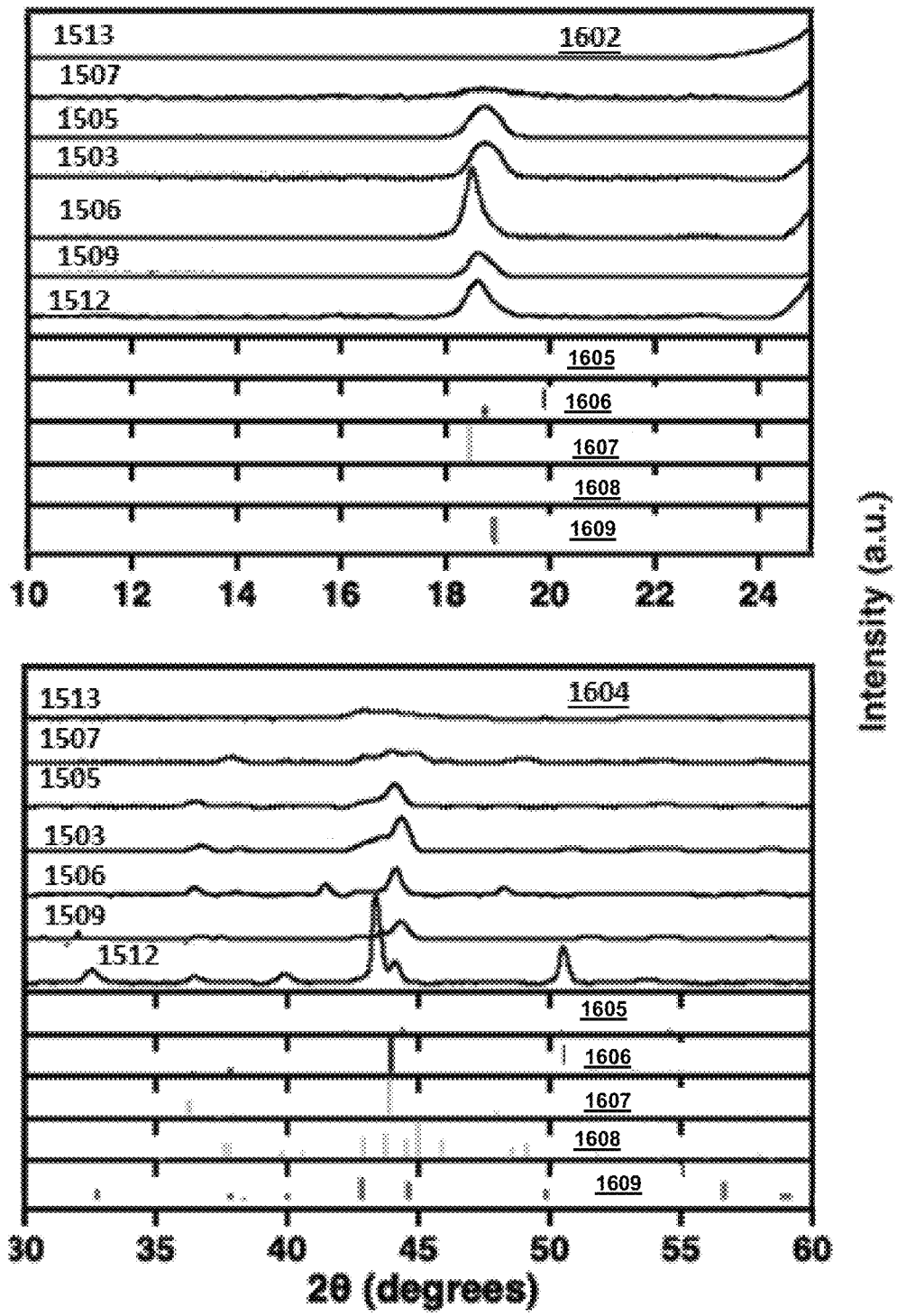
FIG. 16A shows XRD analysis of a CNM product consisting of various nanocarbon allotropes synthesized by molten carbonate electrolysis, according to embodiments of the present disclosure.
Figure 16B:
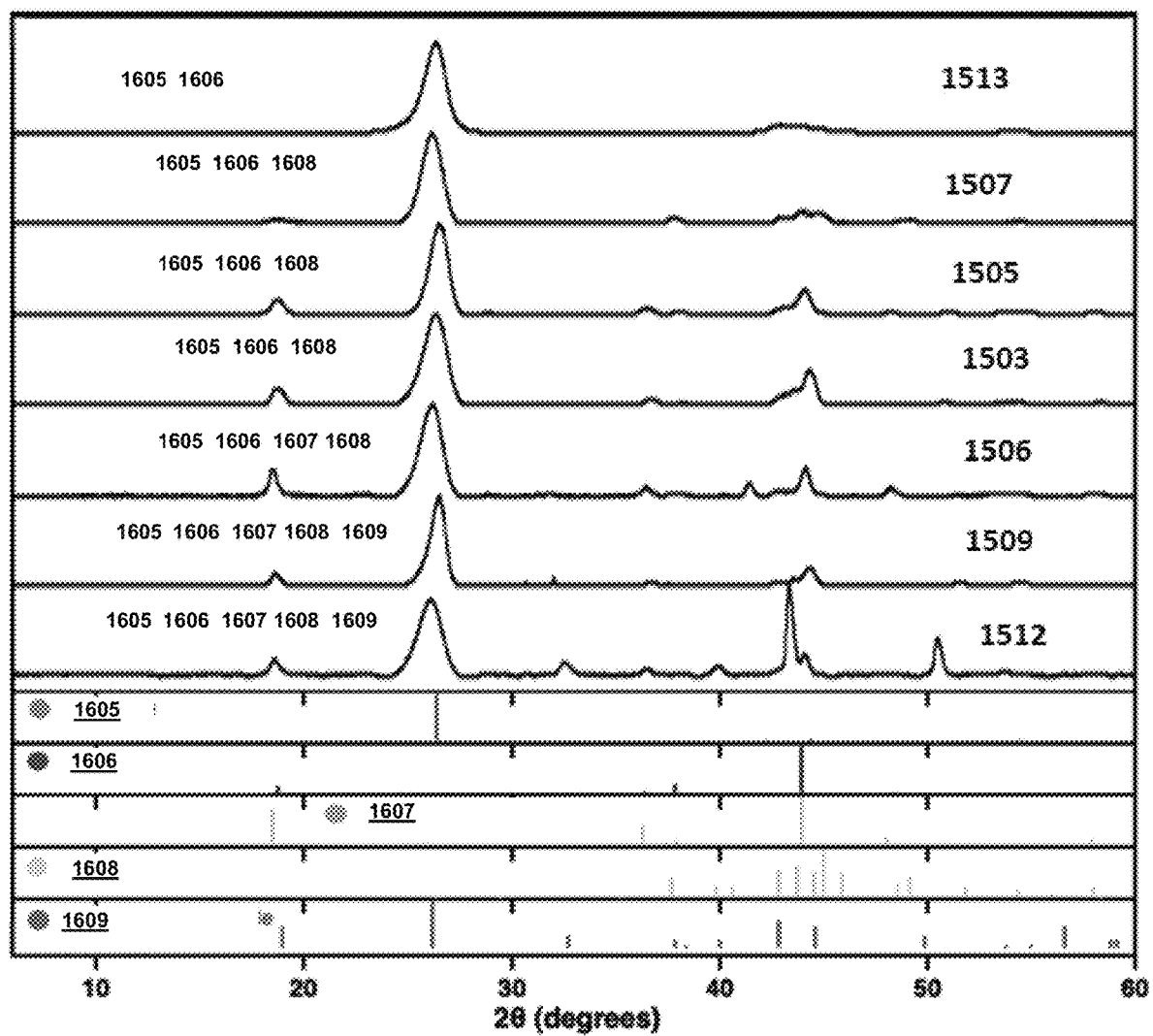
FIG. 16B shows XRD analysis of a CNM product consisting of various nanocarbon allotropes synthesized by molten carbonate electrolysis, according to embodiments of the present disclosure.

Reference numbers used in FIG. 15, 16A and 16B.

| # | text |
|---|---|
| 1502 | Multi-wall Carbon Nanotube |
| 1503 | Hollow Nano-onion |
| 1504 | Helical Carbon Nanotube |
| 1505 | Nano-dragon |
| 1506 | Nano-flower |
| 1507 | Nano-tree |
| 1508 | Bamboo-shaped CNT |
| 1509 | Nano-pearl |
| 1510 | Nano-rod |
| 1511 | Carbon Nanofiber |
| 1512 | Nano-belt |
| 1513 | Nano-bamboo |
| 1602 | 2θ = 20-25 degree |
| 1604 | 2θ = 30-60 degree |
| 1605 | Graphite C |
| 1606 | Lithium Nickel Oxide $Li_2Ni_8O_{10}$ |
| 1607 | Lithium Chromium Oxide $LiCrO_2$ |
| 1608 | Cohenite $Fe_3C$ |
| 1609 | Lithium Copper Oxide $Li_2CuO_2$ |

FIG. 16 shows XRD analysis of the CNM product consisting of various nanocarbon allotropes synthesized by the electrolytic splitting of $CO_2$ in 770° C. $Li_2CO_3$ with a variety of systematically varied electrochemical conditions.

The top row and middle row of FIG. 14 compares microscopy of the new carbon allotropes, made according to the embodiments of the present disclosure, to those structures in the second row that were previously formed by molten electrolysis. The new electrolysis synthesis structures shown are conical CNF, nano-bamboo, nano-pearl, Ni coated CNT, nano-flower, nano-dragon, nano-rod, nano belt, nano-onion (also previously synthesized by alternative methodologies), hollow nano-onion, and nano-tree. The previous distinct nanocarbon structures synthesized were carbon nanotubes, nano-platelet, graphene (a 2-step synthesis of $CO_2$ molten electrolysis followed by exfoliation), and nano-helices.

FIG. 15 presents the effect of variation of the electrolysis conditions on the Raman spectra and XRD of the new carbon products of $CO_2$ electrolysis in 770° C. $Li_2CO_3$. The graphitic fingerprints lie in the 1880-2300 $cm^{-1}$ and are related to different collective vibrations of sp-hybridized C—C bonds. The tangential G-band (at ~1580 cm-1) was derived from the graphite-like in-plane mode of $E_{2G}$ symmetry, and can be split into several modes, two of which are most distinct: the $G_1$ (1577 $cm^{-1}$) and $G_2$ (1610 cm-1). The Raman spectrum exhibited two sharp peaks ~1350 and ~1580 $cm^{-1}$, which corresponded to the disorder-induced mode (D band) and the high frequency $E_{2G}$ first order mode (G band), respectively and an additional peak, the 2D band, at 2700 $cm^{-1}$. The G' peak at ~2300, was likely related to the collective stretching vibrations of sp-hybridized C—C bonds.

The intensity ratio between D band and G band ($I_D/I_G$), which may also be referred to herein as the $I_D/I_G$ ratio, is a useful parameter to evaluate the relative number of defects and degree of graphitization and, therefore, the $I_D/I_G$ ratio can be presented as a range of values (or as a specific number) in order to distinguish one type of nanocarbon structure from another, such as the allotropes described herein. Table 4 summarizes Raman band peak locations and includes calculated ($I_D/I_G$) and ($I_{2D}/I_G$) peak ratios for the various carbon allotropes. A higher ratio $I_D/I_G$ or a shift in $I_G$ frequency is thought to be a measure of increased defects in the carbon graphitic structure. It is also thought that defects that can occur in the graphitic structure include replacement of carbon $sp^2$ bonds, typical of the hexagonal carbon configuration in the graphene layers comprising the structures, with $sp^3$, and increase in pores or missing carbon in the graphene, and enhance defects that cause formation of heptagonal and pentagonal, rather than the conventional hexagonal graphene building blocks of graphene.

TABLE 4

Raman spectra of a diverse range of carbon allotropes formed by molten electrolysis.

| $CO_2$ molten electrolysis product description | $v_D(cm^{-1})$ | $v_G(cm^{-1})$ | $v_{2D}(cm^{-1})$ | $I_D/I_G$ | $I_{2D}/I_G$ |
|---|---|---|---|---|---|
| Multi-wall Carbon Nanotube | 1342.4 | 1576.5 | 2688.7 | 0.30 | 0.60 |
| Hollow Nano-onion | 1346.3 | 1577 | 2694.6 | 0.33 | 0.61 |
| Helical Carbon Nanotube | 1346.1 | 1578.2 | 2692.8 | 0.45 | 0.40 |
| Nano-dragon | 1346.7 | 1580.3 | 2695.0 | 0.67 | 0.62 |
| Nano-flower | 1347.9 | 1582.7 | 2692.2 | 0.78 | 0.50 |
| Nano-tree | 1343.7 | 1583.7 | 2696.4 | 0.82 | 0.47 |
| Nano-bamboo | 1352.0 | 1586.2 | 2696.9 | 1.04 | 0.72 |
| Nano-pearl | 1352.9 | 1588.5 | 2689.3 | 1.05 | 0.52 |
| Nano-rod | 1351.6 | 1586.0 | 2695.9 | 0.78 | 0.81 |
| Carbon Nanofiber | 1349.3 | 1594.9 | 2696.0 | 1.27 | 0.37 |
| Nano-belt | 1348.5 | 1590.5 | 2705.1 | 1.30 | 0.41 |

Typically $I_D/I_G$ for multi-walled carbon nanotubes is in the range of 0.2 to 0.6. Compared to these values, with the exception of the hollow nano-onions, the new carbon allotropes, made according to embodiments of the present disclosure, generally exhibit a higher than 0.6 $I_D/I_G$, evidence of a higher number of defects and perhaps consistent with the greater morphological complexity of these new allotropes. The nano-bamboo, nano-pearl, nano-rod and nano-belts each exhibit a relatively high level of defects, often associated with greater pores and twists and turns in the structure due to the higher presence of $sp^3$ carbons. As observed from Table 4, the order of the increasing $I_D/I_G$ ratio is:

CNT<hollow nano-onion<dragon<flower<nano-trees<bamboo<pearl<rod<CNF<belt

The shift to higher frequencies of the frequency, v, of the G band generally correlates with the observed $I_D/I_G$ variation, with variations due to near lying ratios, and with the exception of an unusually large shift observed for nano-bamboo.

High levels of Ni, Cr or Co added to the electrolyte (nano-bamboo, nano-pearl, and nano-flower allotropes) also appear to correlate with an increase in defects, and the very high added Ni powder used in the nano-rod synthesis correlates with a very high level defects as indicated by the shift in $I_G$ frequency and an increase in $I_D/I_G$. Previously, increased concentrations of iron oxide added to the $Li_2CO_3$ electrolyte had correlated with an increasing degree of disorder in the graphitic structure. Interestingly, it is the synthesis with a low level of added iron oxide powder (but only added prior to the 24 hour aging of the electrolyte) that resulted in the allotrope with the highest level of defects, the nano-belt allotrope.

Lower defects are associated with applications that require high electrical conductivity and strength, while high defects are associated with applications which permit high diffusivity through the structure such as those associated with increased intercalation and higher anodic capacity in Li-ion batteries and higher charge super capacitor.

Figure 18:
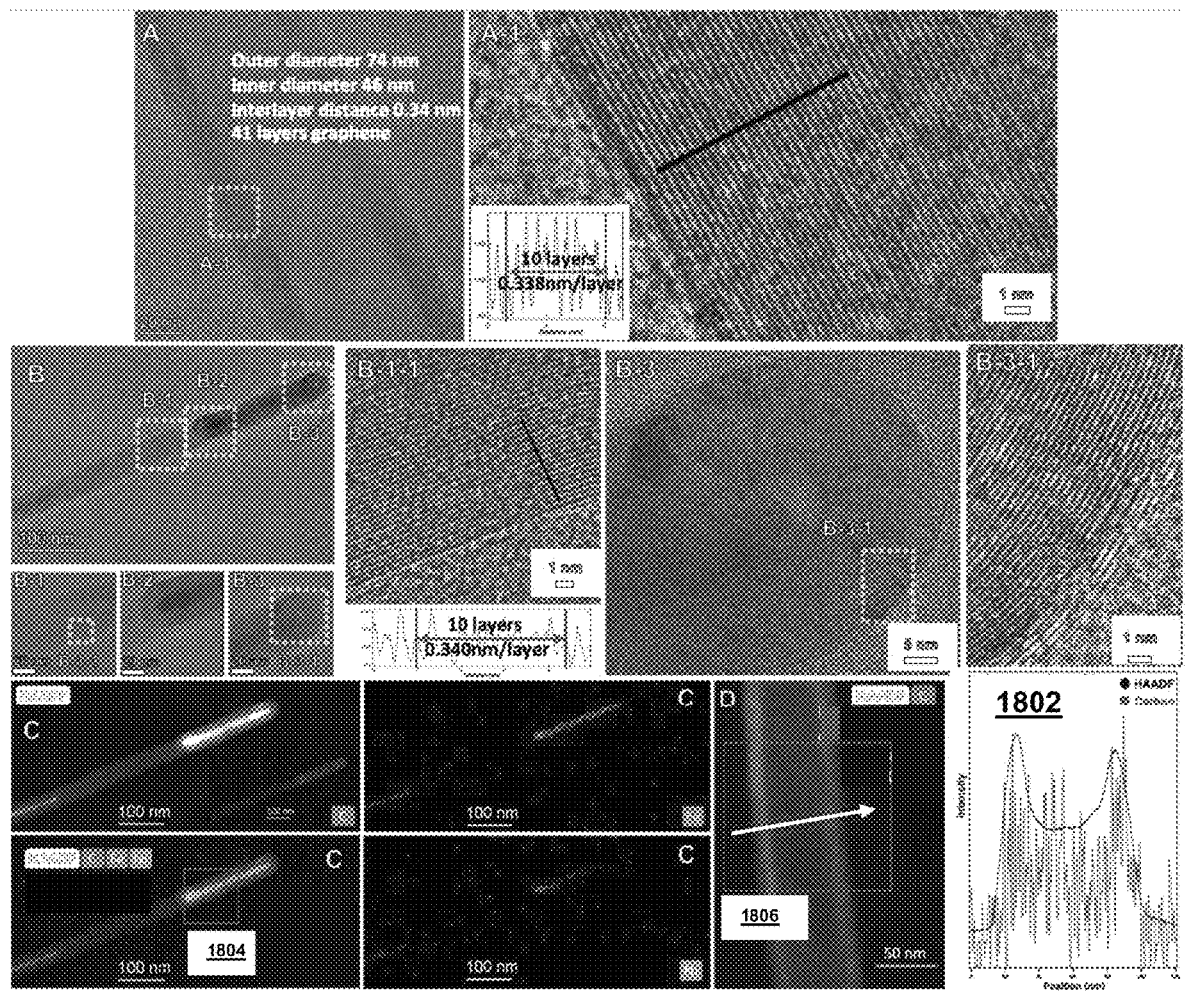
FIG. 18 shows TEM and HAADF of the CNM product of high purity, high yield CNTs synthesized by molten carbonate electrolysis, according to embodiments of the present disclosure.

Along with the XRD library of relevant compound spectra, XRD is presented in FIG. 16 of the new nanocarbon allotrope products, prepared according to embodiments of the present disclosure and as summarized in Tables 2 and 3, and with SEM in FIGS. 2, 7 and 8. Each of the spectra exhibit the strong, sharp diffraction peak at 2θ=27° characteristic of graphitic structures, and no indication of the broad peak indicative of amorphous carbon. In addition to graphite (carbon), the products XRD are grouped by which metal salts are present. Nano-bamboo exhibits the simplest composition with only a lithiated nickel salt (lithium nickel oxide, $Li_2Ni_8O_{10}$) present. Next most complex compositions are seen in FIG. 18 for the nano-dragons, hollow nano-onions nano, and nano-trees allotropes, which include the iron carbide salt $Fe_3C$, lithium nickel oxide and carbon. In FIG. 18, panel 1802 depicts the elemental intensity analysis taken along the white arrow shown in panel D to the left. Panel 1804 shows the integrated atomic fraction over the area inside the green box, with carbon being about 94.3%, iron about 2.5% and nickel about 3.2%. In panel 1806, the integrated atomic fraction over the area inside the green box is about 100% carbon. The next most complex composition is exhibited in the figure in the lower left hand corner, for nano-flowers, which exhibit each of those previous metal salts ($Li_2Ni_8O_{10}$ and $Fe_3C$) as well as a lithiated chromium (III) salt. Finally, both the nano-pearls and nano-belts included an additional lithiated copper salt (lithium copper oxide, $Li_2CuO_2$), and it is noted that they were respectively synthesized with a Muntz brass and a Monel cathode, which both contain copper. To enter the nano-carbon, the copper may need to dissolve from the cathode, which was under cathodic bias. This did not occur with the other nanocarbon allotrope products of the present disclosure. The nano-belt XRD spectra was distinct from the others having a dominant peak at 2θ=43°, reflecting a higher concentration of metal than in the other products. The diminished presence of defects previously noted by the Raman spectra for the hollow nano-onion morphology, along with the XRD presence of $Li_2Ni_8O_{10}$, $LiCrO_2$ and $Fe_3C$ provide evidence that the co-presence of Ni, Cr and Fe as nucleating agents can diminish defects in the structure compared to Ni. On the other hand, the enhanced presence of defects previously noted by the Raman spectra for the nano-belt and nano-pearl morphologies, along with the XRD presence of $LiCuO_2$, provide evidence that the copper salt increases defects in the structure compared to Ni, Fe or Cr as transition meal nucleating agents. Finally, it should be noted that the singular (amongst all the electrolyses) addition of cobalt powder to Electrolyses XIV and XV must be correlated with the subsequent observed formation of the nano-flower allotrope. However, the majority of this cobalt does not make its way into the product as analyzed by XRD in FIG. 16, was observed only in trace quantities by HAADF TEM (to be delineated and probed in future studies) and presumably has another role in promoting formation of this unusual products.

Without being bound by any particular theory, the nanocarbon allotropes made according to embodiments of the present disclosure may lead to unusual physical chemical properties with implications useful to applications, such as those utilizing the high strength, high thermal, magnetic, electronic, piezoelectric, tribological characteristics of graphene-based materials, but which distribute these properties differently throughout the unusual geometries of these novel allotropes. For example, alternative applications such as high capacity lithium anodes, unusual electronics, EMF shielding, improved lubricants, and new structural or polymer composites are contemplated.

Examples 1 through 4 describe nanocarbon allotropes made according to embodiments of the present disclosure and were analysed by SEM, TEM, TEM with HAADF, Raman and XRD. With the exception of the nano-rod structure, each of the structures was graphitic in nature containing graphene layers arranged in a variety of geometries. The graphene layers exhibit the characteristic, interlayer spacing of 0.33 to 0.34 nm. Except for the presence of Ni, Fe, Cr and occasionally Cu, which may serve as nucleating growth sites, each of the structures was pure carbon. Generally, intersecting graphene layers did not merge, but in in the nano-tree allotrope the graphene layers bend at intersections leading to the observed branched structure.

Many of the structures including nano-bamboo, nano-pearl, Ni-coated CNTs and conical CNFs exhibit walls containing concentric graphene layers. The nano-dragon and nano-belt structures include layered planer or planar-twisted graphene layers. Several of the observed structures, including nano-trees, and hollow and filled nano-onions exhibit concentric, highly spherical graphene layers generally composed of carbon and containing a low level of internal transition metal. Without being bound by any particular theory, the embodiments of the present disclosure may provide a new synthetic pathway to the formation of nano-onions via phosphate addition to the electrolyte, which may be facilitated by phosphate selectively binding transition metal ions.

All electrochemical methods from Electrolysis #IV onward produced a high purity product of the stated allotrope, with the exception of the conical CNFs that were a minority (6%) within a majority of nano-bamboo carbon, and the moderate purity (85%) nano-belt carbon product. Coulombic efficiency of the electrolyses ranged from 79 to 80% at lower current densities of 0.08 A/cm$^2$, to over 99% at current densities of 0.2 A cm$^2$ or higher. The high purity products each exhibited sharp XRD graphic peaks, and a moderate (0.3 to 1.3) Raman $I_D/I_G$ ratio indicative of a moderate level of defects in the carbon structure. In addition to a majority of pure, graphitic carbon, the XRD also exhibited different singular or mixed transition metal salts of either iron carbide, or nickel, chromium or copper lithiated oxides.

TEM HAADF of the new nanocarbon allotropes showed that their inner core was generally free of metals (void, with the walls 100% carbon), but in other areas the void was filled with transition metals of Ni, Fe and/or Cr. With the exception of the nano-rod allotrope, each of the allotropes included distinct graphene layers with a graphene characteristic, inter-layer spacing of 0.33 to 0.34 nm. Depending on the allotrope, adjacent graphene layers were organized either in a planer, cylindrical or spherical geometry. When the internal transition metal was within the allotrope tip, the layered graphene walls are observed to bend in a highly spherical fashion around the metal supporting the transition metal nucleated CNT growth mechanism. The use of a nickel anode, or an excess of added nickel to the electrolyte, lead to coated nickel coated CNTs when stainless steel was used as the electrolysis cathode. Generally, intersecting graphene layers did not merge, but in the nano-tree allotrope, with a trunk CNT and branch CNTs that extend away from the trunk CNT, the graphene layers bend (or are bent) to become part of a CNT intersection consistent with branching.

Without being bound by any particular theory, molten carbonate electrolysis of $CO_2$ provides an effective path for the synthesis of a portfolio of the unusual, valuable nanocarbon allotropes of Examples 1 through 4. Mass production of these allotropes from $CO_2$ may provide a valuable incentive to consume this greenhouse gas. Such allotropes are rare, or were previously non-existent, and are not generally commercially available. However, those that are in use, such as nano-onions-which is known to be made by pyrolysis of nano-diamonds or by CVD—have a high carbon footprint and have associated costs at over $1 million/tonne. CNT production by the molten carbonate electrolysis of $CO_2$ is a low cost synthesis, comparable to the cost of aluminum oxide splitting in the industrial production of aluminum. The new allotrope synthesis conditions consist of small variations of the scaled molten carbonate electrolysis process with a comparable, straightforward path to scale-up to contribute to consumption of $CO_2$ and climate change mitigation.

Example 5—Electrolysis Operational Parameters for Making a CNM Product with a High Purity/High Yield of CNTs Further embodiments of the present disclosure relate to electrochemical process conditions that yield a high purity, high yield CNT product by electrolysis of $CO_2$ in 770° C. lithium carbonate. An in depth look at the material composition and morphologies of the products was conducted, particularly around the transition metal nucleation zone of CNT growth. The latter part of this discovery reveals molten electrochemical conditions that produce macroscopic assemblies of CNTs.

Figure 17:
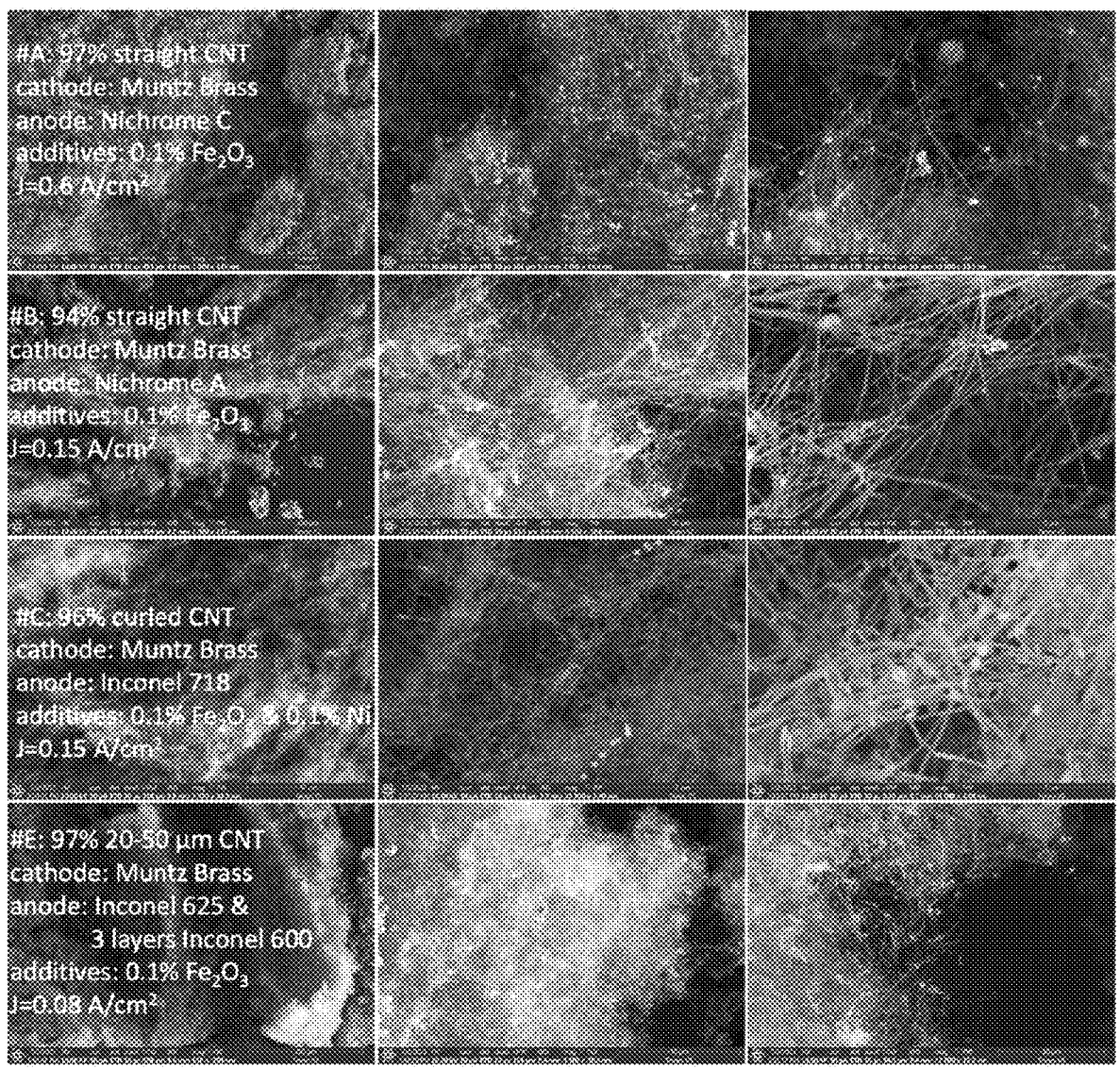
FIG. 17 shows SEM images of the CNM product of high purity, high yield carbon nanotubes synthesized by molten carbonate electrolysis, according to embodiments of the present disclosure.

FIG. 17 shows SEM images of the CNM product of high purity, high yield carbon nanotubes under a variety of electrochemical conditions by electrolytic splitting of $CO_2$ in 770° C. $Li_2CO_3$. The washed product was collected from the cathode subsequent to the electrolysis described in Table 5. Moving left to right in the panels, the product is analyzed by SEM with increasing magnification. Scale bars in panels (starting from left) are for panels A: 100, 50 and 10 μm; for panels B: 100, 20 and 5 μm; for panels C: 40, 5 and 2 μm; for panels E: 200, 40 and 10 μm.

TABLE 5

A variety of Electrolytic $CO_2$ splitting conditions in 770° C. $Li_2CO_3$ producing a high yield of carbon nanotubes.

| Electrolysis # | Cathode | Anode | Additives (wt % powder) | Electrolysis time | Current density A/cm² | Product Description |
|---|---|---|---|---|---|---|
| A | Muntz Brass | Nichrome C | 0.1% $Fe_2O_3$ | 0.5 h | 0.6 | 97% Straight 50-100 μm CNT |
| B | Muntz Brass | Nichrome A | 0.1% $Fe_2O_3$ | 4 h | 0.15 | 94% Straight 20-80 μm CNT |
| C | Muntz Brass | Inconel 718 | 0.1% $Fe_2O_3$ 0.1% Ni | 4 h | 0.15 | 96% curled CNT |
| D | Muntz Brass | Nichrome C | 0.1% $Fe_2O_3$ | 15 h | 0.08 | 70% 10-30 μm CNT |
| E | Muntz Brass | Inconel 625 3 layers Inconel 600 | 0.1% $Fe_2O_3$ | 15 h | 0.08 | 97% 20-50 μm CNT |
| F | Muntz Brass | Inconel 718 2 layers Inconel 600 | 0.1% $Fe_2O_3$ | 4 h | 0.15 | 98% straight 100-500 μm CNT |
| G | Muntz Brass | Inconel 718 3 layers Inconel 600 | 0.1% $Fe_2O_3$ 0.1% Ni | 15 h | 0.08 | 90% Curled CNT or fibers |
| H | Muntz Brass | Nichrome C | 0.1% $Fe_2O_3$ | 1 h | 0.4 | 96% Straight 100-200 μm CNT |
| I | Monel | Nichrome C | 0.1% $Fe_2O_3$ | 1 h | 0.4 | 97% Straight 20-50 μm CNT |
| J | Monel | Nickel | / | 2 h | 0.2 | 70% thin 10-20 μm CNT Rest: Onions |
| K | Monel | Nichrome C | 0.1% $Fe_2O_3$ | 2 h | 0.1 | 97% 30-60 μm straight CNT |
| L | Monel | Nichrome C | 0.5% $Fe_2O_3$ | 15 h | 0.08 | ~25% curled CNT ~70% straight CNT |
| M | Monel | Iridium | 0.81% Cr | 18 h | 0.08 | 97% thin 50-100 μm CNT |

The electrochemical process conditions that relate to the high purity CNT synthesis were systematically varied to determine other electrochemical conditions support the high purity, low defect synthesis of straight (non-helical) CNTs. Examples of the conditions which are varied are: composition of the cathode, composition of the anode, additives to the lithium carbonate electrolyte, current density and time of the electrolysis. Variations of the electrodes include the use of cathode metal electrodes such as Muntz brass Monel, or Nichrome alloys. Anode variations include noble anodes such as iridium, various nickel containing anodes including nickel, Nichrome A or C, Inconel 600, 625, or 718, or, specific layered combinations of these metals. Electrolyte additives that are varied include $Fe_2O_3$, and nickel or chromium powder, and electrolyses are varied over a wide range of electrolysis current densities. Several electrolyses studied here which yield high purity, high yield carbon nanotubes are described in Table 5. Scanning electron microscopy (SEM) of the products of a variety of those CNT syntheses as conducted by $CO_2$ electrolysis in molten $Li_2CO_3$ at 770° C. are presented in FIG. 17.

For Electrolysis #A, the top row of Table 5 presents electrochemical conditions, and the top row of FIG. 17 presents SEM of product, of a repeat of the electrochemical conditions of the described previously: 0.1 wt % $Fe_2O_3$ electrolysis (same lithium carbonate electrolyte, same Muntz Brass cathode and Nichrome C anode, same 0.6 A/cm² current density and 30 minute electrolysis duration), but uses a simpler (from a material perspective) alumina (ceramic $Al_2O_3$), rather than stainless steel 304, electrolysis cell casing. Use of the alumina casing in this discovery limits the pathways for metals to enter reducing parameters to evaluate, and possibly effect, the electrolytic system. Note, however, that the stainless steel 304 was not observed to corrode, and the switch from stainless to alumina was not observed to materially affect the electrolysis product. The CNT product is again 97% purity, coulombic efficiency is 99%, which quantifies the measured available charge (current multiplied by the electrolysis time) to the measured number of 4 electrons per equivalent of C in the product, and the carbon nanotube length is 50 to 100 µm.

In the second row of FIG. 17 (panels #B) the current density changes, which is lowered to 0.15 A/cm² and the electrolysis time is increased to 4 hours. The result of these modifications is a decrease in product purity to 94%, a decrease in CNT length to 20-80 µm, and a modest decrease in coulombic efficiency to 98%. At this current density, as observed in the third row of FIG. 2, panels #C, addition of 0.1 wt % Ni along with the 0.1 wt % $Fe_2O_3$, results in 96% purity zigzag, twisted, rather than straight CNTs. These twists can be induced by over-nucleation decreasing control of the CNT linear growth. In the most magnified of these product images (right side of the FIG. 17, with 2 µm scale bar resolution) evidence of the over-nucleation is observed in the larger nodules visible at the CNT tips and joints.

At a low current density of 0.08 A/cm², with an electrolyte additive of 0.1 wt % $Fe_2O_3$, the conventional Muntz Brass and Nichrome electrodes exhibit a significant drop in CNT product purity to 70%. Coulombic efficiency tends to drop off with current density, and in this case the coulombic efficiency of the synthesis was 82%. Product purity can be increased by refining the mix of transition metals available during the electrolytes or increasing surface area. Alloy composition of the metals used as electrodes is presented in Table 1. Metal variation was further refined by combining the metals in Table 1 as anodes, for example using a solid sheet of one Inconel alloy, layered with a screen or screens of another Inconel alloy. This approach is utilized in the lowest row of FIG. 17 (panels #E), which utilizes an anode of Inconel 625 with 3 layers of (spot welded) 100 mesh Inconel 600 screen, a return to a single electrolyte additive (0.1 wt % $Fe_2O_3$) and a very low current density of 0.08 A/cm². As seen in panels #E of FIG. 17, the product is high purity (97%) and consists of 20-50 µm length CNTs, and the coulombic efficiency was 75%. Not shown, but included in Table 5 (Electrolysis #G), is that under the same electrode, and the same 0.08 A/cm² electrolysis conditions. However, with the electrolyte addition of both 0.1 wt % $Fe_2O_3$ and 0.1 wt % Ni at J=0.15 A/cm², the product is twisted CNTs as in FIG. 17 panels #C, the purity is 96%, and the coulombic efficiency is 80%.

FIG. 18 shows TEM and HAADF of the CNM product of high purity, high yield CNTs under the Electrolysis #E (Table 5) electrochemical conditions by electrolytic splitting of $CO_2$ in 770° C. $Li_2CO_3$. In the top row the product is analyzed by TEM with scale bars of 20 nm (left panel) or 1 nm (right). Moving left to right in the second row there are scale bars of 100, 5, 5 and 1 nm. Third row's scale bars are 100 or 50 nm. Bottom row scale bars are 20, 1 and 1 nm.

The syntheses listed in Table 5 delineate the electrochemical growth conditions for the high purity growth of carbon nanotubes each exhibiting the characteristic concentric multiple graphene cylindrical walls. This is observed in FIG. 18, which presents TEM and HAADF of a typical example (the product of Electrolysis #E as further described in Table 5 and FIG. 17), and which provides general structural and mechanistic information of carbon nanotubes synthesized by molten electrolysis. As seen in the top row of the figure, the carbon nanotubes are formed by successive concentric layers of cylindrical graphene. The graphene is identified by its characteristic inter-graphene layer separation of 0.33 to 0.34 nm as measured in the figure by the spacing between the dark layers of uniform blocked electron transmission on the magnified top right side of the figure. This CNT has an outer diameter of 74 nm, and inner diameter of 46 nm and by counting dark rows it is determined that the number of graphene layers in this CNT is 41. The right side of the third row of FIG. 18 shows measurements of the carbon elemental profile of the CNT. This profile is swept laterally from the tube's exterior (no carbon) through the left wall (carbon), then through the void of interior of the tube (low carbon from the exterior backside wall), then through the right wall (carbon) and finally to the exterior of the tube on the outer left side (no carbon). Also the integrated elemental profile of area 1 of this panel is shown, which exhibits 100.0% carbon (fit error 1.3%).

On the right side of row 2 of FIG. 18, the parallel 0.34 nm spacing for the graphene layers in the CNT walls is again observed. This panel also includes dark areas of metal trapped within the CNT, and which serves as a snapshot in time of the growth of the CNT. In the third row of FIG. 18, HAADF analysis of Area #1 has an elemental composition for this area including the walls with the trapped interior metal of 94.4% carbon, 2.5% Fe and 3.2% Ni has distributed according to the individual C, Fe and Ni HAADF maps included in FIG. 18. The second row of FIG. 18 also shows the tip of the CNT, which includes trapped metal. The transition metal serves as a nucleating agent, which supports formation of the curved graphene layers shown at the tip of the CNT, which is a major component of the CNT growth mechanism. While occurring in an entirely different physical chemical environment than chemical vapor deposition (CVD), this molten carbonate electrolysis process of transition metal nucleated growth CNTs appears to be similar to those noted to occur for CVD CNT growth. This is despite the fact that CVD is a chemical/rather than electrochemical process, and occurs at the gas/solid, rather than liquid/solid interface.

Figure 19:
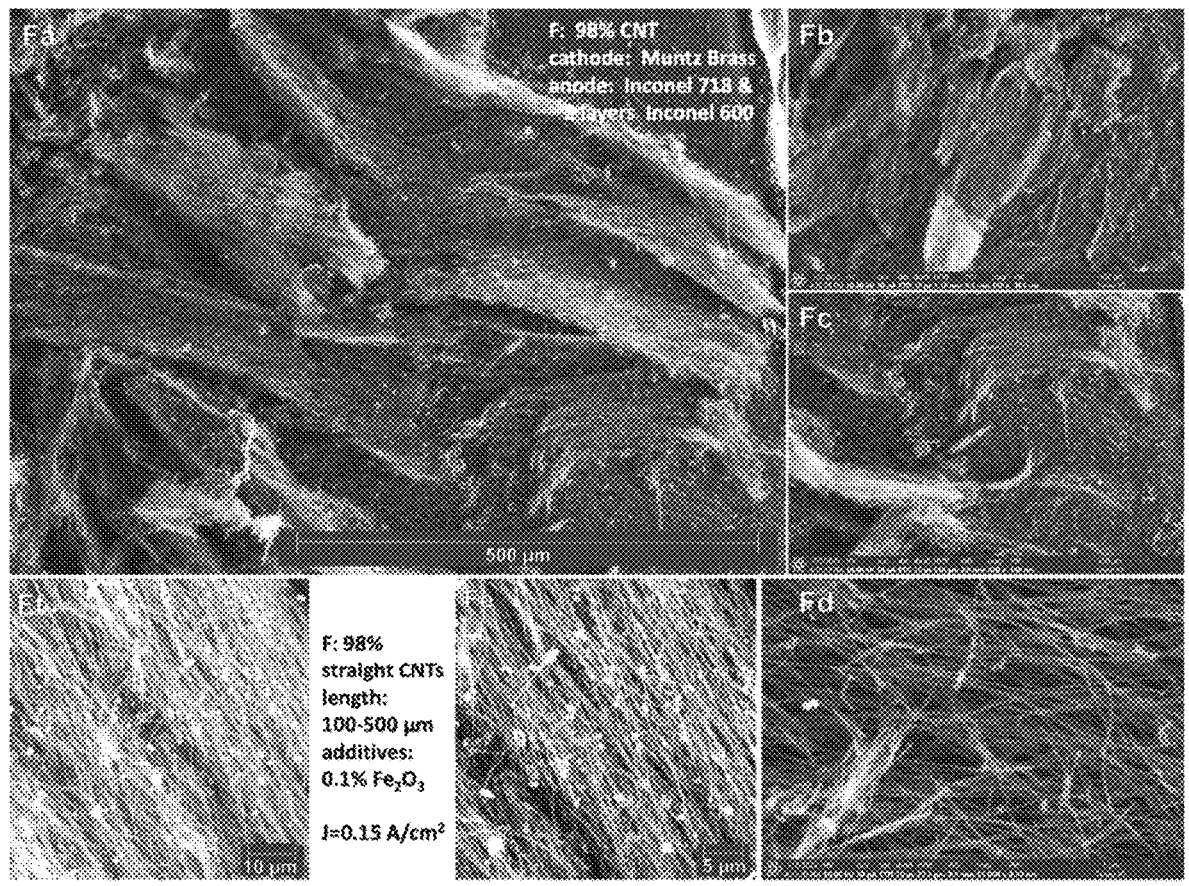
FIG. 19 shows SEM images of the CNM product of high aspect ratio (and high purity and yield) CNTs synthesized by molten carbonate electrolysis, according to embodiments of the present disclosure.

Example 6—Electrolysis Operating Parameters for Making a CNM Product with High Aspect Ratio CNTs FIG. 19 shows SEM images of the CNM product of high aspect ratio (and high purity and yield) CNTs prepared by electrolysis #F in Table 5, splitting $CO_2$ in 770° C. $Li_2CO_3$, according to the embodiments of the present disclosure. Moving left to right in the panels of FIG. 19, the product is analyzed by SEM with increasing magnification. Scale bars in panels Fa-Ff (clockwise from top) are 500, 400, 100, 5, 5 and 10 μm.

FIG. 19 shows SEM images of the product of the electrochemical configuration that yields the longest (100 to 500 μm long) and highest purity (98%) CNTs at high coulombic efficiency (99.5%) of those studied here (described as Electrolysis #F in Table 5). As with the previous configuration that yielded nearly as high purity, but shorter, CNTs. The synthesis used an 0.1 wt % $Fe_2O_3$ additive to the $Li_2CO_3$ electrolyte, a Muntz Brass cathode and an Inconel 718 anode with layered Inconel 600 screen. However, this synthesis found an optimization in CNT purity and length using 2, rather than 3 layers of Inconel 600, and using a higher current density (0.4, rather than 0.08, $A/cm^2$) and shorter electrolysis time (4, rather than 15, hours). With a diameter of <0.2 μm, these CNTs can have an aspect ratio of >1,000. As correlated with the alloy composition in Table 5, the smaller number of Inconel 600 layers reflects a potential for the need for inclusion of anodic molybdenum available in that alloy, but at a controlled, lower concentration, to achieve the resultant high purity, high aspect ratio CNTs. As shown in FIG. 19, the CNTs are densely packed and largely parallel, and as discussed herein would comprise a useful candidate for use in nano-filtration.

Figure 20:
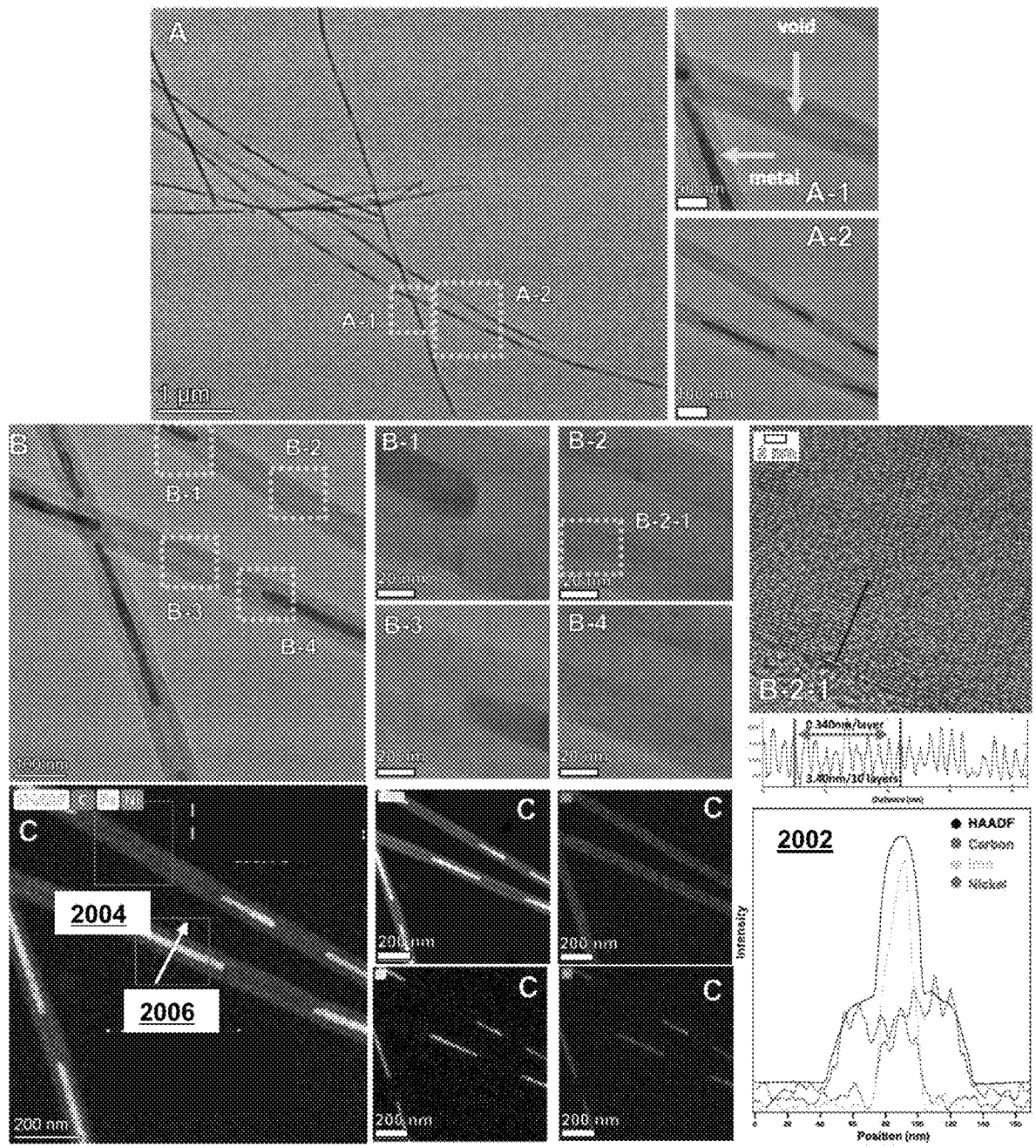
FIG. 20 shows TEM and HAADF analysis of a CNM product of high purity, high yield CNTs synthesized by molten carbonate electrolysis, according to embodiments of the present disclosure.

FIG. 20 shows TEM and HAADF analysis of the CNM product of high purity, high yield CNTs under the Electrolysis #F (Table 5) electrochemical conditions by electrolytic splitting of $CO_2$ in 770° C. $Li_2CO_3$. In the top row the product is analyzed by TEM with scale bars of 1 μm (left panel) or 100 nm (right). Scale bars in the middle right moving left to right have scale bars of 50, 20 and 1 nm. HAADF measurements in the bottom panel each have scale bars of 200 nm. Panel 2002 shows the elemental intensity data taken along the white arrow in shown in the panel to the left. Panel 2004 shows the integrated atomic fraction data in the green box above, with carbon being substantially 100%. Panel 2006 shows the integrated atomic fraction data taken from the green box above (with the white arrow therein) with carbon being about 92.9%, iron being about 6.8% and nickel being about 0.3%.

FIG. 20 shows TEM and HAADF analysis of the high aspect ratio CNT product of Electrolysis #F (as described in Table 5, and by SEM in FIG. 19). As seen on the right side of the middle row of FIG. 20, the CNT walls consist of parallel carbon (layers separated by the characteristic 0.33-0.24 nm graphene layer spacing. As seen in the elemental analysis of Area #1 in the lowest row, areas consist of hollow tubes composed of 100% carbon. However, as seen in the TEM of the top two rows and in the bottom row as the HAADF elemental profiles, there are also extensive portions of the tubes that are intermittently filled with metal. In the bottom row of FIG. 20, a lateral cross sectional elemental CNT profile scanned through Area #2 from the outside, through the CNT and then out the opposite wall shows the wall is composed of carbon, while the inner region also contains iron as the dominant metal coexisting with some nickel.

Figure 21:
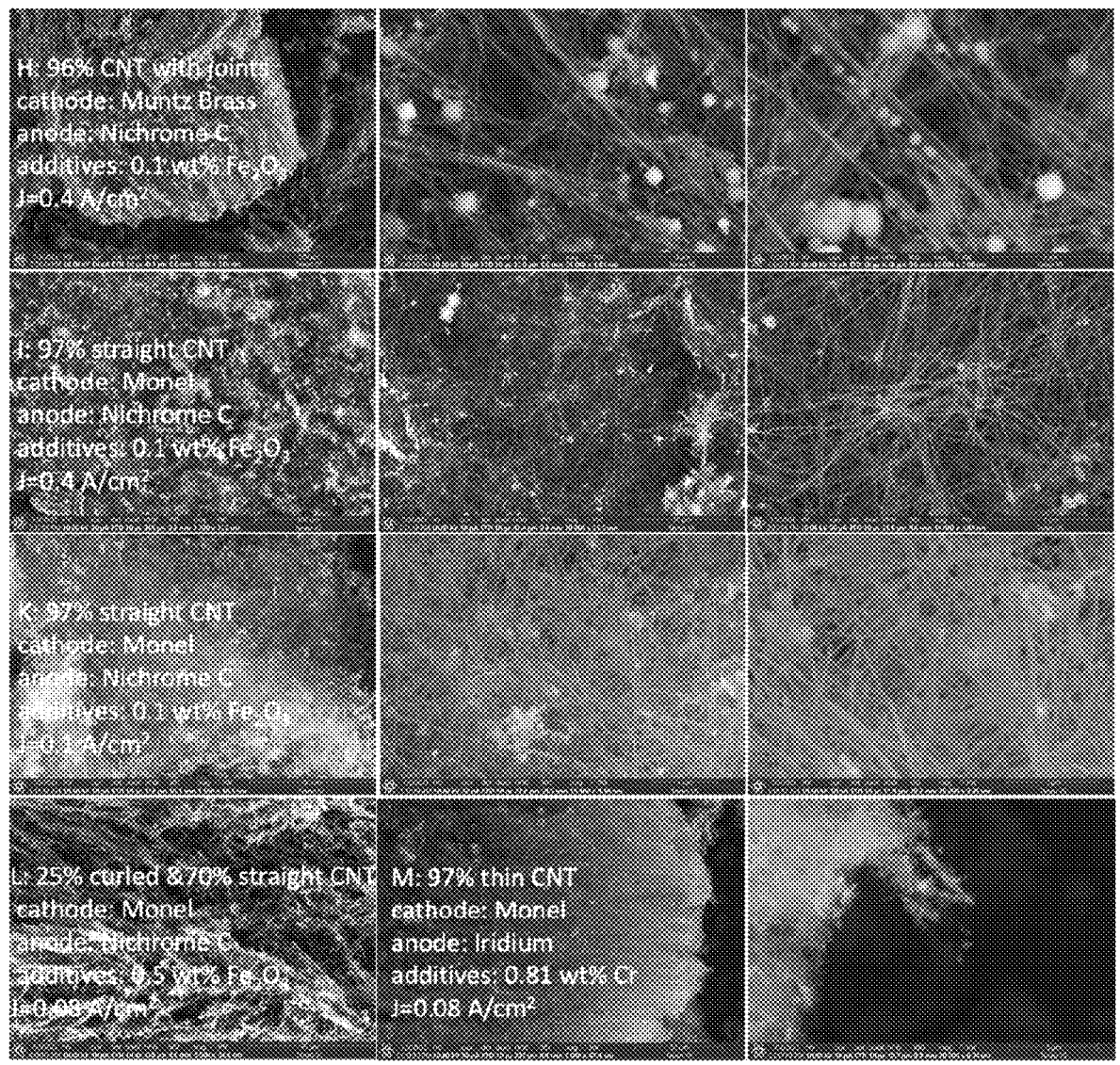
FIG. 21 shows SEM images of a CNM product of high purity, high yield CNTs synthesized by molten carbonate electrolysis, according to embodiments of the present disclosure.

Example 7—Electrolysis Operating Parameters for Making a CNM Product as a Thin CNT Allotrope FIG. 21 shows SEM images of the CNM product of high purity, high yield CNTs under a variety of electrochemical conditions by electrolytic splitting of $CO_2$ in 770° C. $Li_2CO_3$. The washed product is collected from the cathode subsequent to the electrolysis described in Table 5. Scale bars (starting from left) are for panels J: 100, 4 and 2 μm; for panels I: 100, 10 and 4 μm; for panels K: 40, 5 and 3 μm; for panels L: 40, 50 and 5 μm.

Figure 22:
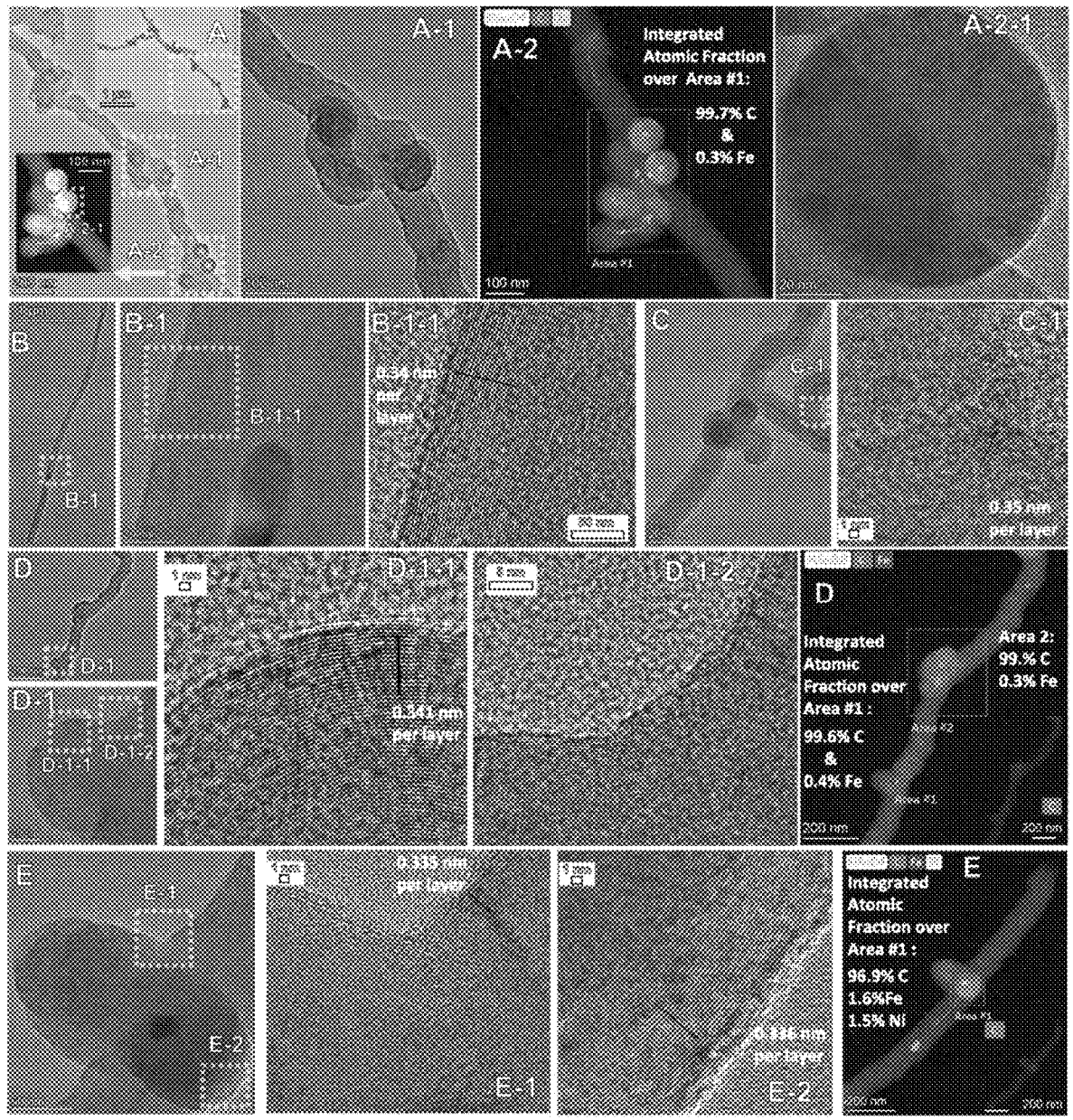
FIG. 22 shows TEM and HAADF of the CNM product of carbon nanotubes which exhibit nodules or buds synthesized by molten carbonate electrolysis, according to embodiments of the present disclosure.

FIG. 22 shows TEM and HAADF of the CNM product of carbon nanotubes which exhibit nodules or buds under the Electrolysis #H (Table 5 and SEM on top row of FIG. 22) electrochemical conditions by electrolytic splitting of $CO_2$ in 770° C. $Li_2CO_3$. In the top row of FIG. 22, the product is analyzed with scale bars from left to right of 200, 100, 20 and 100 nm. Scale bars in the second row have scale bars of 1 μm. then 20, 5, 200 and 1 nm. Third row scale bars are 200, 20, 1, 5 and 200 nm. Bottom row scale bars are 50, 1, 1 and 200 nm.

FIG. 21 demonstrates that additional modifications of the electrolysis conditions can yield high purity carbon nanotubes by $CO_2$ molten electrolysis. In the top row, panels #H, as with high current density (FIG. 17, panel #A), a moderate current density of 0.4 $A/cm^2$ (with the same electrolyte, a Muntz Brass cathode and a Nichrome C anode, yields high purity (96%) CNTs, that are longer (100-200 μm) at a coulombic efficiency approaching 100%. Switching the cathode material to Monel in the second row (FIG. 21, panels A) yields shorter 20-50 μm CNTs with 97% purity and coulombic efficiency again approaching 100%. Not shown in the figure, but included in Table 5 (Electrolysis #D), is that a switch from Nichrome C to a pure nickel anode (while retaining the Monel Cathode, and with electrolyte additives at J=0.2 $A/cm^2$) leads to a substantial drop in CNT purity to 70% with the remainder of the product consisting of nano-onions. A drop of current density from 0.4 A to 0.1 $A/cm^2$ in FIG. 21 panels #K yields 97% purity CNTs of length 30-60 μm with only a small drop of coulombic efficiency to 97%. In a single panel of #L located in the lower left corner of FIG. 21, an overabundance of $Fe_2O_3$ is added which has previously been observed to lose control of the synthesis specificity. In this case, the total purity of CNTs remains high at ~95%, but this consists of two distinct morphologies of CNT in the product. The majority product at ~75% is twisted CNTs, and the minority product at ~20% is straight CNTs. Finally, in panels #M on the middle and right lowest row of FIG. 21, a noble metal, iridium, is used as the anode (along with the Monel Cathode) at a low 0.08 $A/cm^2$ current density. Transition metals released from the anode, during its formation of a stable oxide over layer, can contribute to the transition metals ions that are reduced at the cathode and serve as nucleation points for the CNTs. This is not the case here due to high stability of the iridium. Instead as a single, high concentration transition metal, 0.81 wt % Cr, is made as the electrolyte additive. The product is highly pure (97%) CNTs that are the thinnest shown (<50 nm diameter), are 50-100 μm long for an aspect ratio >1,000, and formed at a coulombic efficiency of 80%.

SEM of several of the CNM products, specifically Electrolyses #H, #B and #C, exhibit evidence of nodules that appear as "buds" attached to the CNTs. This nano-bud allotrope is most consistent in Electrolysis #H and are further explored by TEM and HAADF in FIG. 22. As seen in the top row of FIG. 22, the nano-buds generally have a spherical symmetry that extend away from the longitudinal axis of the CNT, and while not prevalent in the structure the nano-buds appear comparable to grape bunches growing on a vine. The nano-buds generally contain a low level of the transition metal nucleating metal, such as 0.3% Fe is evident, and the rest of the structure is generally pure carbon, with an occasional metal core. As seen in the left side of the second row, the CNT walls continue to exhibit the regular 0.33 to 0.34 graphene inter-wall separation, as seen on the right side of the row, joining adjacent CNTs may have merged or distinct graphene structures. Similarly, as seen in the third row of FIG. 17, adjacent nano-buds on CNTs can have graphene walls which bend to join, and are shared, or as seen in the fourth row appear instead to be distinct (intertwined, not merged) structures.

Example 8-Electrolysis Operating Parameters for Making a CNM Product with Macroscopic Assembly of Nanocarbon Allotropes In addition to synthesizing individual CNTs, this Example 8 provides series of electrolyses that generate useful macroscopic assemblies of CNTs. There has been interest in densely packed CNTs for nano-filtration, and also due to their high density of conductive wires as an artificial neural net. The macroscopic assemblies made according to embodiments of the present disclosure are referred to as nano-sponge, densely packed parallel CNTs, and nano-web CNTs in Table 6 and FIG. 23.

for panels N: 500, 40, and 20 and 8 μm; for panels P: 400, 10 and 5 μm; for panels d: 300, 40 and 5 μm; for panels Q: 500 μm 40, 20 and 8 μm.

The Nano-sponge allotrope was formed by Electrolyses #N with Nichrome C serving as both the cathode and the anode, with 0.81% Ni powder added to the 770° C. $Li_2CO_3$ electrolyte, the initial current ramped upwards (5 min each at 0.008, 0.016, 0.033 and 0.067 A/cm$^2$), then a 4 h current density of 0.2 A/cm$^2$ generating a 97% purity nano-sponge at 99% coulombic efficiency. As previously described, long densely packed, parallel carbon nanotubes are produced in Electrolysis #F with a 0.1 wt % $Fe_2O_3$ additive to the $Li_2CO_3$ electrolyte, a Muntz Brass cathode and an Inconel 718 anode and 2 layers of Inconel 600 screen at 0.15 A/cm$^2$. As opposed to the parallel assembly produced in Electrolysis #F, nano-web aptly describes the interwoven carbon nanotubes from Electrolyses #P and #Q, presented in the lower rows of Table 6 and FIG. 23. Two different routes to the nano-web assembly are summarized. The first uses a 0.1% $Fe_2O_3$ additive, a Muntz Brass cathode and an Inconel 718 anode with 3 layers of Inconel 600 screen, at 0.08 A/cm$^2$ generating a nano-web with a purity of 97% at a coulombic efficiency of 79%. The second pathway uses about 0.81 wt % Ni powder additive, a Monel cathode and Nichrome C anode, at 0.28 A/cm$^2$ generating a nano-web with a purity of 92% at a coulombic efficiency of 93%.

The densely packed, straight CNTs define an inter-CNT spacing that ranges from 50 to 300 nm, moreover the CNTs are highly aligned, which may also be referred to as a substantially parallel—with each other, providing unusual nano-filtration opportunities for both this size domain and for an opportunity to filter 1D from 3D morphologies. The nano-sponge does not have this alignment feature, and from FIG. 23 it can be seen that the nano-sponge defines nano-

TABLE 6

Systematic variation of $CO_2$ splitting conditions in 770° C. $Li_2CO_3$ to optimize formation of macroscopic assemblies of nanocarbons with densely packed carbon nanotubes.

| Electrolysis # | Cathode | Anode | Additives (wt % powder) | Electrolysis time | Current density (A/cm$^2$) | Product description |
|---|---|---|---|---|---|---|
| N | Nichrome C | Nichrome C | 0.81% Ni | 4 h | 0.2 | 97% nano-sponge CNT |
| F | Muntz Brass | Inconel 718 2 layers Inconel 600 | 0.1% $Fe_2O_3$ | 4 h | 0.15 | 98% densely packed straight 100-500 μm CNT |
| P | Muntz Brass | Nichrome C 3 layers Inconel 600 | 0.1% $Fe_2O_3$ | 15 h | 0.08 | 97% 50-100 μm nano-web CNT |
| Q | Monel | Nichrome C | 0.81% Ni | 3 h | 0.2 | 92% 5-30 μm nano-web CNT Rest: onions |

Figure 23:
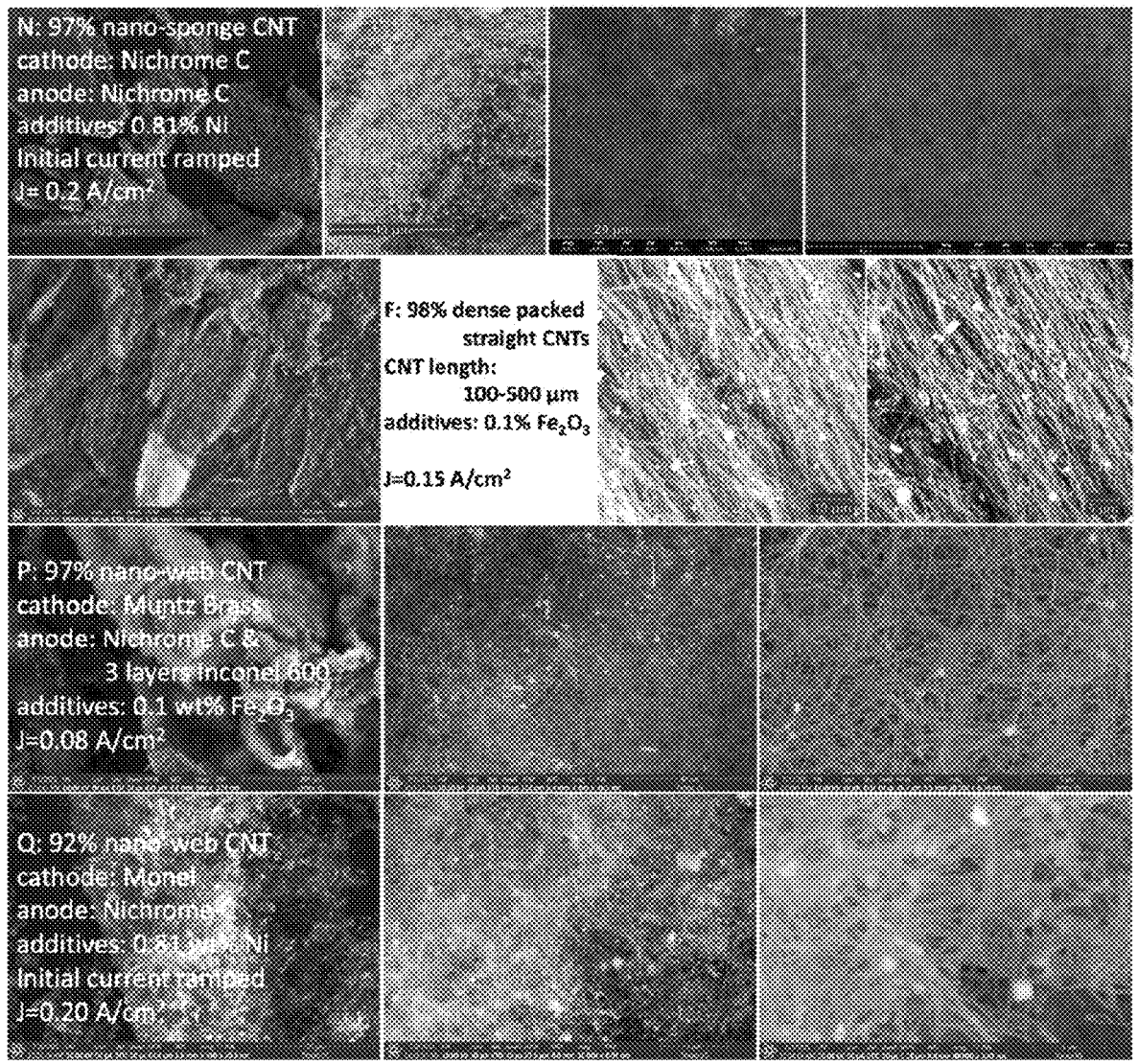
FIG. 23 shows SEM images of the CNM product consisting of carbon nanotubes arranged in macroscopic assemblies synthesized by molten carbonate electrolysis, according to embodiments of the present disclosure.

FIG. 23 shows SEM images of the CNM product consisting of carbon nanotubes arranged in various packed macroscopic structures, also referred to herein as macro-assemblies, that are amenable for various uses, including nano-filtration. The washed product is collected from the cathode subsequent to the electrolysis described in Table 6. Moving left to right in the panels, the product is analyzed by SEM with increasing magnification. The allotrope constituents identified include nano-sponges, densely packed, straight CNTs, and nano-web CNTs. Moving left to right in the panels, the product is analyzed by SEM with increasing magnification. Scale bars in panels (starting from left) are filtration pores with a size of about 100 to about 500 nm, while the nano-web allotrope provides nano-filtration with a pore size of about 200 nm to about 1 μm.

Example 9-Raman Spectroscopy and XRD Characterization of the CNM Products of Examples 5-8

Figure 24:
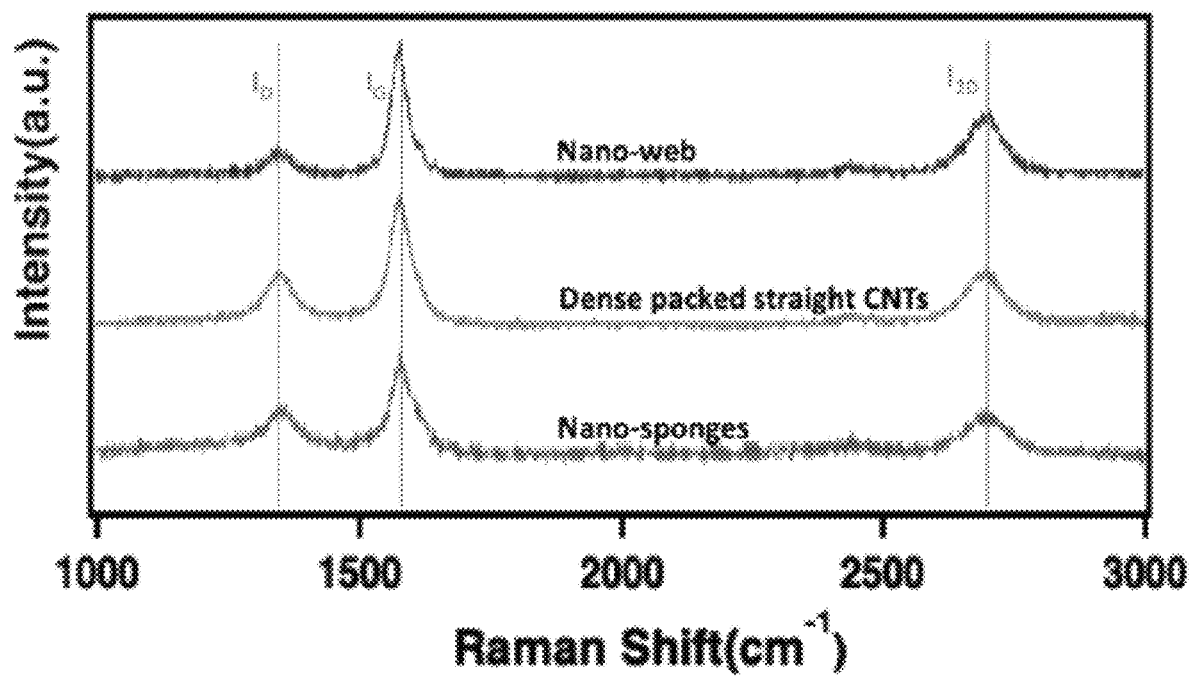
FIG. 24 shows Raman spectroscopy analysis of a CNM product consisting of various macroscopic assemblies of CNTs synthesized by molten carbonate electrolysis, according to embodiments of the present disclosure.

FIG. 24 shows Raman spectroscopy analysis of the CNM product consisting of various labeled CNT assemblies synthesized by the electrolytic splitting of $CO_2$ in 770° C. $Li_2CO_3$ with a variety of systematically varied electrochemical conditions described in Table 7.

TABLE 7

Raman spectra of a diverse range of carbon allotropes
and macro-assemblies formed by molten electrolysis.

| CO$_2$ Molten Electrolysis Product Description | $v_D$(cm$^{-1}$) | $v_G$(cm$^{-1}$) | $v_{2D}$(cm$^{-1}$) | $I_D/I_G$ | $I_{2D}/I_G$ |
|---|---|---|---|---|---|
| Nano-web | 1342.5 | 1577 | 2689.6 | 0.28 | 0.50 |
| Densely packed, straight CNTs | 1342.5 | 1577.4 | 2694.8 | 0.46 | 0.49 |
| Nano-sponge | 1352.5 | 1580.6 | 2687.3 | 0.67 | 0.62 |

Figure 25:
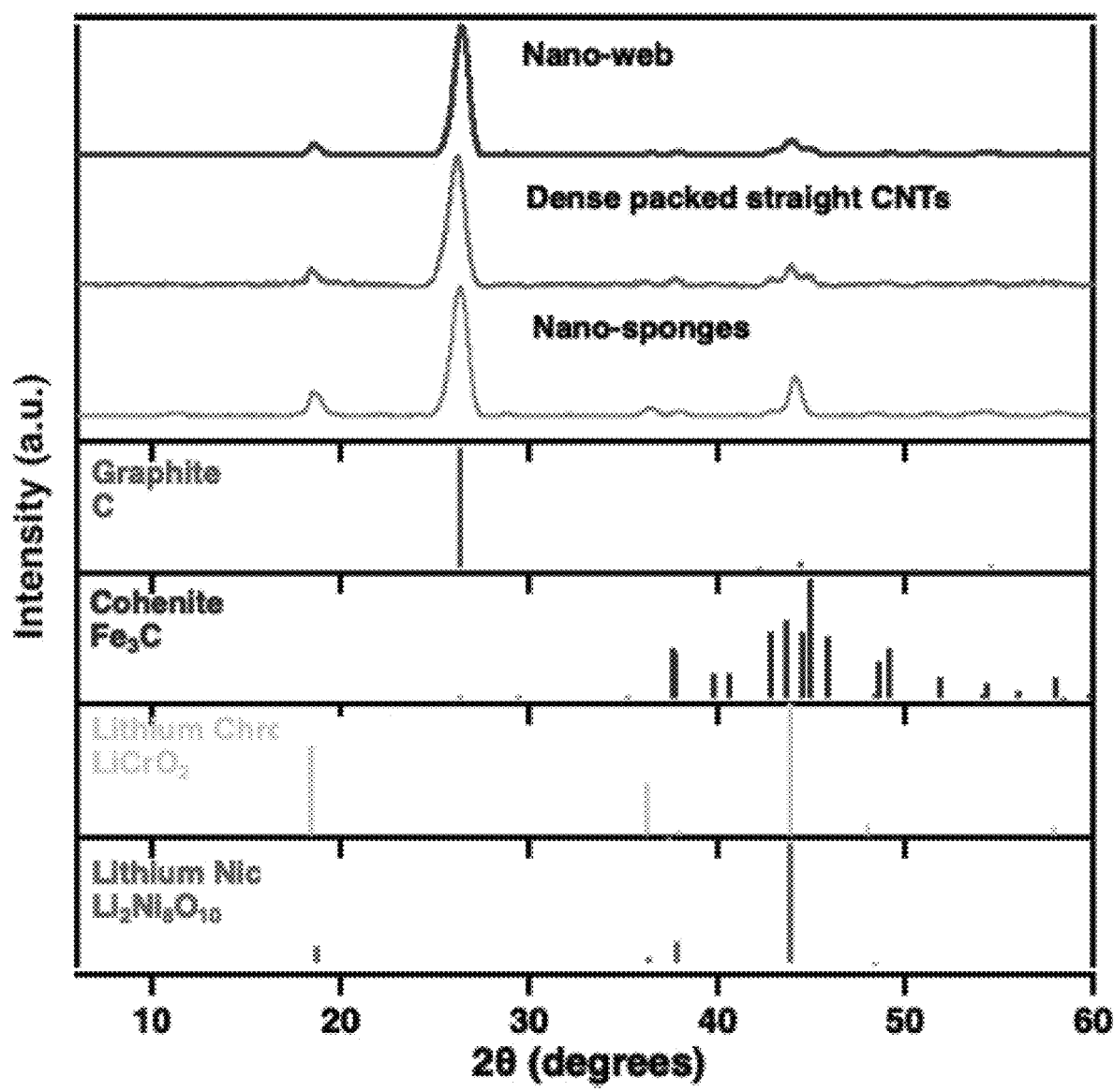
FIG. 25 shows XRD analysis of a CNM product consisting of various CNT macroscopic assemblies synthesized by molten carbonate electrolysis, according to embodiments of the present disclosure.

FIG. 25 shows XRD analysis of the CNM product consisting of various labeled CNT assemblies synthesized by the electrolytic splitting of CO$_2$ in 770° C. Li$_2$CO$_3$ with a variety of systematically varied electrochemical conditions described in Table 7.

FIG. 24 presents the Raman spectra effect of variation of the CNT electrolysis conditions on the CNT assembly products from CO$_2$ electrolysis in 770° C. Li$_2$CO$_3$. The Raman spectrum exhibits two sharp peaks ~1350 and ~1580 cm$^{-1}$, which correspond to the disorder-induced mode (D band) and the high frequency E$_{2G}$ first order mode (G band), respectively and an additional peak, the 2D band, at 2700 cm$^{-1}$. In the spectra, the graphitic fingerprints lie in the 1880-2300 cm$^{-1}$ and are related to different collective vibrations of sp-hybridized C—C bonds.

Interpretation of the Raman spectra provides insight into potential applications of the various carbon allotropes. From FIG. 24, the intensity ratio between D band and G band ($I_D/I_G$) is calculated, or an observed shift in $I_G$ frequency, are useful parameters to evaluate the relative number of defects and degree of graphitization are presented in Table 7. Note in particular, that of the nano-sponge, nano-web and densely packed, straight CNT assemblies shown in FIG. 23, that the nano-web CNT assembly exhibits low disorder with $I_D/I_G$=0.36 in Table 7, the densely packed CNT assembly exhibits intermediate disorder with $I_D/I_G$=0.49, and the nano-sponge exhibits the highest disorder with $I_D/I_G$=0.62 and while accompanied by a shift in $I_G$ frequency.

For the assemblies with increasing $I_D/I_G$ ratio:

CNT nano-web<Densely packed CNT<CNT nano-sponge

It has been previously demonstrated that an increased concentration of iron oxide added to the Li$_2$CO$_3$ electrolyte had correlated with an increasing degree of disorder in the graphitic structure. It should be noted that these defect levels each remain relatively low as the literature is replete with reports of multi-walled carbon nanotubes made by other synthetic processes with $I_D/I_G$>1. Lower defects are associated with applications that require high electrical and strength, while high defects are associated with for applications which permit high diffusivity through the structure such as those associated with increased intercalation and higher anodic capacity in Li-ion batteries and higher charge super capacitors.

Along with the XRD library of relevant compound spectra, XRD is presented in FIG. 25 of the CNT assembly products, prepared as shown in FIG. 23 and Table 6. Each of the spectra exhibit the strong diffraction peak at 2θ=27° characteristic of graphitic structures. The nano-sponge XRD spectra is distinct from the others having a dominant peak at 2θ=43°, indicating the presence of nickel as Li$_2$Ni$_8$O$_{10}$ and chromium as LiCrO$_2$ by XRD spectra match. XRD of this nano-sponge exhibits little or no iron carbide. On the other hand both the nano-web and densely packed, straight CNTs exhibit additional significant peaks at 2θ=42 and 44° indicative of the presence of iron carbide, Fe$_3$C. The diminished presence of defects previously noted by the Raman spectra for the other densely packed CNTs along with the XRD presence of Li$_2$Ni$_8$O$_{10}$, LiCrO$_2$ and Fe$_3$C provide evidence that the co-presence of Ni, Cr and Fe as nucleating agents can diminish defects in the CNT structure compared to Ni and Cr alone.

Figure 26:
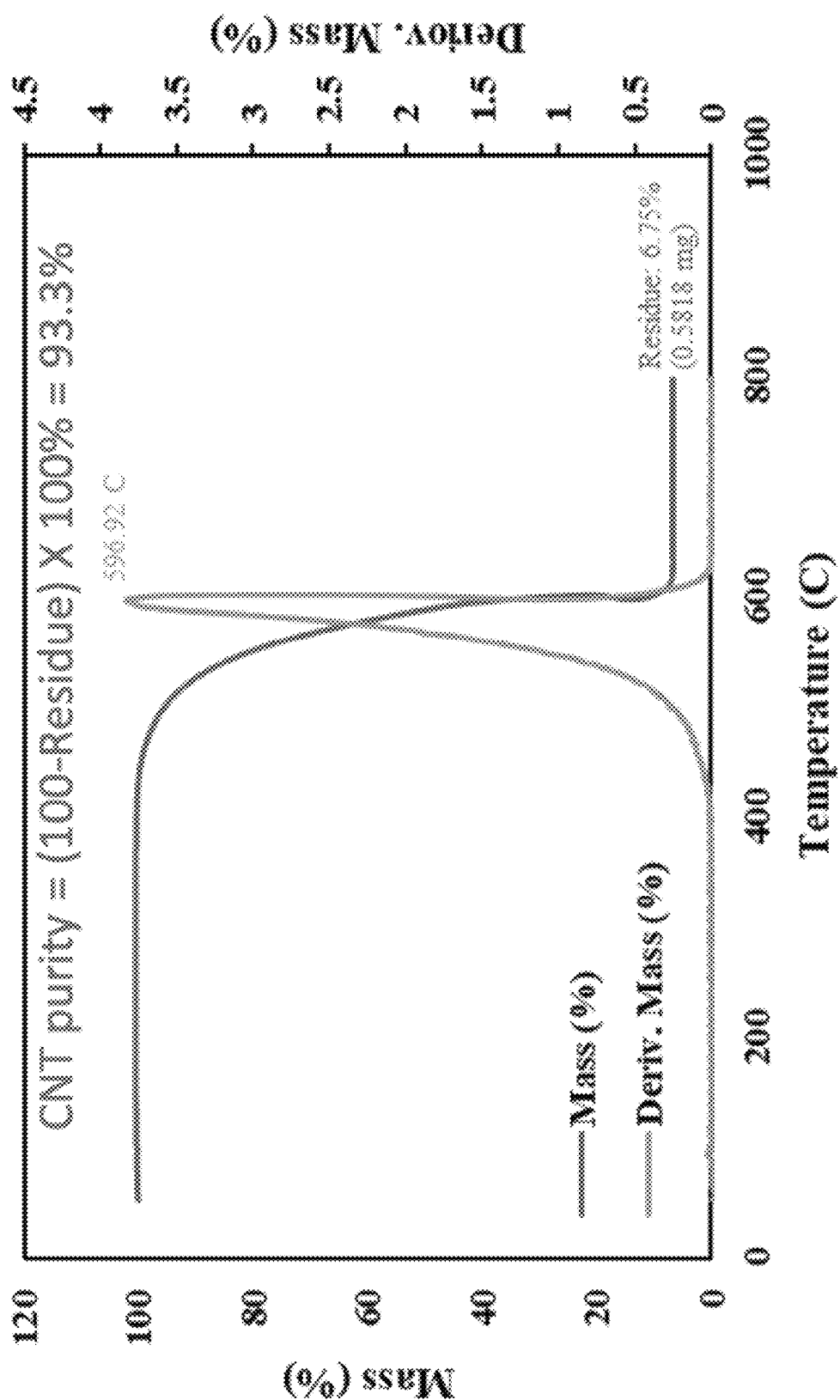
FIG. 26 is a line graph of mass (%) and temperature (° C.) of a high purity carbon nanotube allotrope made according to embodiments of the present disclosure.
Figure 27:
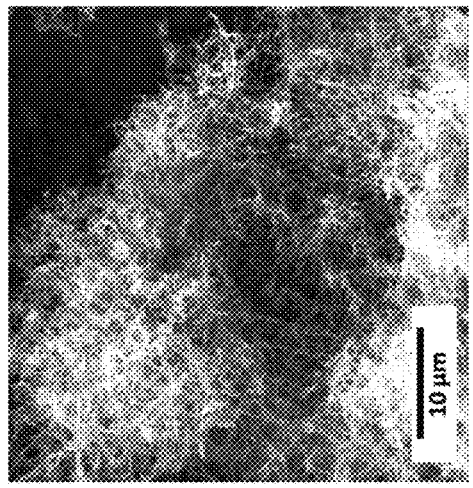
FIG. 27 shows a series of different magnified SEM images of a high purity carbon nanotube allotrope made according to embodiments of the present disclosure.
Figure 27:
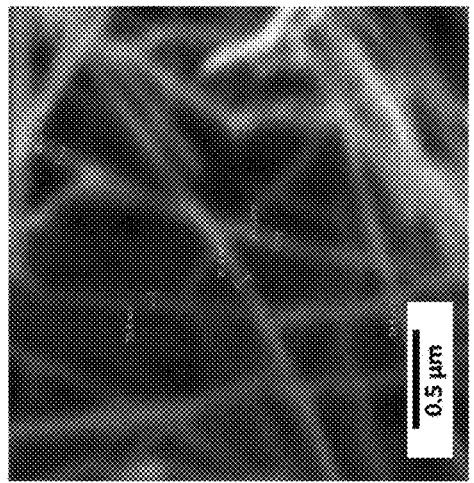
Figure 27:
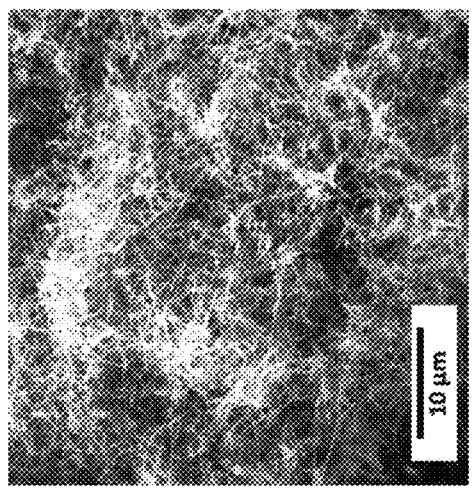
Figure 27:
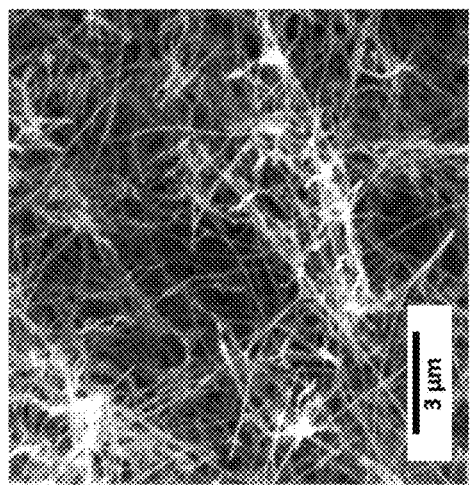
Figure 27:
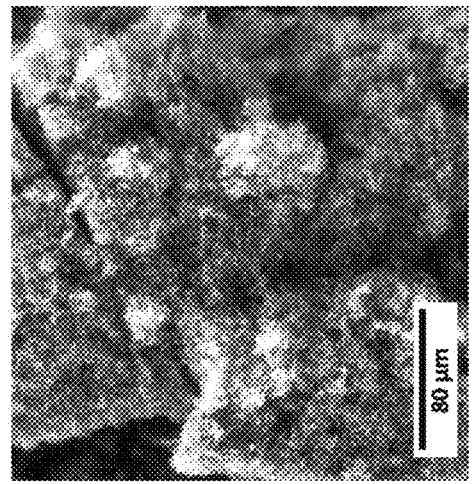
Figure 27:
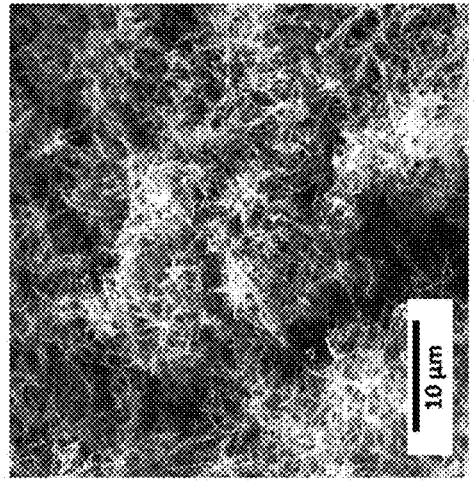

Example 10—Scaled-Up Electrolysis Operating Parameters for Making a CNM Product with a High Purity of Desired Nanocarbon Allotropes This example demonstrates that various nanocarbon allotropes can be electrosynthesized with a high yield with high purity using larger electrodes and simpler, modified conditions. Each of the three cases used in this Example 10 generated three different and high purity allotrope products: (i) CNTs; (ii) carbon nano-onions; or, (iii) carbon nano-pearls, using similar electrolysis operational parameters, but using different anode shapes, as well as different electrolysis current densities, each of which can influence which metals enter the electrolyte. Each of the three electrosyntheses were conducted in a 750° C. molten Li$_2$CO$_3$ electrolyte with a Muntz brass cathode with a two sided, active surface area that was about 39 cm tall×34.5 cm wide (with a surface area of about 1,345.5 cm$^2$), per side. The cathode was sandwiched by between a stainless steel 304 anode. In the first two cases (i) and (ii) the electrolysis was conducted at a constant current density of about 0.2 A/cm$^2$ with a 98% CO$_2$ inlet at 1.9 L/min, and the third (iii) case was conducted at a lower constant current density of about 0.07 A/cm$^2$ with a CO$_2$ inlet at 0.8 L/min. In addition to current density, a further difference in the three cases was the shape of the stainless steel anode that sandwiched both sides of the cathode. In the first case (i), the anode was a solid steel plate, a product with a high purity of a CNT allotrope was generated. After washing to remove excess electrolyte, the TGA of the product and the derivative of the TGA is shown in FIG. 26, while the SEM images with increasing magnification are seen in the lower panels of FIG. 27. As seen in the TGA, the product has a low residue rate of 6.7% and a high $T_{inflection}$=596.9° C. which is indicative of a highly graphitic (resistant to oxidation) structure, while the SEM images reveal the high purity carbon nanotube morphology of the product. The actual sample impurity is less than the TGA residue of 6.7%. The 6.7% is the oxidized (combusted) mass of the (metal) residue. Even higher carbon nanotube TGA purity for the carbon nanotubes was observed, achieving a residue rate of about 4% when using even larger electrodes of 91.14 cm (36") width by also increasing the anode to cathode spacing (i.e. the inter-electrode space) from about 2.5 cm (1") to about 10 cm (4"), and at a constant current density of about 0.2 A/cm$^2$. At a current density of 0.2 A/cm$^2$, the current applied to the electrodes is several thousand amps. The results are reproducible with CO$_2$ captured directly from the air, and CO$_2$ from the exhaust of a natural gas electric power plant. The larger spacing accommodated a longer deposition time of 16 hours resulting in a thicker deposition of about 3.5" from each side of the sandwiched cathode. Without being bound by any theory, the inventors hypothesized that the greater accommodated CNT growth requires less additional nucleation metal resulting in the observed increase in TGA purity (the observed decrease in the TGA residue relative mass).

Figure 28:
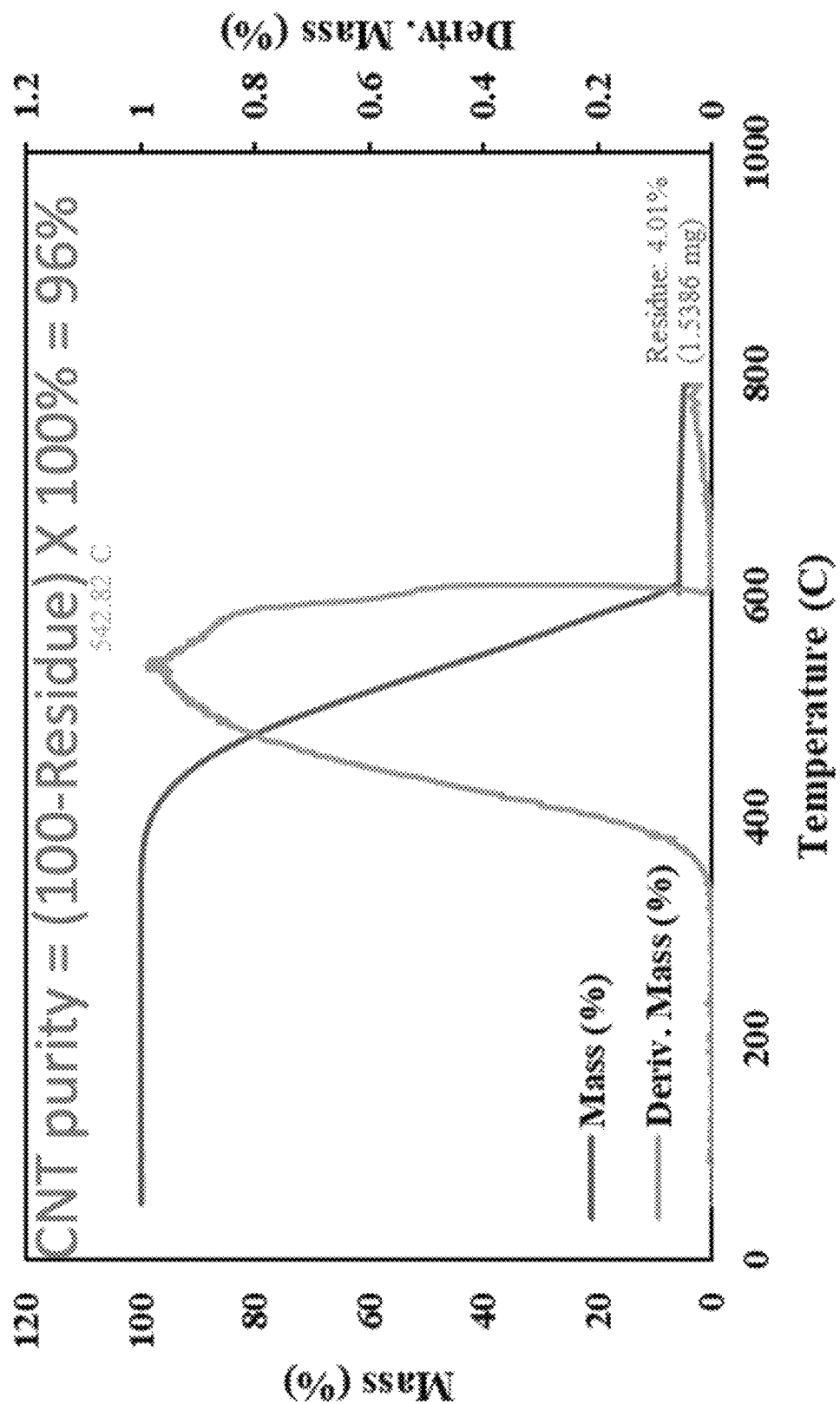
FIG. 28 is a line graph of mass (%) and temperature (° C.) of a high purity carbon nano-onion allotrope made according to embodiments of the present disclosure.
Figure 29:
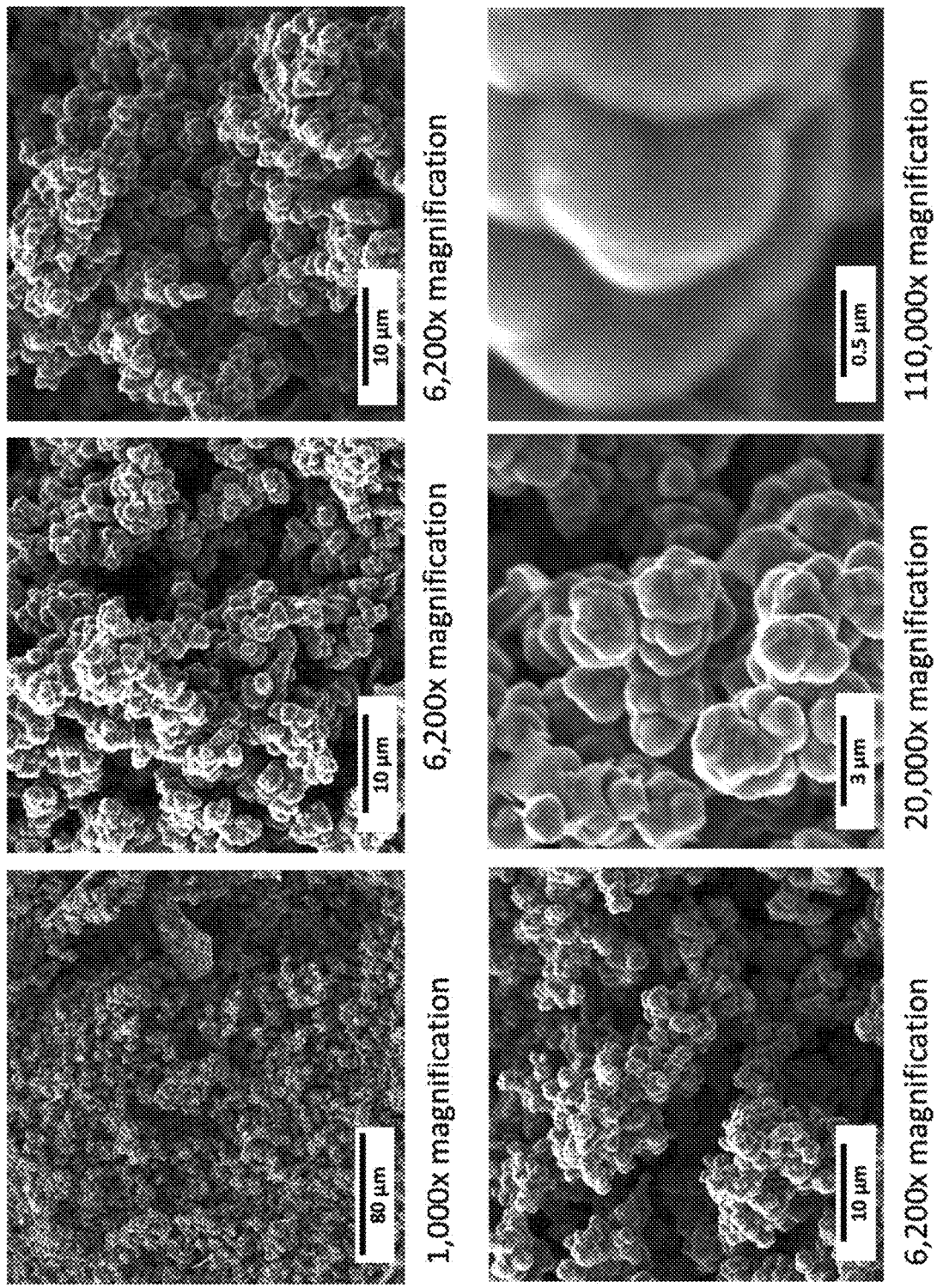
FIG. 29 shows a series of different magnified SEM images of a high purity carbon nano-onion allotrope made according to embodiments of the present disclosure.

In the second case (ii), the anode was a fresh steel (Dutch weave) screen, and as seen in FIG. 28 generated a high purity carbon nano-onion product. In addition, a fresh (new) stainless steel 304 electrolysis case was utilized. A fresh electrolysis case tends to be activated to produce high purity carbon nanotubes subsequent to the first electrolysis run. After washing to remove excess electrolyte, the TGA of the product and the derivative of the TGA is shown in FIG. 28, while the SEM images with increasing magnification are shown in FIG. 29. As seen in FIG. 28, the product has a low residue rate of about 4.01% and a high $T_{inflection}$=542.8° C. These results are indicative of a graphitic (resistant to oxidation) structure, while the SEM images reveal a high purity carbon nano-onion allotrope of the product. Repeated, subsequent electrolyses in this case with this anode generated a high purity carbon nanotube product. This subsequent carbon nanotube formation is in accord with the improved anode release of transition metals to nucleate carbon nanotube formation, compared to the fresh electrolysis case and anode configuration. Without being bound to any theory, this carbon nano-onion formation is in accord with the suppressed release of transition metals from the mesh electrode and from the fresh steel case, to nucleate carbon nanotube formation, compared to use of a fresh electrolysis case and the described anode configuration.

The melting point of $Li_2CO_3$ is 723° C. Another means observed to generate carbon nano-onions-instead of using the screen, a simpler flat plate stainless steel anodes is used, and found to be additionally effective on both the first and on subsequent electrolyses, is initiating the electrolysis at a lower temperature in which the electrolyte is only partially melted. This also forms a highly pure carbon nano-onion product. For example, in repeated runs of the electrolysis reaction a CNM product with carbon nano-onions with demonstrated TGA residues of 5.3% and 7.4%. Without being bound to any theory, this carbon nano-onion formation is in accord with another example of a suppressed formation of nucleation sites on the cathode, which inhibits carbon nanotube formation, and favors highly pure carbon nano-onion formation.

Figure 30:
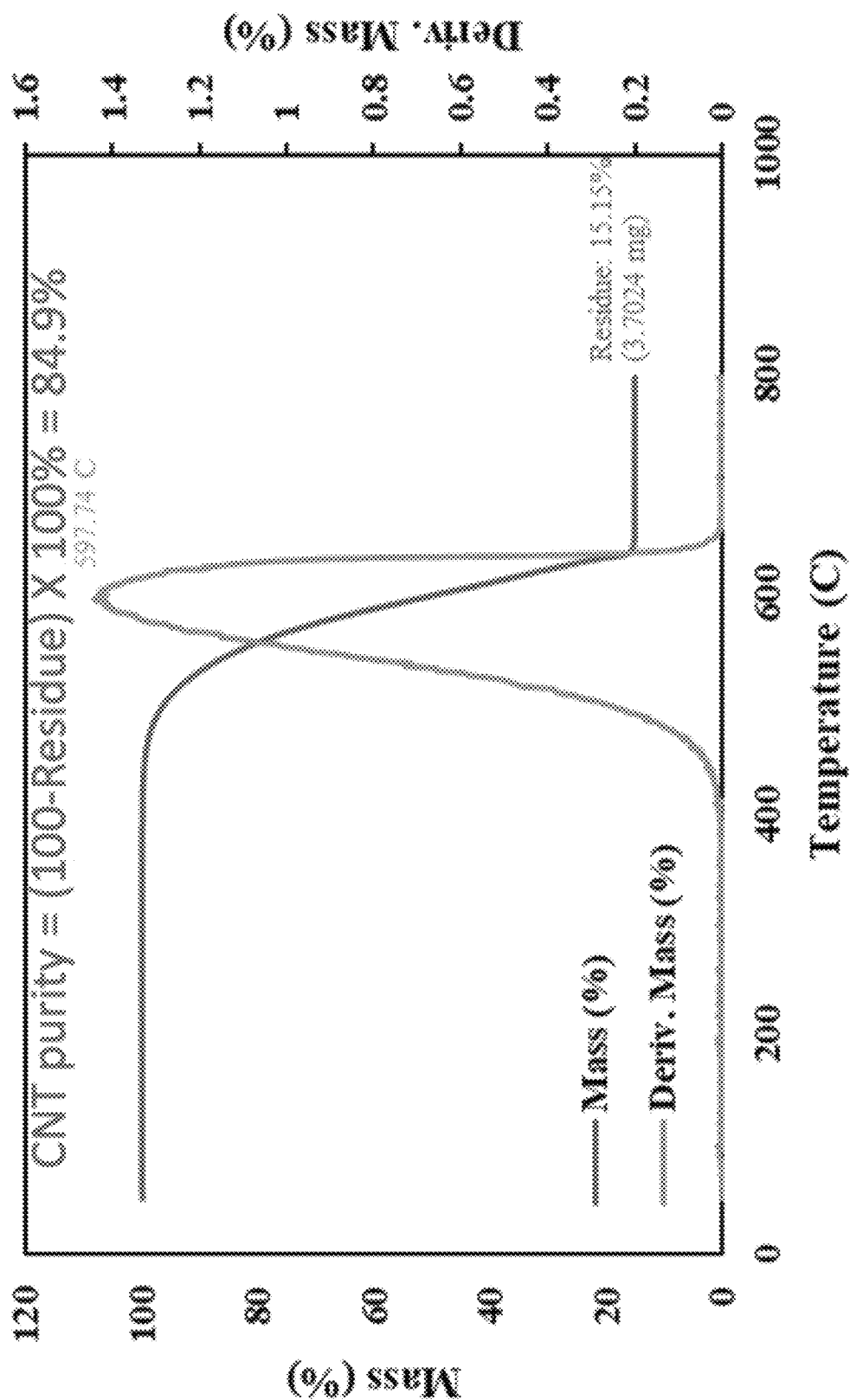
FIG. 30 is a line graph of mass (%) and temperature (° C.) of a high purity carbon nano-pearl allotrope made according to embodiments of the present disclosure.
Figure 31:
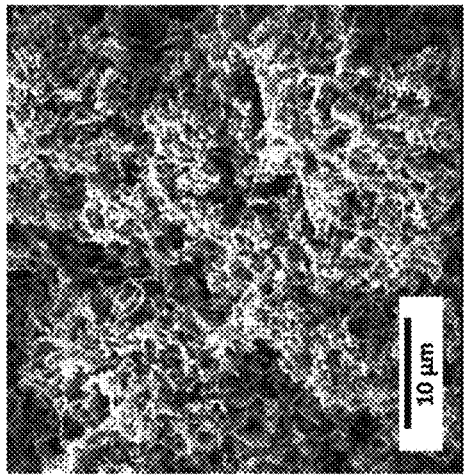
FIG. 31 shows a series of different magnified SEM images of a high purity carbon nano-pearl allotrope made according to embodiments of the present disclosure.
Figure 31:
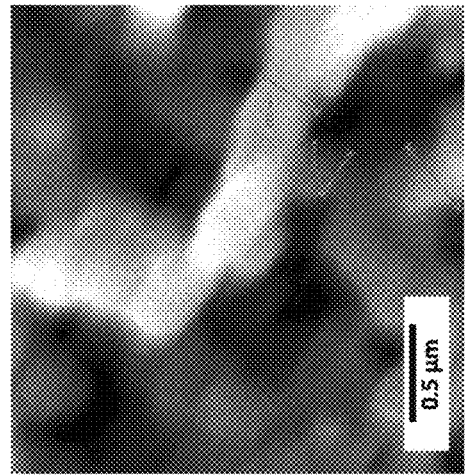
Figure 31:
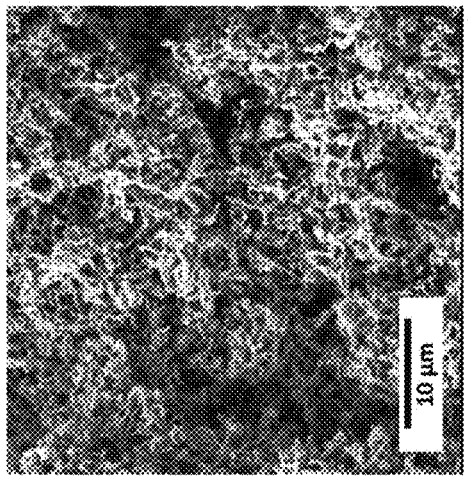
Figure 31:
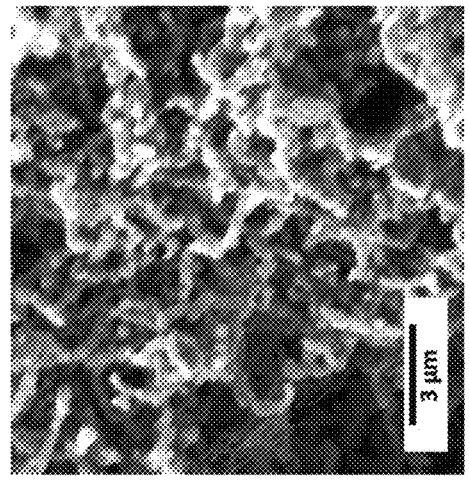

In the third case (iii), the anode was a sheet of perforated steel. After washing to remove excess electrolyte, the TGA of the product and the derivative of the TGA is shown in FIG. 30, while the SEM images with increasing magnification are shown in FIG. 31. As seen in FIG. 30, the product has a moderate residue of 15.1%, indicative of a higher metal content in the product, and a high $T_{inflection}$=597.7° C. is indicative of a graphitic (resistant to oxidation) structure, while the SEM reveal the high purity carbon nano-onion morphology of the product. Without being bound to any theory, this carbon nano-pearl product formation may be induced by a higher metal content in the product, which may be related to an increased metal release from the perforated sheet anode configuration.

We claim:

1. A method for producing a carbon nanomaterial (CNM) product, the method comprising steps of:
    a. heating an electrolyte media to obtain a molten electrolyte media;
    b. adding at least 0.8 wt % of a nickel-containing additive to the electrolyte media or the molten electrolyte media;
    c. positioning the molten electrolyte media between a high-nickel content anode and a cathode of an electrolytic cell;
    d. introducing a source of carbon into the electrolytic cell;
    e. applying an electric current to the cathode and the anode in the electrolytic cell; and
    f. collecting the CNM product from the cathode, wherein the CNM product comprises a minimal relative-amount of at least 70 wt %, as compared to a total weight of the CNM product, of hollow nano-onion product,
    wherein the high-nickel content anode is made of pure nickel or an alloy that comprises greater than 50 wt % nickel.

2. The method of claim 1, wherein the anode is made of any alloy that comprises nickel, iron and chromium.

3. The method of claim 1, wherein the electric current is applied at a current density of between about 0.05 A/cm$^2$ and 0.12 A/cm$^2$.

4. The method of claim 1, wherein the hollow nano-onion product defines an internal hollow core.

5. The method of claim 1, wherein the hollow nano-onion product has an $I_D/I_G$ ratio of between about 0.2 to about 0.4, as measured by Raman spectroscopy.

* * * * *